(12) United States Patent
Eckert et al.

(10) Patent No.: US 10,557,085 B2
(45) Date of Patent: Feb. 11, 2020

(54) PHOTOALIGNMENT COMPOSITION

(71) Applicant: ROLIC AG, Zug (CH)

(72) Inventors: Jean-François Eckert, Kientzville (FR); Thierry Becret, Blotzheim (FR); Masato Hoshino, Basel (CH); Qian Tang, Oberwil (CH)

(73) Assignee: ROLIC AG, Zug (CH)

( * ) Notice: Subject to any disclaimer, the term of this patent is extended or adjusted under 35 U.S.C. 154(b) by 45 days.

(21) Appl. No.: 15/562,277

(22) PCT Filed: Mar. 21, 2016

(86) PCT No.: PCT/EP2016/056090
§ 371 (c)(1),
(2) Date: Sep. 27, 2017

(87) PCT Pub. No.: WO2016/156079
PCT Pub. Date: Oct. 6, 2016

(65) Prior Publication Data
US 2018/0079961 A1     Mar. 22, 2018

(30) Foreign Application Priority Data

Mar. 31, 2015   (EP) ..................... 15161811

(51) Int. Cl.
| | | |
|---|---|---|
| *C09K 19/56* | (2006.01) | |
| *C08G 73/10* | (2006.01) | |
| *C09D 179/08* | (2006.01) | |
| *G02F 1/1337* | (2006.01) | |
| *C09K 19/52* | (2006.01) | |

(52) U.S. Cl.
CPC .......... *C09K 19/56* (2013.01); *C08G 73/1078* (2013.01); *C09D 179/08* (2013.01); *G02F 1/133711* (2013.01); *G02F 1/133788* (2013.01); *C09K 2019/525* (2013.01)

(58) Field of Classification Search
CPC ....... C09K 19/56; C09D 179/08; C08G 73/10
USPC ....................................................... 524/104
See application file for complete search history.

(56) References Cited

U.S. PATENT DOCUMENTS

| | | |
|---|---|---|
| 5,965,761 A | 10/1999 | Buchecker et al. |
| RE36,625 E | 3/2000 | Herr et al. |
| 6,107,427 A | 8/2000 | Herr et al. |
| 6,201,087 B1 | 3/2001 | Herr et al. |
| 6,277,502 B1 | 8/2001 | Buchecker et al. |
| 6,335,409 B1 | 1/2002 | Herr et al. |
| 6,340,506 B1 | 1/2002 | Buchecker et al. |
| 6,632,909 B2 | 10/2003 | Buchecker et al. |
| 6,649,230 B1 | 11/2003 | Seiberle et al. |
| 6,831,148 B2 | 12/2004 | Buchecker et al. |
| 6,833,421 B1 | 12/2004 | Marck |
| 7,514,514 B2 | 4/2009 | Buchecker et al. |
| 7,687,118 B2 | 3/2010 | Cherkaoui et al. |
| 7,750,185 B2 | 7/2010 | Marck et al. |
| 7,959,990 B2 | 6/2011 | Cherkaoui et al. |
| 7,994,273 B2 | 8/2011 | Marck et al. |
| 8,173,749 B2 | 5/2012 | Bachels et al. |
| 8,329,823 B2 | 12/2012 | Bachels et al. |
| 8,436,132 B2 | 5/2013 | Marck et al. |
| 8,557,922 B2 | 10/2013 | Bachels et al. |
| 9,102,847 B2 | 8/2015 | Hatanaka et al. |
| 2010/0048849 A1 | 2/2010 | Eckert et al. |
| 2010/0188628 A1* | 7/2010 | Kwak .................... C09K 19/56 349/124 |
| 2010/0197186 A1 | 8/2010 | Shin et al. |
| 2010/0266814 A1 | 10/2010 | Bury et al. |
| 2011/0065859 A1 | 3/2011 | Bury et al. |
| 2012/0316317 A1 | 12/2012 | Eckert et al. |
| 2013/0035446 A1 | 2/2013 | Eckert et al. |
| 2014/0162076 A1 | 6/2014 | Eckert et al. |
| 2014/0192305 A1* | 7/2014 | Lincker ................. C09K 19/56 349/123 |

(Continued)

FOREIGN PATENT DOCUMENTS

| | | | |
|---|---|---|---|
| EP | 1 975 687 A1 | | 10/2008 |
| EP | 2 557 119 A1 | | 2/2013 |
| JP | 2009300465 | * | 6/2014 |
| WO | 2013/017467 A1 | | 2/2013 |
| WO | 2013/026691 A1 | | 2/2013 |
| WO | 2013/050122 A1 | | 4/2013 |

OTHER PUBLICATIONS

International Search Report for PCT/EP2016/056090 dated Jun. 2, 2016 [PCT/ISA/210].

(Continued)

*Primary Examiner* — Deve V Hall
(74) *Attorney, Agent, or Firm* — Sughrue Mion, PLLC

(57) ABSTRACT

The invention relates to a photoalignment composition comprising at least a single photoalignment polymer, preferably a homo- or a copolymer having at least one photoreactive group; and at least a single solvent of formula (I)

(R—CO—O—R'), wherein R and R' are independently from each other straight-chain or branched alkyl chain, with the proviso that at least one alkyl chain is branched.

Further, the present invention relates to the use of this composition for coating or printing, especially for printing, more especially for inkjet or offset printing processes, and most especially for an offset printing process. In addition, the present invention relates to the use of the photoalignment composition for the preparation of orientation layers for liquid crystals and in the construction of unstructured and structured optical elements and multi-layer systems, especially liquid crystal displays, LCDs.

20 Claims, 1 Drawing Sheet

(56) References Cited

U.S. PATENT DOCUMENTS

2014/0249244 A1 9/2014 Chappellet et al.
2014/0342086 A1 11/2014 Ibn-Elhaj et al.

OTHER PUBLICATIONS

Written Opinion for PCT/EP2016/056090 dated Jun. 2, 2016 [PCT/ISA/237].

* cited by examiner

PHOTOALIGNMENT COMPOSITION

CROSS REFERENCE TO RELATED APPLICATIONS

This application is a National Stage of International Application No. PCT/EP2016/056090 filed Mar. 21, 2016, claiming priority based on European Patent Application No. 15161811.3 filed Mar. 31, 2015, the contents of all of which are incorporated herein by reference in their entirety.

BACKGROUND

The invention relates to a photoalignment composition comprising at least a single photoalignment polymer, preferably a homo- or a copolymer having at least one photoreactive group; and at least a single solvent of formula (I)

(R—CO—O—R'), wherein R and R' are independently from each other straight-chain or branched alkyl chain, with the proviso that at least one alkyl chain is branched.

Further, the present invention relates to the use of this composition for coating or printing, especially for printing, more especially for inkjet or offset printing processes, and most especially for an offset printing process. In addition, the present invention relates to the use of the photoalignment composition for the preparation of liquid crystal aligning layers and in the construction of unstructured and structured optical elements and multi-layer systems, especially liquid crystal displays, LCDs.

In general photoalignment materials are applied by two main techniques, the coating and printing.

Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, intaglio printing such as direct gravure printing or offset gravure printing, lithographic printing such as offset printing, or stencil printing such as screen printing.

In general, there are five major printing processes which are distinguished by the method of image transfer and by the general type of image carrier employed.

Depending upon the process, the printed image is transferred to the substrate either directly or indirectly. In direct printing the image is transferred directly from the image carrier to the substrate, examples of direct printing are gravure, flexography, screen printing and letterpress printing processes. In indirect, or offset, printing, the image is first transferred from the image carrier to the blanket cylinder and then to the substrate. Lithography, currently the dominant printing technology, is an indirect (offset) process.

Image carriers (or plates) can generally be classified as one of four types: relief, planographic, intaglio, or screen. In relief printing, the image or printing area is raised above the no image areas. Of the five major printing processes, those relying on relief printing are letterpress and flexography. In planographic printing, the image and no image areas are on the same plane. The image and no image areas are defined by differing physiochemical properties. Lithography is a planographic process. In the intaglio process, the nonprinting area is at a common surface level with the substrate while the printing area, consisting of minute etched or engraved wells of differing depth and/or size, is recessed. Gravure is an intaglio process. In the screen process (also known as porous printing), the image is transferred to the substrate by pushing ink through a porous mesh which carries the pictorial or typographic image.

Inkjet printing represents a further established and strongly growing industrial image deposition process which is also called printing despite its quite different character (e.g. its lack of an image carrier) in comparison to the above described conventional printing processes. Inkjet printers may operate either in continuous or drop-on-demand (DOD) mode. In continuous-mode, the fluid is pumped through a nozzle to form a liquid jet. Uniformly spaced and sized droplets are obtained by imposing a periodic perturbation, leading to surface-tension driven jet break-up. This requires the fluid to have certain conductivity. Drop-on-demand is the method of choice for many industrial applications such as electronics and displays. This is mainly because of its smaller drop size, higher accuracy and no need to use dopants to make the fluid more conductive. An acoustic pulse ejects fluid droplets from a reservoir through a nozzle. The pulse can be generated either thermally (Bubble-jet) or piezo-electrically (piezo-jet). Piezo-electric DOD is generally more suited to a variety of solvents. The most critical part of inkjet printing technology is probably the fluid and its physical properties.

The fluid parameters should be on one hand optimised to get reliable droplet formation during printing with specific printer (such as viscosity and surface tension). The fluid should be also optimised in order to get good wetting properties, with specific substrates, and homogeneous films.

Flexographic technology is successfully used to apply liquid crystal aligning layers in the LCD industry. According to the flexographic technology, the liquid crystal aligning layers can be directly printed in a predetermined pattern without requiring any etching process. Generally described, the flexographic process can be a substantially continuous process which uses a series of rollers to transfer a quantity of alignment material as a predetermined pattern onto the desired surface of substrate (typically glass). Stated differently, the flexographic apparatus can be configured to automatically convey a plurality of glass panels sequentially through the process. The apparatus employs a special resin plate with a series of holding cells configured in a predetermined pattern to hold a quantity of alignment material processing solution. The resin plate is rotated and subsequently brought into direct contact with the glass panel surface to release the solution and transfer the predetermined pattern to form the liquid crystal aligning layers onto the surface. The glass panel is then heated to pre-cure the liquid crystal aligning layers.

In more detail the fabrication of a liquid crystal aligning layer by means of flexographic printing is described in the following. The alignment material solution is dropped and maintained on a so-called anilox roll. The anilox roll is preferably plated with chrome, or chrome and nickel (the alignment material solution contacting surface). Cells having a pyramid shape are formed in the anilox roll to a depth of approximately 20 µm so that the alignment material can be retained in the cells.

A doctor roll is rotated together with the anilox roll to help assure that the alignment material solution is evenly applied on the surface of the anilox roll. A resin plate is attached to an underlying plate typically comprising copper. In a preferred embodiment, the resin plate is formed from a polybutadiene resin, e.g., an Asahi Kasei photosensitive resin ("APR"). For ease of description, the resin plate will be described subsequently herein as an "APR plate".

The APR plate includes an exterior surface of predetermined patterns. The patterns include a plurality of cells as intaglios so that the alignment material solution can be accommodated in the cells. The depth of the cells is preferably in the range of approximately 15 to 20 µm. Thus, in contrast to the above general description the flexographic printers for liquid crystal aligning layer application use an intaglio instead of a relief process.

The alignment material solution is dispensed onto the anilox roll. The anilox roll and the doctor roll rotate and contact on an outer circumference portion. The contact pressure provided by the doctor roll helps the alignment material solution in the anilox roll (i.e., in the cells) to be uniformly distributed and to bring a certain quantity of the solution to fill the cell of the anilox roll. The APR plate then contacts the anilox roll and the alignment material solution is supplied or delivered to the APR plate. Typically, the amount of the alignment material solution transferred to the APR plate is determined by the contact force that the doctor roll exerts against the anilox roll (or the reverse). The alignment material solution is then held in the APR plate cells.

The LCD panel or glass is fixed to the print table. The table advances and the glass is moved forward at the same time that the copper plate holding the APR plate rotates. The APR plate thus directly contacts the glass substrate and the alignment material solution is applied to the glass from the cells of the patterns in the APR plate. As a result, an orientation layer is formed on the glass substrate.

There is an enormous demand of photoalignment compositions since these materials give access to very efficient and economic large scale manufacturing processes. However, their applicability, such as their printabilty is often not satisfying with the high industrial standards. Here are high quality standards required, such as even wetting properties; a desired thickness of the applied layer, homogeneity over the whole surface of the layer is required.

Therefore, is a constant need for photoalignment materials allowing good coatability or printability for the fabrication of thin liquid crystal aligning layers which fulfil the requirement of uniform defect free surfaces.

SUMMARY OF THE INVENTION

In the present invention the above-cited new photoalignment compositions were found which give access to improved printing processes.

Thus, the present invention relates to a photoalignment composition comprising
  a) at least a single photoalignment polymer, preferably a homo- or a copolymer having at least one photoreactive group;
  and c) preferably a further polymer not having a photoreactive group, and
  b) at least a single solvent of formula (I)
    (R—CO—O—R'), wherein R and R' are independently from each other a straight-chain alkyl; preferably a straight-chain a branched $C_1$-$C_6$alkyl chain; more preferably a branched $C_1$-$C_6$alkyl chain, most preferably a branched $C_3$-, $C_4$-, $C_5$-, $C_6$alkyl chain, especially most preferably a branched $C_4$alkyl chain; with the proviso that at least one alkyl chain is branched.

DETAILED DESCRIPTION OF PREFERRED EMBODIMENT

Figure 1:
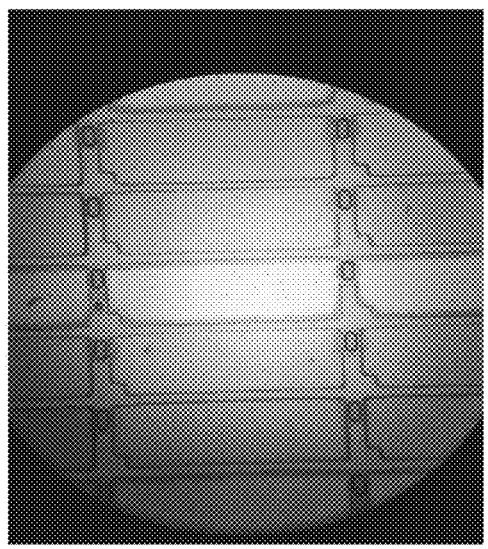
FIG. 1 is an example of "defect overall the surface" of coated formulation 1 on CF, microscopic defects can observed overall the coated surface.

Preferred is a photoalignment composition of the present invention, wherein R and R' are simultaneously a branched alkyl chain.

In the context of the present invention the below given wordings have the given meanings and preferences as given below:

"polymer" has the meaning of e.g. homopolymer, copolymer, graft polymer, block polymer, hyper branched polymer or oligomer; preferably has the meaning of polymer or copolymer;

preferred "polymer" of the present invention comprises a backbone, which is not particularly limited, and is represented for example by polyamic acid, partially imidised polyamic acid, polyimide, polyamic acid ester, polyester, polyamide, polysiloxane, polymaleinimide, polyacrylate, polyvinyl, cellulose derivative, polyacetal, polyurea, polyurethane, polystyrene derivative, poly(styrene-phenyl-maleimide)-derivative and poly(meth)acrylate, cyclo olefin polymer or a mixture thereof. More preferred "polymer" is a polyamic acid, partially imidised polyamic acid, polyimide, polyamic acid ester, polysiloxane derivative or mixtures thereof; polyamic acid, partially imidised polyamic acid, polyimide and mixtures thereof are most preferred and especially most preferred is polyamic acid.

"coating" has the meaning of e.g. coating techniques like for example spin-coating, meniscus-coating, wire-coating, slot-coating, printing, such as offset-printing, flexo-printing, gravur-printing, especially of inkjet or offset printing;

"photoalignment polymer" has the meaning of an organic polymer, copolymer or oligomer comprising photoreactive groups, which are able to undergo photoreaction after radiation with aligning light.

"aligning light" has the meaning of light of wavelengths, which can initiate photoalignment. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. More preferably, aligning light is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

"aligning group exhibiting a property of controlling alignment of liquid crystal molecules without photo-irradiation" has the meaning of an organic group which is able to align liquid crystals, preferably homeotropically or planarly align liquid crystals.

Examples of such aligning groups are an unsubstituted or substituted steroidal skeleton such as a cholesterol group, which is uninterrupted or interrupted by at least a single heteroatom and/or at least a single bridging group, preferably, a cholesterol group is cholesteryl, cholestanyl, cholestan; or an aligning group is an unsubstituted or substituted organic chemical structure, which is, for example, 3 to 4 rings selected from any one of 1,4-cyclohexylene and 1,4-phenylene, which are linearly coupled e.g. directly or through 1,2-ethylene, and which organic chemical structure is preferably composed of three or four pieces of 1,4-cyclohexylene, three or four pieces of 1,4-phenylene or is composed of both 1,4-cyclohexylene and 1,4-phenylene wherein the number of total piece thereof are 3 or 4 pieces; substituents are for example straight chain or branched $C_1$-$C_{30}$ alkyl.

"photoreactive group", has the meaning of an organic group which is able to undergo a reaction after irradiation with light. For example a photoreactive group is able to make electrocyclic reactions, radical reactions, photoisomerization and Norrish reactions, and is e.g. dimerizable, decomposable, isomerizable, polymerizable and/or cross-linkable group;

more preferably the photoreactive group is a cinnamate-, coumarine-, quinoline-, azo-, stilbene-, cyanostilbene-, chalcone-, diphenylacetylene, benzylidene-phthalimidine, benzylideneacetophenone, phenylenediacryloyl, stilbazole and/or azo-group; most preferred are cinnamate-, coumarine-, quinoline-, cyanostilbene-, and/or chalcone-groups; especially most preferred are cinnamate- or cyanostilbene groups, and more especially cinnamate groups are preferred.

"straight-chain alkyl" has the meaning of example straight-chain $C_1$-$C_{40}$alkyl, especially straight-chain $C_1$-$C_{30}$alkyl, preferably straight-chain $C_1$-$C_{24}$alkyl, more preferably straight-chain $C_1$-$C_{16}$alkyl, most preferably straight-chain $C_1$-$C_{10}$alkyl and especially most preferably straight-chain $C_1$-$C_6$alkyl, very especially most preferably methyl, ethyl, propyl, butyl, pentyl or hexyl;

straight-chain $C_1$-$C_{10}$alkyl is for example methyl, ethyl, propyl, butyl, pentyl, hexyl, hepty, octyl, nonyl, decyl or undecyl;

straight-chain $C_1$-$C_{16}$alkyl is for example methyl, ethyl, propyl, butyl, pentyl, hexyl, hepty, octyl, nonyl, decyl or undecyl, dodecyl, tridecyl, tetradecyl, pentadecyl or hexadecyl.

"branched alkyl chain" has the meaning of example branched $C_3$-$C_{40}$alkyl, especially branched $C_3$-$C_{30}$alkyl, preferably branched $C_3$-$C_{20}$alkyl, more preferably branched $C_3$-$C_{16}$alkyl, most preferably branched $C_3$-$C_{10}$alkyl and especially most preferably branched $C_3$-$C_6$alkyl, which is branched $C_3$-$C_4$-$C_5$-$C_6$alkyl, very especially most preferably $C_3$-$C_6$alkyl isopropyl, sec.-butyl, tert.-butyl, isopentyl, dimethyl propyl, or 2-methylpentane, 3-methylpentane, 2,3-dimethylbutane, 2,2-dimethylbutane.

Branched $C_3$-$C_{10}$alkyl is for example isopropyl, sec.-butyl, tert.-butyl, isopentyl, dimethyl propyl, or 2-methylpentane, 3-methylpentane, 2,3-dimethylbutane, 2,2-dimethylbutane isoheptyl, isooctyl, isononyl, isodecyl.

Branched $C_3$-$C_{16}$alkyl is for example isopropyl, sec.-butyl, tert.-butyl, isopentyl, dimethyl propyl, or 2-methylpentane, 3-methylpentane, 2,3-dimethylbutane, 2,2-dimethylbutane, isoheptyl, isooctyl, isononyl, isodecyl, isoundecyl, isododecyl, isotridecyl, isotetradecyl, isopentadecyl or isohexadecyl.

Branched $C_3$-$C_{20}$alkyl is for example isopropyl, sec.-butyl, tert.-butyl, isopentyl, dimethyl propyl, or 2-methylpentane, 3-methylpentane, 2,3-dimethylbutane, 2,2-dimethylbutane, isoheptyl, isooctyl, isononyl, isodecyl, isoundecyl, isododecyl, isotridecyl, isotetradecyl, isopentadecyl, isohexadecyl, isoheptadecyl, isooctadecyl, isononadecyl, isoeicosyl.

Branched $C_3$-$C_{30}$alkyl is for example isopropyl, sec.-butyl, tert.-butyl, isopentyl, dimethyl propyl, or 2-methylpentane, 3-methylpentane, 2,3-dimethylbutane, 2,2-dimethylbutane, isoheptyl, isooctyl, isononyl, isodecyl, isoundecyl, isododecyl, isotridecyl, isotetradecyl, isopentadecyl, isohexadecyl, isoheptadecyl, isooctadecyl, isononadecyl, isoeicosyl, isoheneicosyl, isotricosyl, isotetracosy, isopentacosyl, isohexacosdy, isoheptacosyl, isooctacosyl, isononacosy or isotriacontyl.

Branched $C_3$-$C_{40}$alkyl is for example isopropyl, sec.-butyl, tert.-butyl, isopentyl, dimethyl propyl, or 2-methylpentane, 3-methylpentane, 2,3-dimethylbutane, 2,2-dimethylbutane, isoheptyl, isooctyl, isononyl, isodecyl, isoundecyl, isododecyl, isotridecyl, isotetradecyl, isopentadecyl, isohexadecyl, isoheptadecyl, isooctadecyl, isononadecyl, isoeicosyl, isoheneicosyl, isotricosyl, isotetracosy, isopentacosyl, isohexacosdy, isoheptacosyl, isooctacosyl, isononacosy or isotriacontyl or tetracontyl.

"alkylen" if used as single term has the meaning of $(C_1$-$C_{12})$alkylene, preferably $C_1$-$C_6$alkylen, which is branched, straight-chain, substituted, unsubstituted, uninterrupted or interrupted by a linking group, and an alicyclic group, such as cyclohexylen or a $C_{17}$-$C_{40}$ alicyclic group, or —Si($R^3$)$_2$— or —O—Si($R^3$)$_2$—, wherein $R^3$ is $C_1$-$C_{24}$alkylen is preferably at least one $C_1$-$C_6$alkyl, more preferably methyl, ethyl, propyl.

$C_1$-$C_6$alkylen is for example methylene, ethylene, propylene, isopropylene, sec-butylene, ter.-butylene, pentylene, isopentylene, hexylene, isohexylene.

$C_1$-$C_{30}$alkyl is preferably $C_1$-$C_{30}$alkyl, more preferably $C_1$-$C_{16}$alkyl, most preferably $C_1$-$C_{12}$alkyl and especially most preferred $C_1$-$C_6$alkyl, which is methyl, ethyl, propyl, isopropyl, butyl, isobutyl, pentyl, isopentyl, hexyl, isohexyl. $C_1$-$C_{30}$alkyl has the meaning of straight-chain $C_1$-$C_{30}$alkyl and branched $C_3$-$C_{30}$alkyl as described above within the all preferences given.

"alicyclic group" has the meaning of an unsubstituted or substituted steroidal skeleton such as a cholesterol group, which is uninterrupted or interrupted by at least a single heteroatom and/or at least a single bridging group, preferably, a cholesterol group is cholesteryl, cholestanyl, cholestan; or "alicyclic group" has the meaning of an organic chemical structure, which is, for example, cyclohexylene, especially 1,4-cyclohexylene.

"bridging group" has meaning of —O—, —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO, —S—CO—, —CO—S—, —SOO—, —OSO—, —SOS—, —O—CO—O, —CH$_2$—CH$_2$—, —OCH$_2$—, —CH$_2$CO—, —CH=CH—, —C≡C—, —CH=CH—COO—, —OCO—CH=CH—, —CH=N—, —C(CH$_3$)=N—, —N=N— or a single bond; or a cyclic, straight-chain or branched, substituted or unsubstituted $C_1$-$C_{24}$alkylen, wherein one or more C-atom, —CH— and/or —CH$_2$— group may independently from each other be replaced independently from each other by a linking group.

"linking group" has meaning of —O—, —CO, —CO—O—, —O—CO—,

—NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, or —Si(CH$_3$)$_2$—O—Si(CH$_3$)$_2$—, or a single bond and wherein:

R$^1$ represents a hydrogen atom or C$_1$-C$_6$alkyl;
with the proviso that oxygen atoms of linking groups are not directly linked to each other.

Preferably, the present invention relates a photoalignment composition comprising at least a single photoalignment polymer, which is preferably a homopolymer, comprising at least one photoreactive group.

In addition preferably, the present invention relates a photoalignment composition comprising at least a single photoalignment polymer, which comprises at least two monomers, wherein at least a first monomer comprises a photoreactive group; preferably the at least second monomer comprises a further photoreactive group, which is identical or different to the first monomer; or the at least second monomer does not comprise a photoreactive group and preferably comprises an aligning group exhibiting a property of controlling alignment of liquid crystal molecules without photo-irradiation within the meaning and preferences as described above.

Further more preferably, the present invention relates a photoalignment composition comprising at least a single photoalignment polymer, comprising at least one monomer having a photoreactive group and one monomer having an aligning group exhibiting a property of controlling alignment of liquid crystal molecules without photo-irradiation.

In addition more preferably, the present invention relates a photoalignment composition comprising at least a single photoalignment polymer, comprising at least two monomers having a photoreactive group, which is identical to the first monomer.

Further, more preferably, the present invention relates a photoalignment composition, comprising c) a further polymer not having a photoreactive group, which comprises a backbone which is a polyamic acid, a partially imidised polyamic acid, a polyimide, a polyamic acid ester or a polysiloxane.

In addition, further more preferred is a photoalignment composition with the meaning and preferences as given above which comprises a further polymer not having a photoreactive group and, which preferably has the same backbone as the photoalignment polymer; preferably the backbone is a polyamic acid, partially imidised polyamic acid, polyimide, polyamic acid ester, polysiloxane, polysiloxane derivative or mixtures thereof; more preferably the backbone is polyamic acid, partially imidised polyamic acid, polyimide and mixtures thereof; most preferably the backbone is polyamic acid; especially most preferably the backbone is more preferably the backbone is a polyamic acid, polyimide or a mixture thereof.

Preferably the present invention relates to a photoalignment composition, wherein the photoalignment polymer comprises a photoreactive group, which is preferably a dimerizable, isomerizable, decompositable, polymerizable and/or cross-linkable group; more preferably the photoreactive group is a cinnamate-, coumarine-, quinoline-, azo-, stilbene-, cyanostilbene-, chalcone-, diphenylacetylene-, benzylidenephtalimidine, benzylideneacetophenone, phenylenediacryloyl, stilbazole and/or azo-group;

most preferred are cinnamate-, coumarine-, quinoline-, cyanostilbene-, and/or chalcone-groups;

especially most preferred are cinnamate- or cyanostilbene groups, and more especially cinnamate groups are preferred.

More preferably the present invention relates to a photoalignment composition, comprising a) at least a single photoalignment polymer having a photoreactive group, c) and preferably a further polymer having preferably the same backbone as the photoalignment polymer, b) at least a single solvent of formula (I)

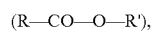

wherein R and R' are independently from each other a straight-chain alkyl; preferably a straight-chain a branched C$_1$-C$_6$alkyl chain; preferably a branched C$_1$-C$_6$alkyl, more preferably a branched C$_3$- or C$_4$alkyl, with the proviso that at least one alkyl chain is branched;

wherein the photoalignment polymer has a photoreactive group, which is a cinnamate-, coumarine-, quinoline-, azo-, stilbene- and/or cyanostilbene-group; especially photoalignment compounds which are herewith incorporated by reference: photoalignment materials as described in U.S. Pat. Nos. Re36,625, 6,201,087, 6,107,427, 6,335,409, 5,965,761, 6,277,502, 6,649,230, 6,833,421, 6,831,148, 7,514,514 7,750,185, 7,994,273, 8,436,132, 7,687,118, 6,340,506, 7,959,990, 8,173,749, US2011-0065859-A1, US-2010-0048849-A1, US2010-0266814 A1, US 2012-0316317 A1, US 2013-0035446 A1, US 2014-0162076 A1, US 2014-0192305 A1, US2014-0249244 A1, US2014-0342086 A1, US20140162076A1

Preferred is a photoalignment polymer as herewith incorporated by reference:

U.S. Re 36,625, claims 1-8, more preferred are those enumerated in examples 1-6 in col. 7, line 58—col. 33, line 8;

U.S. Pat. No. 6,107,427, claims, more preferred are those enumerated in examples 1-9;

U.S. Pat. No. 5,965,761, claims 1-7, more preferred are those enumerated in examples 1-6 in col. 9, line 9—col. 17, line 9;

U.S. Pat. No. 6,277,502, claims 1-4, more preferred are those enumerated in examples 1-5 in col. 8, line 55—col. 16, line 37;

U.S. Pat. No. 6,632,909, claims 1-6, more preferred are those enumerated in examples 1-7 in col. 9, line 50—col. 89, line 24;

U.S. Pat. No. 6,649,230, claims, more preferred are those enumerated in examples 1-4;

U.S. Pat. No. 6,833,421, claims, more preferred are those enumerated in examples 1-9;

U.S. Pat. No. 7,687,118, claims, more preferred are those enumerated in examples 1-18;

further preferred are those of U.S. Pat. Nos. 8,173,749, 8,329,823, and 8,557,922, wherein the photoalignment polymer comprises at least a diamine (I) or at least two diamines, and a tetracarboxylic acid anhydride

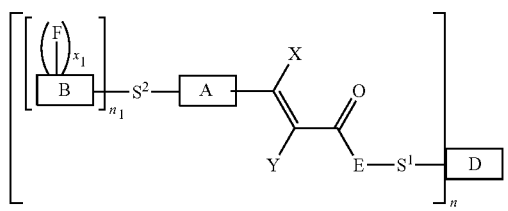

(I)

wherein,

A represents an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms;
and
wherein the following compound residue of formula (I), the compound residue (Ia)

(Ia)

represents a straight-chain or branched $C_1$-$C_{16}$fluoralkyl group, wherein

F is fluorine, and $x_1$ is an integer from 1 to 15, preferably an integer from 1 to 10; more preferably 1, 2, 3, 4, 5, 6, 7, 8 or 9 and most preferred 3, 4, 5 or 7;

B represents a straight-chain or branched $C_1$-$C_{16}$alkyl group, which is in addition to its fluorine substituent(s) unsubstituted or substituted by di-($C_1$-$C_{16}$alkyl)amino, $C_1$-$C_6$alkyloxy, nitro, cyano and/or chlorine; and wherein one or more —CH$_2$— group may independently from each other be replaced by a linking group;

D represents an unsubstituted or substituted, aliphatic, aromatic and/or alicyclic diamine group having from 1 to 40 carbon atoms;

preferably D represents an unsubstituted or substituted, aliphatic, aromatic and/or alicyclic diamine group having from 1 to 40 carbon atoms, wherein the diamine group comprises an aliphatic group, which may comprise one or more heteroatom and/or bridging group;
and/or an aromatic group;
and/or an alicyclic group;

E represents an aromatic group, an oxygen atom, a sulphur atom, —NH—, —N($C_1$-$C_6$alkyl)-, —CR$^2$R$^3$,
wherein R$^2$ and R$^3$ are independently from each other hydrogen or a cyclic, straight-chain or branched, substituted or unsubstituted $C_1$-$C_{24}$alkyl, wherein one or more —CH$_2$— group(s) may be independently from each other replaced by a linking group, and with the proviso that at least one of R$^2$ and R$^3$ is not hydrogen;

S$^1$, S$^2$ each independently from each other represents a spacer unit;

X, Y each independently from each other represents hydrogen, fluorine, chlorine, cyano, unsubstituted or with fluorine substituted $C_1$-$C_{12}$alkyl, in which one or more —CH$_2$— groups may be replaced by a linking group;

n, n1 each independently from each other represents 1, 2, 3 or 4, preferably n1 is 1 and n is 1 or 2;

with the proviso that if n is 2, 3, or 4, each A, B, $x_1$, E, S$^1$, S$^2$, X, Y are identical or different; and if n1 is 2, 3 or 4 each B, $x_1$ is identical or different;

preferably, wherein, if n>1, compound (I) has several side-chains [wherein side-chain has the meaning of structures (I) without the group D], which are linked to residue D at one atomic position within group D, e.g. two or three side chains linked to one single carbon atom within group D, or they can be linked to group D at different atomic positions within group D, e.g. at adjacent atomic positions within group D, or/and they can linked spaced further apart.

In addition, most preferred is a photoalignment composition which comprises
a) at least a single photoalignment polymer, which is a polymer comprising a diamine (I) and tetracarboxylic acid dianhydride as basic building blocks, and more preferably wherein the polymer is selected from a polyamic acid, polyamic ester, polyimide or a mixture thereof, and most preferably wherein the polymer is a polyamic acid;
c) and preferably a further polymer, which is a polymer comprising a diamine (I) tetracarboxylic acid dianhydride as basic building blocks, and more preferably wherein the polymer is selected from a polyamic acid, polyamic ester, polyimide or a mixture thereof, and most preferably wherein the polymer is a polyamic acid;
b) at least a single solvent of formula (I)

(R—CO—O—R'), wherein R and R' are independently from each other a straight-chain alkyl; preferably a straight-chain a branched $C_1$-$C_6$alkyl chain; more preferably a branched $C_1$-$C_6$alkyl chain, most preferably a branched $C_3$-, $C_4$-, $C_5$-, $C_6$alkyl chain, especially most preferably a branched $C_4$alkyl chain; with the proviso that at least one alkyl chain is branched.

In the context of the present invention the term "polyimide" has the meaning of partially or full imidisated polyamic acid or polyamic ester. In analogy, the term "imidisation" has in the context of the present invention the meaning of partially or complete imidisation.

Further more preferred is diamine (I), wherein
the linking group is selected from —O—, —CO, —CO—O—, —O—CO—,

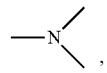

—NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O—, and —Si(CH$_3$)$_2$—O—Si(CH$_3$)$_2$—, and wherein:
R$^1$ represents a hydrogen atom or $C_1$-$C_6$alkyl;
with the proviso that oxygen atoms of linking groups are not directly linked to each other.

Further more preferred is diamine (I), wherein
the spacer unit is a single bond, a cyclic, straight-chain or branched, substituted or unsubstituted $C_1$-$C_{24}$alkylen, wherein one or more —CH$_2$— group may independently from each other be replaced by a linking group as described above and/or an non-aromatic, aromatic, unsubstituted or substituted carbocyclic or heterocyclic group connected via bridging groups.

Further more preferred is the diamine (I), wherein the bridging group is selected from —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO, —S—CO—, —CO—S—, —SOO—, —OSO—, —SOS—, —O—CO—O, —CH$_2$—CH$_2$—, —OCH$_2$—, —CH$_2$CO—, —CH=CH—, —C≡C—, —CH=CH—COO—, —OCO—CH=CH—, —CH=N—, —C(CH$_3$)=N—, —N=N— or a single bond; or a cyclic, straight-chain or branched, substituted or unsubstituted C$_1$-C$_{24}$alkylen, wherein one or more —CH$_2$— group may independently from each other be replaced independently from each other by a linking group as described above.

Further more preferred is the diamine (I), wherein D is preferably selected from formula (III):

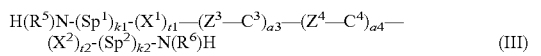
(III)

wherein:
R$^5$, R$^6$ each independently from each other represents a hydrogen atom or C$_1$-C$_6$alkyl;
Sp$^1$, Sp$^2$ each independently from each other represents an unsubstituted or substituted straight-chain or branched C$_1$-C$_{20}$alkylene, in which one or more —CH$_2$-group may independently from each other be replaced by a linking group, and
k$^1$, k$^2$ each independently is an integer having a value of 0 or 1; and
X$^1$, X$^2$ each independently represents a linking spacer, and
t$^1$, t$^2$ each independently is an integer having a value of 0 or 1; and
C$^3$, C$^4$ each independently represents a non-aromatic, aromatic, substituted or unsubstituted carbocyclic or heterocyclic group, which may have a side chain T, and
Z$^3$ represents a bridging group; and
Z$^4$ represents a substituted or unsubstituted straight-chain or branched C$_1$-C$_{20}$alkylene group, in which one or more —CH$_2$— group may independently from each other be replaced by a non-aromatic, aromatic, unsubstituted or substituted carbocyclic or heterocyclic group; and/or a heteroatom and/or by a bridging group; and
a$_3$, a$_4$ are independently integers from 0 to 3, such that a$_3$+a$_4$≤4; and wherein
D is at least once linked to at least one group S$^1$ in formula (I) via group Sp$^1$ and/or group Sp$^2$; and/or linked via at least one non-aromatic, aromatic, substituted or unsubstituted carbocyclic or heterocyclic group of C$^3$ and/or group of C$^4$, and/or linked via at least one side chain T of group C$^4$ and/or group of C$^3$; and/or linked via group Z$^4$; and at least one of k$^1$, k$^2$, a$^3$ and a$^4$ is not equal to zero; and wherein
linking group and bridging group are as defined above.
Further more preferred is the diamine (I), wherein the side chain, T, represents a substituted or unsubstituted straight-chain or branched C$_1$-C$_{20}$alkylene group, in which one or more —CH$_2$— group(s) may independently from each other be replaced by a non-aromatic, aromatic, unsubstituted or substituted carbocyclic or heterocyclic group, or a heteroatom and/or by a bridging group, which is at least once linked to at least once group S$^1$ in formula (I) as described above;

Further more preferred is the photoalignment polymer of U.S. Pat. Nos. 8,173,749, 8,329,823, and 8,557,922, composed of at least one diamine compound (I) or at least two different diamine of formula (I), wherein
C$^3$, C$^4$ independently from each other are selected from a compound of group G$^2$, wherein G$^2$ is:

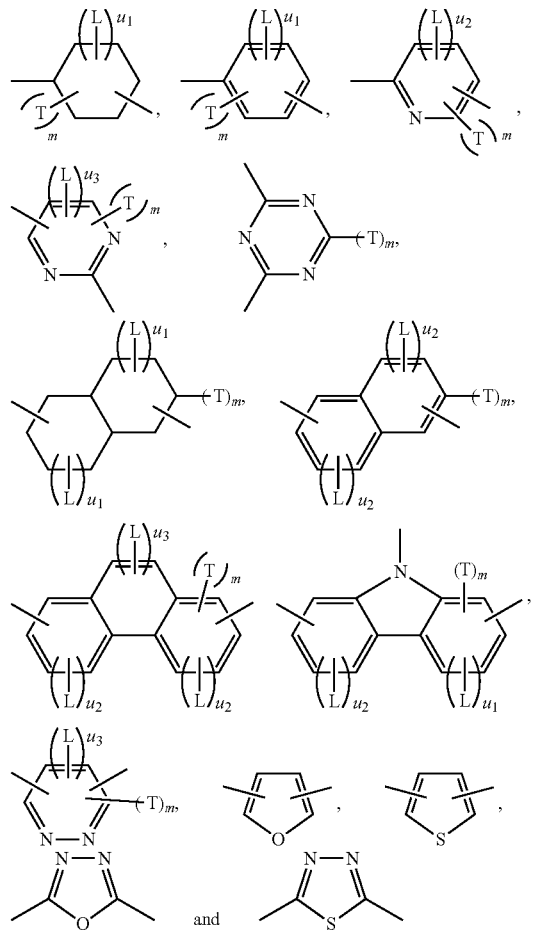

wherein:
"—" denotes the connecting bonds of C$^3$ and C$^4$ to the adjacent groups of compound of formula (III) as described above; and
L is —CH$_3$, —COCH$_3$, —OCH$_3$, nitro, cyano, halogen, CH$_2$=CH—, CH$_2$=C(CH$_3$)—, CH$_2$=CH—(CO)O—, CH$_2$=CH—O—, —NR$^5$R$^6$, CH$_2$=C(CH$_3$)—(CO)O—, CH$_2$=C(CH$_3$)—O—,
wherein:
R$^5$, R$^6$ each independently from each other represents a hydrogen atom or C$_1$-C$_6$alkyl;
T represents a substituted or unsubstituted straight-chain or branched C$_1$-C$_{20}$alkylene group, in which one or more —CH$_2$— group may independently from each other be replaced by a non-aromatic, aromatic, unsubstituted or substituted carbocyclic or heterocyclic group, or a heteroatom and/or by a bridging group;
m is an integer from 0 to 2;
u$_1$ is an integer from 0 to 4, with the proviso that m+u$_1$ is ≤4; and
u$_2$ is an integer from 0 to 3; with the proviso that m+u$_2$ is ≤3; and
u$_3$ is an integer from 0 to 2; with the proviso that m+u$_3$ is ≤2.
Further more preferred is diamine (I), wherein D is a selected the group of the following compounds:

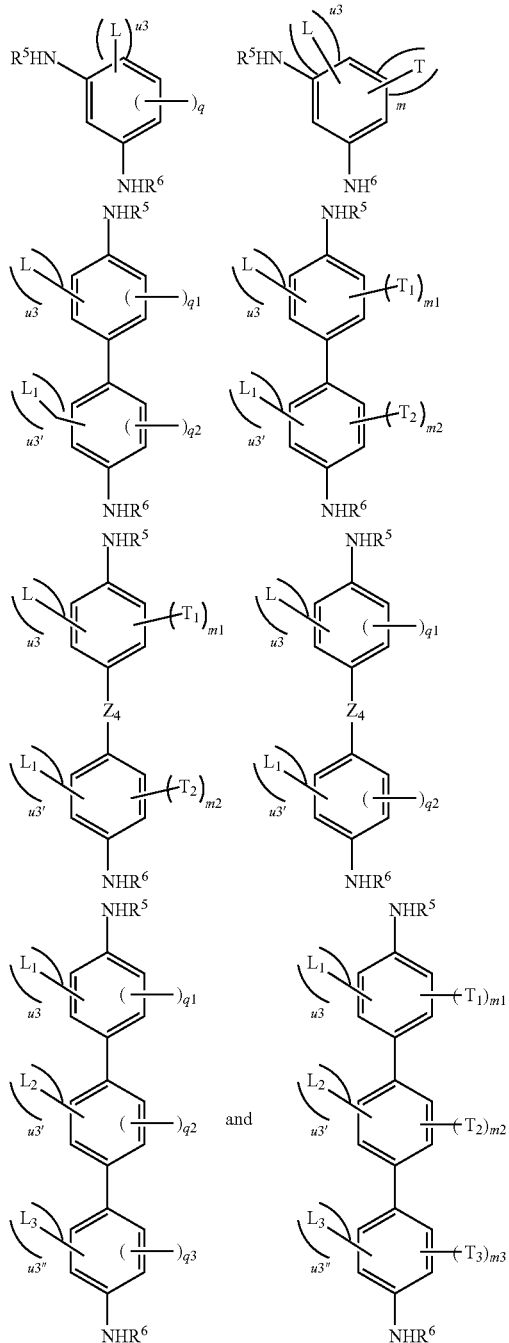

wherein

L, $L_1$, $L_2$ and $L_3$ are independently from each other —$CH_3$, —$COCH_3$, —$OCH_3$, nitro, cyano, halogen, $CH_2$=CH—, $CH_2$=C($CH_3$)—, $CH_2$=CH—(CO)O—, $CH_2$=CH—O—, —$NR^5R^6$, $CH_2$=C($CH_3$)—(CO)O— or $CH_2$=C($CH_3$)—O—, T, $T_1$, $T_2$ and $T_3$ are independently from each other a substituted or unsubstituted straight-chain or branched $C_1$-$C_{20}$alkylene group, in which one or more —$CH_2$— group(s) may independently from each other be replaced by a non-aromatic, aromatic, unsubstituted or substituted carbocyclic or heterocyclic group, and/or a heteroatom and/or by a bridging group;

"——" is a single bond, q is an integer of 1 or 2; and q1, q2 and q3 are independently from each other an integer from 0 to 2;

m is an integer of 1 or 2;

m1, m2 and m3 are independently from each other an integer from 0 to 2;

$u_3$, $u_{3'}$ and $u_{3''}$ are independently from each other an integer from 0 to 2;

$R^5$, $R^6$ each independently from each other represents a hydrogen atom or $C_1$-$C_6$alkyl and;

$Z^4$ represents a substituted or unsubstituted straight-chain or branched $C_1$-$C_{20}$alkylene group, in which one or more —$CH_2$— group may independently from each other be replaced by a non-aromatic, aromatic, unsubstituted or substituted carbocyclic or heterocyclic group; and/or a heteroatom and/or by a bridging group; and wherein D is at least once linked to at least one group $S^1$ in formula (I), as described in claim 1, via a single bond "——"; or via a side chain T, $T_1$, $T_2$ or $T_3$; or via group $Z^4$;

with the proviso that u3+q, or u3+m is ≤4;

u3+q1 and/or u3'+q2 or/and u3+m1, or/and u3'+m2, or/and u3"+q3, or/and u3"+m3 is ≤4;

q1+q2, and m1+m2; and q1+q2+q3, and m1+m2+m3 is ≥1;

Further more preferred is the diamine compound (I), wherein the following compound residue of formula (Ia)

(Ia)

represents a straight-chain or branched $C_1$-$C_{16}$fluoralkyl group with terminal units selected from —$CF_2H$ and —$CF_3$.

Further more preferred is the diamine compound (I), wherein $S^1$, $S^2$ each independently from each other represents a single bond or a cyclic, straight-chain or branched, substituted or unsubstituted $C_1$-$C_{24}$alkylen, in which one or more —$CH_2$— group may independently from each other be replaced by a linking group, and/or a non-aromatic, aromatic, unsubstituted or substituted carbocyclic or heterocyclic group of formula (IV):

$$—(Z^1—C^1)_{a1}—(Z^2C^2)_{a2}—(Z^{1a})_{a3}— \quad (IV)$$

wherein:

$C^1$, $C^2$ each independently represents a non-aromatic, aromatic, unsubstituted or substituted carbocyclic or heterocyclic group, and $Z^1$, $Z^2$, $Z^{1a}$ each independently represents a bridging group, and $a_1$, $a_2$, $a_3$ each independently represents an integer from 0 to 3, $a_1+a_2+a_3≤6$, wherein the bridging groups $Z^1$, $Z^{1a}$ and $Z^2$ are as above.

Most preferred is the photoalignment polymer of U.S. Pat. Nos. 8,173,749, 8,329,823, and 8,557,922, disclosed in examples 1 to 20;

especially most preferred are photoalignment polymer composed from tetracarboxylic acid anhydride and at least one diamine compound of formulae (VI), (VII), (VIII), (IX), (X), (XI), (XIa) or (XIb) or at least two diamine compound of formulae (VI), (VII), (VIII), (IX), (X), (XI), (XIa) or (XIb)

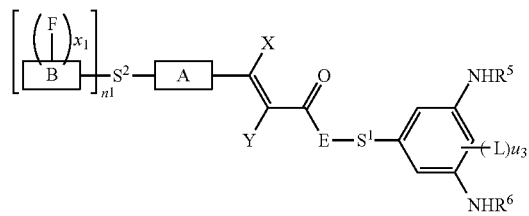
(VI)
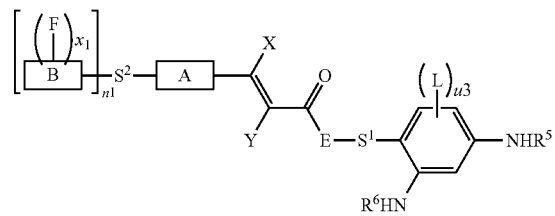
(VII)
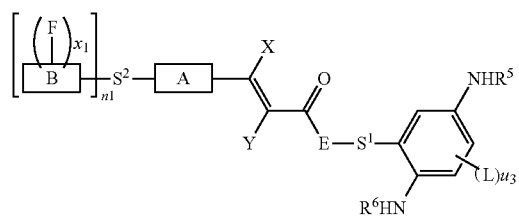
(VIII)
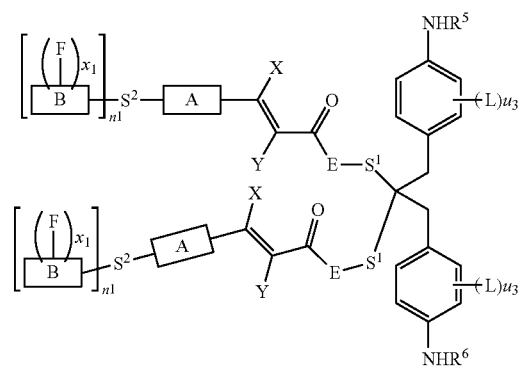
(IX)
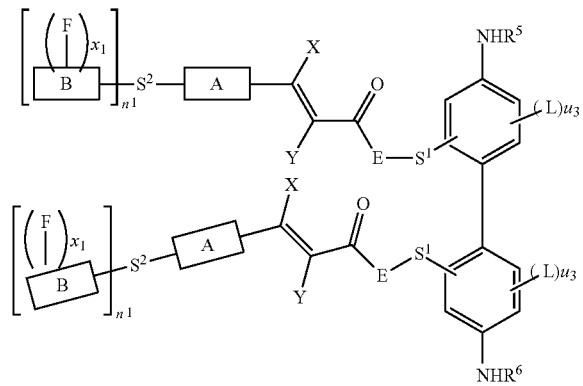
(X)
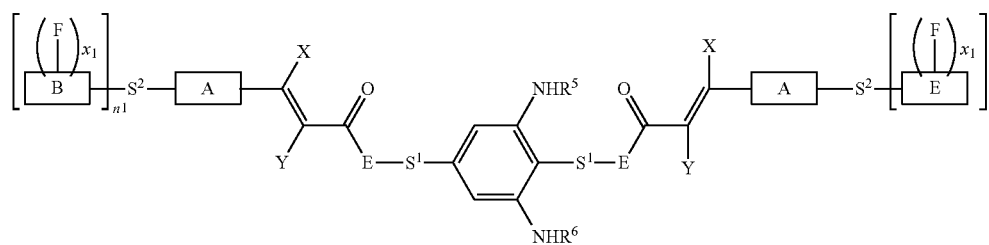
(XI)

-continued

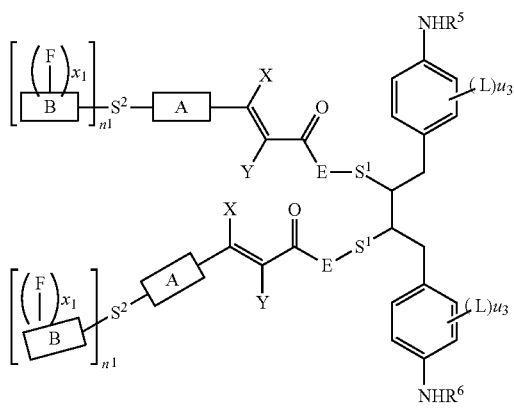
(XIa)

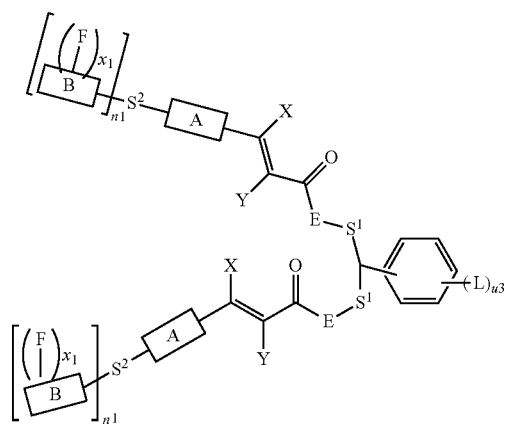
(XIb)

wherein
A, B, $x_1$, n, n1, D, E, $S^2$, $S^1$, X and Y have the above given meanings as in claim 1 and $R^5$, $R^6$ and $Z^4$ have the same meanings as given above;

L is —$CH_3$, —$OCH_3$, —$COCH_3$, nitro, cyano, halogen, $CH_2$=CH—, $CH_2$=C($CH_3$)—, $CH_2$=CH—(CO)O—, $CH_2$=CH—O—, $CH_2$=C($CH_3$)—(CO)O—, or $CH_2$=C($CH_3$)—O—, $u_3$ is an integer from 0 to 2;

and preferably from
diamine of formula (XII)

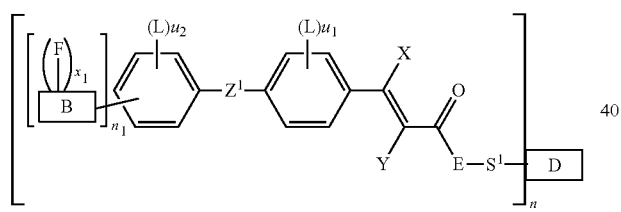
(XII)

wherein $x_1$, B, n, n1, D, E, $S^1$, X, Y, $Z^1$, L, $u_1$ and $u_2$ have the same meanings as given above;

and more preferably from
at least one diamine compound or at least two diamine compounds selected from the chemical formulas given below:

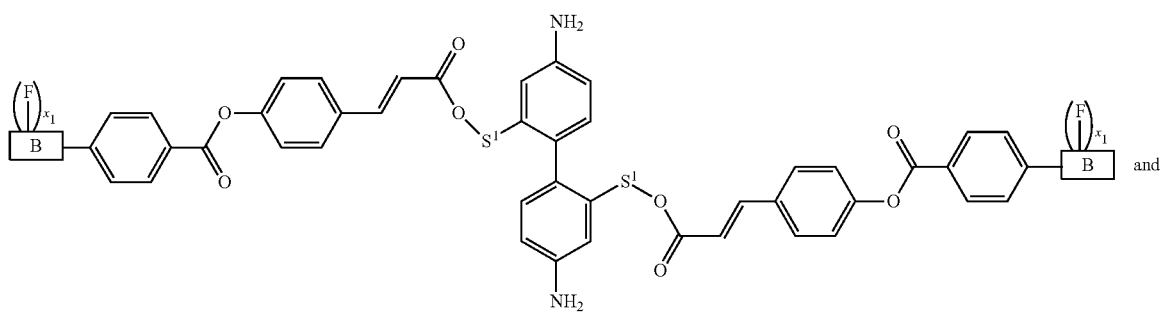
and

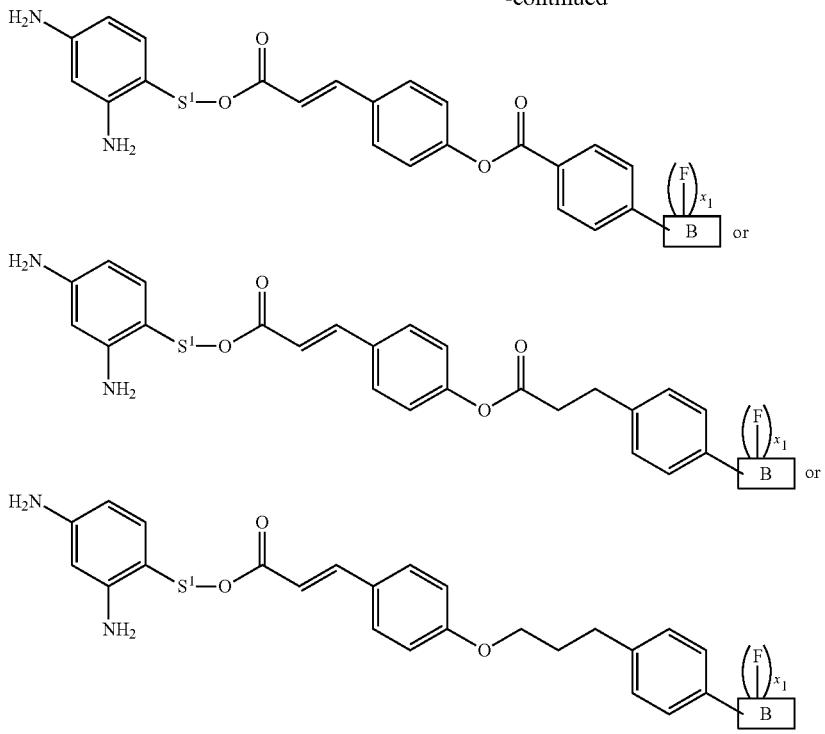

wherein $S^1$ has the above given meaning as in claim and wherein the following compound residue

represents a straight-chain or branched $C_1$-$C_8$ fluoralkyl group, wherein
F is fluorine, and
$x_1$ is an integer from 1 to 9,
B represents a straight-chain or branched $C_1$-$C_8$ alkyl group, which is unsubstituted or in addition to its fluorine substituent(s) substituted by di-($C_1$-$C_{16}$ alkyl)amino, $C_1$-$C_6$ alkyloxy, nitro, cyano and/or chlorine; and wherein one or more —$CH_2$— group may independently be replaced by a linking group selected from —O—, —CO—, —CO—O—, —O—CO—, —$NR^1$—, —$NR^1$—CO—, —CO—$NR^1$— and —CH=CH—, wherein:
$R^1$ represents a hydrogen atom or $C_1$-$C_6$ alkyl;
with the proviso that oxygen atoms are not directly linked to each other;
and wherein the $C_1$-$C_8$ fluoralkyl group has terminal units selected from —$CF_2H$, —$CF_3$.

Most especially preferred photoalignment polymers are polymers composed of at least one diamine of:
6-{[((2E)-3-{4-[(4-(4,4,4-trifluorobutoxy)benzoyl)oxy]phenyl}prop-2-enoyl)oxy]}hexyl 3,5-diaminobenzoate
6-{[((2E)-3-{4-[(4-(4,4,4-trifluorobutoxy)benzoyl)oxy]phenyl}prop-2-enoyl)oxy]}hexyl 3,5-diaminobenzoate
2-{[((2E)-3-{4-[(4-(trifluoroethoxy)benzoyl)oxy]phenyl}prop-2-enoyl)oxy]}ethyl 3,5-diaminobenzoate
3-{[((2E)-3-{4-[(4-(trifluoroethoxy)benzoyl)oxy]phenyl}prop-2-enoyl)oxy]}propyl 3,5-diaminobenzoate
4-{[((2E)-3-{4-[(4-(trifluoroethoxy)benzoyl)oxy]phenyl}prop-2-enoyl)oxy]}butyl 3,5-diaminobenzoate
5-{[((2E)-3-{4-[(4-(trifluoroethoxy)benzoyl)oxy]phenyl}prop-2-enoyl)oxy]}pentyl 3,5-diaminobenzoate
7-{[((2E)-3-{4-[(4-(trifluoroethoxy)benzoyl)oxy]phenyl}prop-2-enoyl)oxy]}heptyl 3,5-diaminobenzoate
8-{[((2E)-3-{4-[(4-(trifluoroethoxy)benzoyl)oxy]phenyl}prop-2-enoyl)oxy]}octyl 3,5-diaminobenzoate
11-{[((2E)-3-{4-[(4-(trifluoroethoxy)benzoyl)oxy]phenyl}prop-2-enoyl)oxy]} undecyl 3,5-diaminobenzoate
2-{[((2E)-3-{4-[(4-(trifluoromethoxy)benzoyl)oxy]phenyl}prop-2-enoyl)oxy]}ethyl 3,5-diaminobenzoate
3-{[((2E)-3-{4-[(4-(trifluoromethoxy)benzoyl)oxy]phenyl}prop-2-enoyl)oxy]}propyl 3,5-diaminobenzoate
4-{[((2E)-3-{4-[(4-(trifluoromethoxy)benzoyl)oxy]phenyl}prop-2-enoyl)oxy]}butyl 3,5-diaminobenzoate
5-{[((2E)-3-{4-[(4-(trifluoromethoxy)benzoyl)oxy]phenyl}prop-2-enoyl)oxy]}pentyl 3,5-diaminobenzoate
6-{[((2E)-3-{4-[(4-(trifluoromethoxy)benzoyl)oxy]phenyl}prop-2-enoyl)oxy]}hexyll 3,5-diaminobenzoate
7-{[((2E)-3-{4-[(4-(trifluoromethoxy)benzoyl)oxy]phenyl}prop-2-enoyl)oxy]}heptyl 3,5-diaminobenzoate
8-{[((2E)-3-{4-[(4-(trifluoromethoxy)benzoyl)oxy]phenyl}prop-2-enoyl)oxy]}octyl 3,5-diaminobenzoate
2-{[((2E)-3-{4-[(4-(trifluoromethyl)benzoyl)oxy]phenyl}prop-2-enoyl)oxy]}ethyl 3,5-diaminobenzoate
3-{[((2E)-3-{4-[(4-(trifluoromethyl)benzoyl)oxy]phenyl}prop-2-enoyl)oxy]}propyl 3,5-diaminobenzoate
4-{[((2E)-3-{4-[(4-(trifluoromethyl)benzoyl)oxy]phenyl}prop-2-enoyl)oxy]}butyl 3,5-diaminobenzoate
5-{[((2E)-3-{4-[(4-(trifluoromethyl)benzoyl)oxy]phenyl}prop-2-enoyl)oxy]}pentyl 3,5-diaminobenzoate
6-{[((2E)-3-{4-[(4-(trifluoromethyl)benzoyl)oxy]phenyl}prop-2-enoyl)oxy]}hexyll 3,5-diaminobenzoate 8-{[((2E)-3-{4-[(4-(trifluoromethyl)benzoyl)oxy]phenyl}prop-2-enoyl)oxy]}octyl 3,5-diaminobenzoate
11-{[((2E)-3-{4-[(4-(trifluoromethyl)benzoyl)oxy]phenyl}prop-2-enoyl)oxy]}undecyll 3,5-diaminobenzoate
2-[2-{[((2E)-3-{4-[(4-(trifluoroethoxy)benzoyl)oxy]phenyl}prop-2-enoyl)oxy]}ethoxy]ethyl 3,5-diaminobenzoate
2{2-[2-{[((2E)-3-{4-[(4-(trifluoroethoxy)benzoyl)oxy]phenyl}prop-2-enoyl)oxy]}ethoxy]ethoxy}ethyl 3,5-diaminobenzoate
2,2-dimethyl-3-{[((2E)-3-{4-[(4-(trifluoroethoxy)benzoyl)oxy]phenyl}prop-2-enoyl)oxy]}propyl 3,5-diaminobenzoate
2-{[((2E)-3-{4-[(4-(3,3,3-trifluoropropoxy)benzoyl)oxy]phenyl}prop-2-enoyl)oxy]}ethyl 3,5-diaminobenzoate
3-{[((2E)-3-{4-[(4-(3,3,3-trifluoropropoxy)benzoyl)oxy]phenyl}prop-2-enoyl)oxy]}propyl 3,5-diaminobenzoate
4-{[((2E)-3-{4-[(4-(3,3,3-trifluoropropoxy)benzoyl)oxy]phenyl}prop-2-enoyl)oxy]}butyl 3,5-diaminobenzoate.
6-{[((2E)-3-{4-[(4-(3,3,3-trifluoropropoxy)benzoyl)oxy]phenyl}prop-2-enoyl)oxy]}hexyl 3,5-diaminobenzoate
7-{[((2E)-3-{4-[(4-(3,3,3-trifluoropropoxy)benzoyl)oxy]phenyl}prop-2-enoyl)oxy]}heptyl 3,5-diaminobenzoate
8-{[((2E)-3-{4-[(4-(3,3,3-trifluoropropoxy)benzoyl)oxy]phenyl}prop-2-enoyl)oxy]}octyl 3,5-diaminobenzoate
11-{[((2E)-3-{4-[(4-(3,3,3-trifluoropropoxy)benzoyl)oxy]phenyl}prop-2-enoyl)oxy]} undecyl 3,5-diaminobenzoate
2-[2-{[((2E)-3-{4-[(4-(3,3,3-trifluoropropoxy)benzoyl)oxy]phenyl}prop-2-enoyl)oxy]}ethoxy]ethyl 3,5-diaminobenzoate
2{2-[2-{[((2E)-3-{4-[(4-(3,3,3-trifluoropropoxy)benzoyl)oxy]phenyl}prop-2-enoyl)oxy]}ethoxy]ethoxy}ethyl 3,5-diaminobenzoate
2,2-dimethyl-3-{[((2E)-3-{4-[(4-(3,3,3-trifluoropropoxy)benzoyl)oxy]phenyl}prop-2-enoyl)oxy]}propyl 3,5-diaminobenzoate
2-{[((2E)-3-{4-[(4-(4,4,4-trifluorobutoxy)benzoyl)oxy]phenyl}prop-2-enoyl)oxy]}ethyl 3,5-diaminobenzoate
3-{[((2E)-3-{4-[(4-(4,4,4-trifluorobutoxy)benzoyl)oxy]phenyl}prop-2-enoyl)oxy]}propyl 3,5-diaminobenzoate
4-{[((2E)-3-{4-[(4-(4,4,4-trifluorobutoxy)benzoyl)oxy]phenyl}prop-2-enoyl)oxy]}butyl 3,5-diaminobenzoate
5-{[((2E)-3-{4-[(4-(4,4,4-trifluorobutoxy)benzoyl)oxy]phenyl}prop-2-enoyl)oxy]}pentyl 3,5-diaminobenzoate
7-{[((2E)-3-{4-[(4-(4,4,4-trifluorobutoxy)benzoyl)oxy]phenyl}prop-2-enoyl)oxy]}heptyl 3,5-diaminobenzoate
8-{[((2E)-3-{4-[(4-(4,4,4-trifluorobutoxy)benzoyl)oxy]phenyl}prop-2-enoyl)oxy]}octyl 3,5-diaminobenzoate
11-{[((2E)-3-{4-[(4-(4,4,4-trifluorobutoxy)benzoyl)oxy]phenyl}prop-2-enoyl)oxy]} undecyl 3,5-diaminobenzoate
2-[2-{[((2E)-3-{4-[(4-(4,4,4-trifluorobutoxy)benzoyl)oxy]phenyl}prop-2-enoyl)oxy]}ethoxy]ethyl 3,5-diaminobenzoate
2{2-[2-{[((2E)-3-{4-[(4-(4,4,4-trifluorobutoxy)benzoyl)oxy]phenyl}prop-2-enoyl)oxy]}ethoxy]ethoxy}ethyl 3,5-diaminobenzoate
2,2-dimethyl-3-{[((2E)-3-{4-[(4-(4,4,4-trifluorobutoxy)benzoyl)oxy]phenyl}prop-2-enoyl)oxy]}propyl 3,5-diaminobenzoate
2-{[((2E)-3-{4-[(4-(5,5,5-trifluoropentoxy)benzoyl)oxy]phenyl}prop-2-enoyl)oxy]}ethyl 3,5-diaminobenzoate
3-{[((2E)-3-{4-[(4-(5,5,5-trifluoropentoxy)benzoyl)oxy]phenyl}prop-2-enoyl)oxy]}propyl 3,5-diaminobenzoate
4-{[((2E)-3-{4-[(4-(5,5,5-trifluoropentoxy)benzoyl)oxy]phenyl}prop-2-enoyl)oxy]}butyl 3,5-diaminobenzoate
5-{[((2E)-3-{4-[(4-(5,5,5-trifluoropentoxy)benzoyl)oxy]phenyl}prop-2-enoyl)oxy]}pentyl 3,5-diaminobenzoate
6-{[((2E)-3-{4-[(4-(5,5,5-trifluoropentoxy)benzoyl)oxy]phenyl}prop-2-enoyl)oxy]}hexyl 3,5-diaminobenzoate
8-{[((2E)-3-{4-[(4-(5,5,5-trifluoropentoxy)benzoyl)oxy]phenyl}prop-2-enoyl)oxy]}octyl 3,5-diaminobenzoate
11-{[((2E)-3-{4-[(4-(5,5,5-trifluoropentoxy)benzoyl)oxy]phenyl}prop-2-enoyl)oxy]} undecyl 3,5-diaminobenzoate
2-[2-{[((2E)-3-{4-[(4-(5,5,5-trifluoropentoxy)benzoyl)oxy]phenyl}prop-2-enoyl)oxy]}ethoxy]ethyl 3,5-diaminobenzoate
2{2-[2-{[((2E)-3-{4-[(4-(5,5,5-trifluoropentoxy)benzoyl)oxy]phenyl}prop-2-enoyl)oxy]}ethoxy]ethoxy}ethyl 3,5-diaminobenzoate
2,2-dimethyl-3-{[((2E)-3-{4-[(4-(5,5,5-trifluoropentoxy)benzoyl)oxy]phenyl}prop-2-enoyl)oxy]}propyl 3,5-diaminobenzoate
2-{[((2E)-3-{4-[(4-(6,6,6-trifluorohexyloxy)benzoyl)oxy]phenyl}prop-2-enoyl)oxy]}ethyl 3,5-diaminobenzoate
3-{[((2E)-3-{4-[(4-(6,6,6-trifluorohexyloxy)benzoyl)oxy]phenyl}prop-2-enoyl)oxy]}propyl 3,5-diaminobenzoate
4-{[((2E)-3-{4-[(4-(6,6,6-trifluorohexyloxy)benzoyl)oxy]phenyl}prop-2-enoyl)oxy]}butyl 3,5-diaminobenzoate
5-{[((2E)-3-{4-[(4-(6,6,6-trifluorohexyloxy)benzoyl)oxy]phenyl}prop-2-enoyl)oxy]}pentyl 3,5-diaminobenzoate
7-{[((2E)-3-{4-[(4-(6,6,6-trifluorohexyloxy)benzoyl)oxy]phenyl}prop-2-enoyl)oxy]}heptyl 3,5-diaminobenzoate
8-{[((2E)-3-{4-[(4-(6,6,6-trifluorohexyloxy)benzoyl)oxy]phenyl}prop-2-enoyl)oxy]}octyl 3,5-diaminobenzoate
11-{[((2E)-3-{4-[(4-(6,6,6-trifluorohexyloxy)benzoyl)oxy]phenyl}prop-2-enoyl)oxy]} undecyl 3,5-diaminobenzoate
2-[2-{[((2E)-3-{4-[(4-(6,6,6-trifluorohexyloxy)benzoyl)oxy]phenyl}prop-2-enoyl)oxy]}ethoxy]ethyl 3,5-diaminobenzoate
2{2-[2-{[((2E)-3-{4-[(4-(6,6,6-trifluorohexyloxy)benzoyl)oxy]phenyl}prop-2-enoyl)oxy]}ethoxy]ethoxy}ethyl 3,5-diaminobenzoate
2,2-dimethyl-3-{[((2E)-3-{4-[(4-(6,6,6-trifluorohexyloxy)benzoyl)oxy]phenyl}prop-2-enoyl)oxy]}propyl 3,5-diaminobenzoate
3-{[((2E)-3-{4-[(3-methoxy 4-(3,3,3-trifluoropropoxy)benzoyl)oxy]phenyl}prop-2-enoyl)oxy]}propyl 3,5-diaminobenzoate
8-{[((2E)-3-{4-[(3-methoxy 4-(3,3,3-trifluoropropoxy)benzoyl)oxy]phenyl}prop-2-enoyl)oxy]}octyl 3,5-diaminobenzoate
11-{[((2E)-3-{4-[(3-methoxy 4-(3,3,3-trifluoropropoxy)benzoyl)oxy]phenyl}prop-2-enoyl)oxy]} undecyl 3,5-diaminobenzoate
6-{[((2E)-3-{4-[(3-methoxy 4-(4,4,4-trifluorobutoxy)benzoyl)oxy]phenyl}prop-2-enoyl)oxy]}hexyll 3,5-diaminobenzoate
8-{[((2E)-3-{4-[(3-methoxy 4-(4,4,4-trifluorobutoxy)benzoyl)oxy]phenyl}prop-2-enoyl)oxy]}octyl 3,5-diaminobenzoate
11-{[((2E)-3-{4-[(3-methoxy 4-(4,4,4-trifluorobutoxy)benzoyl)oxy]phenyl}prop-2-enoyl)oxy]} undecyl 3,5-diaminobenzoate
4-{[((2E)-3-{4-[(3-methoxy 4-(5,5,5-trifluoropentoxy)benzoyl)oxy]phenyl}prop-2-enoyl)oxy]}butyl 3,5-diaminobenzoate 6-{[((2E)-3-{4-[(3-methoxy 4-(5,5,5-trifluoropentoxy)benzoyl)oxy]phenyl}prop-2-enoyl)oxy]}hexyl3,5-diaminobenzoate 4-{[((2E)-3-{4-[(3-methoxy 4-(6,6,6-trifluorohexyloxy)benzoyl)oxy]phenyl}prop-2-enoyl)oxy]}butyl 3,5-diaminobenzoate 6-{[((2E)-3-{4-[(3-methoxy 4-(6,6,6-trifluorohexyloxy)benzoyl)oxy]phenyl}prop-2-enoyl)oxy]}hexyl 3,5-diaminobenzoate 2-{[((2E)-3-{4-[(4-(4,4,5,5,5-pentafluoropentoxy)benzoyl)oxy]phenyl}prop-2-enoyl)oxy]}ethyl 3,5-diaminobenzoate 3-{[((2E)-3-{4-[(4-(4,4,5,5,5-pentafluoropentoxy)benzoyl)oxy]phenyl}prop-2-enoyl)oxy]}propyl 3,5-diaminobenzoate 4-{[((2E)-3-{4-[(4-(4,4,5,5,5-pentafluoropentoxy)benzoyl)oxy]phenyl}prop-2-enoyl)oxy]}butyl 3,5-diaminobenzoate 6-{[((2E)-3-{4-[(4-(4,4,5,5,5-pentafluoropentoxy)benzoyl)oxy]phenyl}prop-2-enoyl)oxy]}hexyl 3,5-diaminobenzoate 7-{[((2E)-3-{4-[(4-(4,4,5,5,5-pentafluoropentoxy)benzoyl)oxy]phenyl}prop-2-enoyl)oxy]}heptyl 3,5-diaminobenzoate 8-{[((2E)-3-{4-[(4-(4,4,5,5,5-pentafluoropentoxy)benzoyl)oxy]phenyl}prop-2-enoyl)oxy]}octyl 3,5-diaminobenzoate 11-{[((2E)-3-{4-[(4-(4,4,5,5,5-pentafluoropentoxy)benzoyl)oxy]phenyl}prop-2-enoyl)oxy]} undecyl 3,5-diaminobenzoate 2-[2-{[((2E)-3-{4-[(4-(4,4,5,5,5-pentafluoropentoxy)benzoyl)oxy]phenyl}prop-2-enoyl)oxy]}ethoxy]ethyl 3,5-diaminobenzoate 2{2-[2-{[((2E)-3-{4-[(4-(4,4,5,5,5-pentafluoropentoxy)benzoyl)oxy]phenyl}prop-2-enoyl)oxy]}ethoxy] ethoxy}ethyl 3,5-diaminobenzoate 2,2-Dimethyl-3-{[((2E)-3-{4-[(4-(4,4,5,5,5-pentafluoropentoxy)benzoyl)oxy]phenyl}prop-2-enoyl)oxy]}propyl 3,5-diaminobenzoate 2-{[((2E)-3-{4-[(4-(1,1,2,2-tetrafluoroethoxy)benzoyl)oxy]phenyl}prop-2-enoyl)oxy]}ethyl 3,5-diaminobenzoate 3-{[((2E)-3-{4-[(4-(1,1,2,2-tetrafluoroethoxy)benzoyl)oxy]phenyl}prop-2-enoyl)oxy]}propyl 3,5-diaminobenzoate 4-{[((2E)-3-{4-[(4-(1,1,2,2-tetrafluoroethoxy)benzoyl)oxy]phenyl}prop-2-enoyl)oxy]}butyl 3,5-diaminobenzoate 5-{[((2E)-3-{4-[(4-(1,1,2,2-tetrafluoroethoxy)benzoyl)oxy]phenyl}prop-2-enoyl)oxy]}pentyl 3,5-diaminobenzoate 6-{[((2E)-3-{4-[(4-(1,1,2,2-tetrafluoroethoxy)benzoyl)oxy]phenyl}prop-2-enoyl)oxy]}hexyll 3,5-diaminobenzoate 7-{[((2E)-3-{4-[(4-(1,1,2,2-tetrafluoroethoxy)benzoyl)oxy]phenyl}prop-2-enoyl)oxy]}heptyl 3,5-diaminobenzoate 8-{[((2E)-3-{4-[(4-(1,1,2,2-tetrafluoroethoxy)benzoyl)oxy]phenyl}prop-2-enoyl)oxy]}octyl 3,5-diaminobenzoate 11-{[((2E)-3-{4-[(4-(1,1,2,2-tetrafluoroethoxy)benzoyl)oxy]phenyl}prop-2-enoyl)oxy]}undecyl 3,5-diaminobenzoate 6-{[((2E)-3-{4-[(4-{[(4,4,4-trifluorobutoxy)carbonyl]amino}benzoyl)oxy]phenyl}prop-2-enoyl)oxy]}hexyll 3,5-diaminobenzoate 6-{[((2E)-3-{4-[(4-{[(4,4,5,5,5-pentafluoropentoxy)carbonyl]amino}benzoyl)oxy] phenyl}prop-2-enoyl)oxy]}hexyl 3,5-diaminobenzoate 6-{[((2E)-3-{4-[(4-({[(4,4,5,5,6,6,6-heptafluorohexyloxy)carbonyl]amino})benzoyl)oxy] phenyl}prop-2-enoyl)oxy]}hexyll 3,5-diaminobenzoate 3,5-Diaminobenzyl (2E) 3-{4-[(4-(4,4,4-trifluorobutoxy)benzoyl)oxy] phenyl}acrylate 3,5-Diaminobenzyl (2E) 3-{4-[(4-trifluoromethoxybenzoyl)oxy]phenyl}acrylate 3,5-Diaminobenzyl (2E) 3-{4-[(4-(2,2,2-trifluoroethoxy)benzoyl)oxy]phenyl}acrylate 3,5-Diaminobenzyl (2E) 3-{4-[(4-(5,5,5-trifluoropentyloxy)benzoyl)oxy]phenyl}acrylate 3,5-Diaminobenzyl (2E) 3-{4-[(4-(4,4,5,5,5-pentafluoropentyloxy)benzoyl)oxy] phenyl}acrylate 3,5-Diaminobenzyl (2E) 3-{4-[(4-(3,3,4,4,5,5,6,6,6-nonafluorohexyloxy)benzoyl)oxy] phenyl}acrylate 3,5-Diaminobenzyl (2E) 3-{4-[(4-(2,2,3,3,3-pentafluoropropyloxy)benzoyl)oxy] phenyl}acrylate 3,5-Diaminobenzyl (2E) 3-{4-[(4-(2,2,3,4,4,4-hexafluorobutoxy)benzoyl)oxy] phenyl}acrylate 3,5-Diaminobenzyl (2E) 3-{4-[(4-(1,1,2,2-tetrafluoroethoxy)benzoyl)oxy] phenyl}acrylate 3,5-Diaminobenzyl (2E) 3-{4-[(4-(1,1,2,2-tetrafluoropropoxy)benzoyl)oxy] phenyl}acrylate 3,5-Diaminobenzyl (2E) 3-{4-[(4-(4,4,5,5,6,6,6-heptafluorohexyloxy)benzoyl)oxy] phenyl}acrylate 3,5-Diaminobenzyl (2E) 3-{4-[(4-(4,5,5,5-tetrafluoro-4-(trifluoromethyl)pentyloxy)benzoyl)oxy] phenyl}acrylate 3,5-Diaminobenzyl (2E) 3-{4-{[(4-(4,4,5,5,6,6,6-heptafluorohexyloyl)oxy)benzoyl oxy]phenyl}acrylate 3,5-Diaminobenzyl (2E) 3-{4-[(4-[(4,4,4-trifluorobutoxy)carbonyl]amino)benzoyl)oxy] phenyl}acrylate 3,5-Diaminobenzyl (2E) 3-{4-[(4-[(4,4,4-trifluoropentyloxy)carbonyl]amino) benzoyl]oxy} phenyl}acrylate 3,5-Diaminobenzyl (2E) 3-{4-[4-(4,4,5,5,5,-pentafluoropentyloyloxy)benzoyl oxy]phenyl}acrylate 3,5-Diaminobenzyl (2E) 3-{4-[4-(4,4,5,5,6,6,6-heptafluorohexyloyloxy)benzoyl oxy]phenyl}acrylate 3,5-Diaminobenzyl (2E) 3-{4-[(3-fluoro-4-(4,4,4-trifluorobutoxy)benzoyl)oxy]phenyl}acrylate 2,5-Diaminobenzyl (2E) 3-{4-[(4-trifluoromethoxybenzoyl)oxy]phenyl}acrylate 2,5-Diaminobenzyl (2E) 3-{4-[(4-(2,2,2-trifluoroethoxy)benzoyl)oxy]phenyl}acrylate 2,5-Diaminobenzyl (2E) 3-{4-[(4-(5,5,5-trifluorobutoxy)benzoyl)oxy]phenyl}acrylate 2,5-Diaminobenzyl (2E) 3-{4-[(4-(5,5,5-trifluoropentyloxy)benzoyl)oxy]phenyl}acrylate 2,5-Diaminobenzyl (2E) 3-{4-[(4-(4,4,5,5,5-pentafluoropentyloxy)benzoyl)oxy] phenyl}acrylate 2,5-Diaminobenzyl (2E) 3-{4-[(4-(1,1,2,2-tetrafluoroethoxy)benzoyl)oxy] phenyl}acrylate 2,5-Diaminobenzyl (2E) 3-{4-[(4-(1,1,2,2-tetrafluoropropoxy)benzoyl)oxy] phenyl}acrylate 2,5-Diaminobenzyl (2E) 3-{4-[(4-(4,4,5,5,6,6,6-heptafluorohexyloxy)benzoyl)oxy] phenyl}acrylate 2,5-Diaminobenzyl (2E) 3-{4-{[(4-(4,4,5,5,6,6,6-heptafluorohexyloyl)oxy)benzoyl oxy]phenyl}acrylate 2,5-Diaminobenzyl (2E) 3-{4-[(4-[(4,4,4-trifluorobutoxy)carbonyl]amino)benzoyl)oxy] phenyl}acrylate 2,5-Diaminobenzyl (2E) 3-{4-[(4-[(4,4,4-trifluoropentyloxy)carbonyl]amino) benzoyl]oxy} phenyl}acrylate 2,5-Diaminobenzyl (2E) 3-{4-[4-(4,4,5,5,5,-pentafluoropentyloyloxy)benzoyl oxy]phenyl}acrylate 2,5-Diaminobenzyl (2E) 3-{4-[4-(4,4,5,5,6,6,6-heptafluorohexyloyloxy)benzoyl oxy]phenyl}acrylate2,5-Diaminobenzyl (2E) 3-{4-[(2-fluoro-4-(4,4,4-trifluorobutoxy)benzoyl)oxy]phenyl}acrylate 2,4-Diaminobenzyl (2E) 3-{4-[(4-trifluoromethoxybenzoyl)oxy]phenyl}acrylate 2,4-Diaminobenzyl (2E) 3-{4-[(4-(2,2,2-trifluoroethoxy)benzoyl)oxy]phenyl}acrylate 2,4-Diaminobenzyl (2E) 3-{4-[(4-(5,5,5-trifluoropentyloxy)benzoyl)oxy]phenyl}acrylate
2,4-Diaminobenzyl (2E) 3-{4-[(4-(4,4,4-trifluorobutoxy)benzoyl)oxy] phenyl}acrylate
2,4-Diaminobenzyl (2E) 3-{4-[(4-(4,4,5,5,5-pentafluoropentyloxy)benzoyl)oxy] phenyl}acrylate
2,4-Diaminobenzyl (2E) 3-{4-[(4-(1,1,2,2-tetrafluoroethoxy)benzoyl)oxy] phenyl}acrylate
2,4-Diaminobenzyl (2E) 3-{4-[(4-(1,1,2,2-tetrafluoropropoxy)benzoyl)oxy] phenyl}acrylate
2,4-Diaminobenzyl (2E) 3-{4-[(4-(4,4,5,5,6,6,6-heptafluorohexyloxy)benzoyl)oxy] phenyl}acrylate
2,4-Diaminobenzyl (2E) 3-{4-{[(4-(4,4,5,5,6,6,6-heptafluorohexyloyl)oxy)benzoyl oxy]phenyl}acrylate
2,4-Diaminobenzyl (2E) 3-{4-[(4-[(4,4,4-trifluorobutoxy)carbonyl]amino)benzoyl)oxy] phenyl}acrylate
2,4-Diaminobenzyl (2E) 3-{4-[(4-[(4,4,4-trifluoropentyloxy)carbonyl]amino) benzoyl]oxy} phenyl}acrylate
2,4-Diaminobenzyl (2E) 3-{4-[4-(4,4,5,5,-pentafluoropentyloyloxy)benzoyl oxy]phenyl}acrylate
2,4-Diaminobenzyl (2E) 3-{4-[4-(4,4,5,5,6,6,6-heptafluorohexyloyloxy)benzoyl oxy]phenyl}acrylate
2,4-Diaminobenzyl (2E) 3-{4-[(3-fluoro-4-(4,4,4-trifluorobutoxy)benzoyl)oxy] phenyl}acrylate
2-(2,4-Diaminophenyl)ethyl (2E) 3-{4-[(4-(4,4,5,5,5-pentafluoropentyloxy)benzoyl)oxy] phenyl}acrylate
2-(3,5-Diaminophenyl)ethyl (2E) 3-{4-[(4-trifluoromethoxybenzoyl)oxy]phenyl}acrylate
2-(3,5-Diaminophenyl)ethyl (2E) 3-{4-[(4-(2,2,2-trifluoroethoxy)benzoyl)oxy]phenyl} acrylate
2-(3,5-Diaminophenyl)ethyl (2E) 3-{4-[(4-(4,4,4-trifluorobutoxy)benzoyl)oxy]phenyl} acrylate
2-(3,5-Diaminophenyl)ethyl (2E) 3-{4-[(4-(5,5,5-trifluoropentyloxy)benzoyl)oxy]phenyl} acrylate
2-(3,5-Diaminophenyl)ethyl (2E) 3-{4-[(4-(4,4,5,5,5-pentafluoropentyloxy)benzoyl)oxy] phenyl}acrylate
2-(3,5-Diaminophenyl)ethyl (2E) 3-{4-[(4-(1,1,2,2-tetrafluoroethoxy)benzoyl)oxy] phenyl}acrylate
2-(3,5-Diaminophenyl)ethyl (2E) 3-{4-[(4-(4,4,4-trifluorobutanoyl)oxy)benzoyl]oxy} phenyl}acrylate
2-(3,5-Diaminophenyl)ethyl (2E) 3-{4-[(3-methoxy-4-trifluoromethoxybenzoyl)oxy]phenyl}acrylate
2-(3,5-Diaminophenyl)ethyl (2E) 3-{4-[(3-methoxy 4-(2,2,2-trifluoroethoxy)benzoyl)oxy]phenyl} acrylate
2-(3,5-Diaminophenyl)ethyl (2E) 3-{4-[(3-methoxy 4-(4,4,4-trifluorobutoxy)benzoyl)oxy]phenyl} acrylate
2-(3,5-Diaminophenyl)ethyl (2E) 3-{4-[(3-methoxy 4-(5,5,5-trifluoropentyloxy)benzoyl)oxy]phenyl} acrylate
2-(3,5-Diaminophenyl)ethyl (2E) 3-{4-[(3-methoxy 4-(4,4,5,5,5-pentafluoropentyloxy)benzoyl)oxy] phenyl}acrylate
2-(3,5-Diaminophenyl)ethyl (2E) 3-{4-[(3-methoxy 4-(1,1,2,2-tetrafluoroethoxy)benzoyl)oxy] phenyl}acrylate
2-(3,5-Diaminophenyl)ethyl (2E) 3-{4-[(3-methoxy 4-(4,4,4-trifluorobutanoyl)oxy)benzoyl]oxy} phenyl}acrylate
2-(3,5-Diaminophenyl)ethyl (2E) 3-{4-[(4-trifluoromethoxybenzoyl)oxy]-3-methoxyphenyl}acrylate
2-(3,5-Diaminophenyl)ethyl (2E) 3-{4-[(4-(2,2,2-trifluoroethoxy)benzoyl)oxy]-3-methoxyphenyl} acrylate
2-(3,5-Diaminophenyl)ethyl (2E) 3-{4-[(4-(4,4,4-trifluorobutoxy)benzoyl)oxy]-3-methoxyphenyl} acrylate
2-(3,5-Diaminophenyl)ethyl (2E) 3-{4-[(4-(5,5,5-trifluoropentyloxy)benzoyl)oxy]-3-methoxyphenyl} acrylate
2-(3,5-Diaminophenyl)ethyl (2E) 3-{4-[(4-(4,4,5,5,5-pentafluoropentyloxy)benzoyl)oxy]-3-methoxyphenyl} acrylate
2-(3,5-Diaminophenyl)ethyl (2E) 3-{4-[(4-(1,1,2,2-tetrafluoroethoxy)benzoyl)oxy]-3-methoxyphenyl} acrylate
2-(3,5-Diaminophenyl)ethyl (2E) 3-{4-[(4-(4,4,4-trifluorobutanoyl)oxy)benzoyl]oxy-3-methoxyphenyl}acrylate
2-(3,5-Diaminophenyl)ethyl (2E) 3-{4-[(4-trifluoromethoxyphenoxy)carbonyl]phenyl}acrylate
2-(3,5-Diaminophenyl)ethyl (2E) 3-{4-[(4-(2,2,2-trifluoroethoxy)phenoxy)carbonyl]phenyl} acrylate
2-(3,5-Diaminophenyl)ethyl (2E) 3-{4-[(4-(4,4,4-trifluorobutoxy)phenoxy)carbonyl]phenyl} acrylate
2-(3,5-Diaminophenyl)ethyl (2E) 3-{4-[(4-(5,5,5-trifluoropentyloxy)phenoxy)carbonyl]phenyl} acrylate
2-(3,5-Diaminophenyl)ethyl (2E) 3-{4-[(4-(4,4,5,5,5-pentafluoropentoxy)phenoxy)carbonyl] phenyl}acrylate
2-(3,5-Diaminophenyl)ethyl (2E) 3-{4-[(4-(1,1,2,2-tetrafluoroethoxy)phenoxy)carbonyl] phenyl}acrylate
2-(2,5-Diaminophenyl)ethyl (2E) 3-{4-[(4-trifluoromethoxybenzoyl)oxy]phenyl}acrylate
2-(2,5-Diaminophenyl)ethyl (2E) 3-{4-[(4-(2,2,2-trifluoroethoxy)benzoyl)oxy]phenyl} acrylate
2-(2,5-Diaminophenyl)ethyl (2E) 3-{4-[(4-(4,4,4-trifluorobutoxy)benzoyl)oxy]phenyl} acrylate
2-(2,5-Diaminophenyl)ethyl (2E) 3-{4-[(4-(5,5,5-trifluoropentyloxy)benzoyl)oxy]phenyl} acrylate
2-(2,5-Diaminophenyl)ethyl (2E) 3-{4-[(4-(4,4,5,5,5-pentafluoropentyloxy)benzoyl)oxy] phenyl}acrylate
2-(2,5-Diaminophenyl)ethyl (2E) 3-{4-[(4-(1,1,2,2-tetrafluoroethoxy)benzoyl)oxy] phenyl}acrylate
2-(2,5-Diaminophenyl)ethyl (2E) 3-{4-[(4-(4,4,4-trifluorobutanoyl)oxy)benzoyl]oxy] phenyl}acrylate
2-(2,4-Diaminophenyl)ethyl (2E) 3-{4-[(4-trifluoromethoxybenzoyl)oxy]phenyl}acrylate
2-(2,4-Diaminophenyl)ethyl (2E) 3-{4-[(4-(2,2,2-trifluoroethoxy)benzoyl)oxy]phenyl} acrylate
2-(2,4-Diaminophenyl)ethyl (2E) 3-{4-[(4-(4,4,4-trifluorobutoxy)benzoyl)oxy]phenyl} acrylate
2-(2,4-Diaminophenyl)ethyl (2E) 3-{4-[(4-(5,5,5-trifluoropentyloxy)benzoyl)oxy]phenyl} acrylate
2-(2,4-Diaminophenyl)ethyl (2E) 3-{4-[(4-(2,2,3,3,3-pentafluoropropyloxy) benzoyl)oxy] phenyl}acrylate
2-(2,4-Diaminophenyl)ethyl (2E) 3-{4-[(4-(2,2,3,4,4,4-hexafluorobutoxy)benzoyl)oxy] phenyl}acrylate
2-(2,4-Diaminophenyl)ethyl (2E) 3-{4-[(4-(3,3,3,4,4,5,5,6,6-nonafluorohexyloxy) benzoyl)oxy] phenyl}acrylate
2-(2,4-Diaminophenyl)ethyl (2E) 3-{4-[(4-(1,1,2,2-tetrafluoroethoxy)benzoyl)oxy] phenyl}acrylate
2-(2,4-Diaminophenyl)ethyl (2E) 3-{4-[(4-(1,1,2,2-tetrafluoropropoxy)benzoyl)oxy] phenyl}acrylate
2-(2,4-Diaminophenyl)ethyl (2E) 3-{4-[(4-(4,4,5,5,6,6,6-heptafluorohexyloxy)benzoyl)oxy] phenyl}acrylate
2-(2,4-Diaminophenyl)ethyl (2E) 3-{4-[(4-(5,5,6,6,6-pentafluorohexyl)benzoyl)oxy] phenyl}acrylate
2-(2,4-Diaminophenyl)ethyl (2E) 3-{4-[(4-(4,4,4-trifluorobutanoyl)oxy)benzoyl]oxy phenyl}acrylate
[4-[(E)-3-[2-(2,4-diaminophenyl)ethoxy]-3-oxo-prop-1-enyl]phenyl] 4-(4,4,4-trifluorobutoxy)benzoate
2-(2,4-Diaminophenyl)ethyl (2E) 3-{4-[(3-fluoro-4-(4,4,4-trifluorobutoxy)benzoyl) oxy]phenyl}acrylate
2-(2,4-Diaminophenyl)ethyl (2E) 3-{4-[(4-(5,5,5-trifluoropentoxy)benzoyl)oxy] phenyl}acrylate
2-(2,4-Diaminophenyl)ethyl (2E) 3-{4-[(3,4-di(4,4,4-trifluorobutoxy)benzoyl) oxy]phenyl} acrylate
2-(2,4-Diaminophenyl)ethyl (2E) 3-{4-[(4-(4,4,5,5,5-pentafluoropentoxy carbonyl)phenoxy)carbonyl] phenyl}acrylate
2-(2,4-Diaminophenyl)ethyl (2E) 3-{4-[(4-[(4,4,4-trifluorobutoxy)carbonyl]amino) benzoyl]oxy} phenyl}acrylate 2-(2,4-Diaminophenyl)ethyl (2E) 3-{4-[(4-[(4,4,5,5,5-pentafluoropentoxy)carbonyl]amino) benzoyl]oxy} phenyl}acrylate 2-(2,4-Diaminophenyl)ethyl (2E) 3-{4-[(3-methoxy-4-trifluoromethoxybenzoyl)oxy]phenyl}acrylate 2-(2,4-Diaminophenyl)ethyl (2E) 3-{4-[(3-methoxy 4-(2,2,2-trifluoroethoxy)benzoyl)oxy]phenyl} acrylate 2-(2,4-Diaminophenyl)ethyl (2E) 3-{4-[(3-methoxy 4-(4,4,4-trifluorobutoxy)benzoyl)oxy]phenyl} acrylate 2-(2,4-Diaminophenyl)ethyl (2E) 3-{4-[(3-methoxy 4-(5,5,5-trifluoropentyloxy)benzoyl)oxy]phenyl} acrylate 2-(2,4-Diaminophenyl)ethyl (2E) 3-{4-[(3-methoxy 4-(4,4,5,5,5-pentafluoropentoxy)benzoyl)oxy] phenyl}acrylate 2-(2,4-Diaminophenyl)ethyl (2E) 3-{4-[(3-methoxy 4-(1,1,2,2-tetrafluoroethoxy)benzoyl)oxy] phenyl}acrylate 2-(2,4-Diaminophenyl)ethyl (2E) 3-{4-[(3-methoxy 4-(4,4,4-trifluorobutanoyl)oxy)benzoyl]oxy] phenyl}acrylate 2-(2,4-Diaminophenyl)ethyl (2E) 3-{4-[(4-(4,4,4-trifluorobutoxy)benzoyl)oxy]-3-methoxy phenyl} acrylate 2-(2,4-Diaminophenyl)ethyl (2E) 3-{4-[(4-(5,5,5-trifluoropentyloxy)benzoyl)oxy]-3-methoxyphenyl} acrylate 2-(2,4-Diaminophenyl)ethyl (2E) 3-{4-[(4-(4,4,5,5,5-pentafluoropentoxy)benzoyl)oxy]-3-methoxyphenyl}acrylate 2-(2,4-Diaminophenyl)ethyl (2E) 3-{4-[(4-(1,1,2,2-tetrafluoroethoxy)benzoyl)oxy]-3-methoxyphenyl}acrylate 2-(2,4-Diaminophenyl)ethyl (2E) 3-{4-[(4-(4,4,4-trifluorobutanoyl)oxy)benzoyl]oxy)-3-methoxyphenyl}acrylate 2-(2,4-Diaminophenyl)ethyl (2E) 3-{4-[(4-(4,4,4-trifluorobutoxy)phenoxy)carbonyl]phenyl} acrylate 2-(2,4-Diaminophenyl)ethyl (2E) 3-{4-[(4-(5,5,5-trifluoropentyloxy)phenoxy)carbonyl]phenyl} acrylate 2-(2,4-Diaminophenyl)ethyl (2E) 3-{4-[(4-(4,4,5,5,5-pentafluoropentoxy)phenoxy)carbonyl] phenyl}acrylate 2-(2,4-Diaminophenyl)ethyl (2E) 3-{4-[(4-(1,1,2,2-tetrafluoroethoxy)phenoxy)carbonyl] phenyl}acrylate 3-(3,5-Diaminophenyl)propyl (2E) 3-{4-[(4-trifluoromethoxybenzoyl)oxy]phenyl} acrylate 3-(3,5-Diaminophenyl)propyl (2E) 3-{4-[(4-(2,2,2-trifluoroethoxy)benzoyl)oxy]phenyl} acrylate 3-(3,5-Diaminophenyl)propyl (2E) 3-{4-[(4-(4,4,4-trifluorobutoxy)benzoyl)oxy]phenyl} acrylate 3-(3,5-Diaminophenyl)propyl (2E) 3-{4-[(4-(5,5,5-trifluoropentyloxy)benzoyl)oxy]phenyl} acrylate 3-(3,5-Diaminophenyl)propyl (2E) 3-{4-[(4-(4,4,5,5,5-pentafluoropentoxy)benzoyl)oxy] phenyl}acrylate 3-(3,5-Diaminophenyl)propyl (2E) 3-{4-[(4-(1,1,2,2-tetrafluoroethoxy)benzoyl)oxy] phenyl}acrylate 3-(3,5-Diaminophenyl)propyl (2E) 3-{4-[(4-(4,4,4-trifluorobutanoyl)oxy)benzoyl]oxy phenyl}acrylate 3-(2,4-Diaminophenyl)propyl (2E) 3-{4-[(4-(4,4,4-trifluorobutoxy)benzoyl)oxy]phenyl} acrylate 3-(2,4-Diaminophenyl)propyl (2E) 3-{4-[(4-(4,4,5,5,5-pentafluoropentoxy)benzoyl)oxy] phenyl}acrylate 3-(2,4-Diaminophenyl)propyl (2E) 3-{4-[(4-(1,1,2,2-tetrafluoroethoxy)benzoyl)oxy] phenyl}acrylate 3-(2,4-Diaminophenyl)propyl (2E) 3-{4-[(4-(4,4,4-trifluorobutanoyl)oxy)benzoyl]oxy phenyl}acrylate 6-(2,4-Diaminophenyl)hexyl (2E) 3-{4-[(4-(4,4,4-trifluorobutoxy)benzoyl)oxy]phenyl} acrylate 6-(2,4-Diaminophenyl)hexyl (2E) 3-{4-[(4-(4,4,5,5,5-pentafluoropentoxy)benzoyl)oxy] phenyl}acrylate 6-(2,4-Diaminophenyl)hexyl (2E) 3-{4-[(4-(1,1,2,2-tetrafluoroethoxy)benzoyl)oxy] phenyl}acrylate 2,2-bis(4-aminobenzyl)-1,3 di[(2E)-3-{4-[(4-(4,4,4-trifluorobutoxy)benzoyl)oxy]phenyl}prop-2-enoyl] propanediol 2,2-bis(4-aminobenzyl)-1,3 di[(2E) 3-{4-[(4-trifluoromethoxybenzoyl)oxy]phenyl}prop-2-enoyl] propanediol 2,2-bis(4-aminobenzyl)-1,3 di[(2E) 3-{4-[(4-(2,2,2-trifluoroethoxy)benzoyl)oxy]phenyl} prop-2-enoyl] propanediol 2,2-bis(4-aminobenzyl)-1,3 di[(2E) 3-{4-[(4-(4,4,4-trifluorobutoxy)benzoyl)oxy]phenyl} prop-2-enoyl] propanediol 2,2-bis(4-aminobenzyl)-1,3 di[(2E) 3-{4-[(4-(5,5,5-trifluoropentyloxy)benzoyl)oxy]phenyl}prop-2-enoyl] propanediol 2,2-bis(4-aminobenzyl)-1,3 di[(2E) 3-{4-[(4-(4,4,5,5,5-pentafluoropentoxy)benzoyl)oxy] phenyl}prop-2-enoyl] propanediol 2,2-bis(4-aminobenzyl)-1,3 di[(2E) 3-{4-[(4-(1,1,2,2-tetrafluoroethoxy)benzoyl)oxy] phenyl}prop-2-enoyl] propanediol 2,2-bis(4-aminobenzyl)-1,3 di[(2E) 3-{4-[(4-(4,4,4-trifluorobutanoyl)oxy)benzoyl]oxy} phenyl}prop-2-enoyl] propanediol 2,2-bis(4-aminobenzyl)-1,3 di[(2E) 3-{4-[(3-methoxy-4-trifluoromethoxybenzoyl)oxy]phenyl}prop-2-enoyl] propanediol 2,2-bis(4-aminobenzyl)-1,3 di[(2E) 3-{4-[(3-methoxy 4-(2,2,2-trifluoroethoxy)benzoyl)oxy]phenyl} prop-2-enoyl] propanediol 2,2-bis(4-aminobenzyl)-1,3 di[(2E) 3-{4-[(3-methoxy 4-(4,4,4-trifluorobutoxy)benzoyl)oxy]phenyl} prop-2-enoyl] propanediol 2,2-bis(4-aminobenzyl)-1,3 di[(2E) 3-{4-[(3-methoxy 4-(5,5,5-trifluoropentyloxy)benzoyl)oxy]phenyl} prop-2-enoyl] propanediol 2,2-bis(4-aminobenzyl)-1,3 di[(2E) 3-{4-[(3-methoxy 4-(4,4,5,5,5-pentafluoropentoxy)benzoyl)oxy] phenyl}prop-2-enoyl] propanediol 2,2-bis(4-aminobenzyl)-1,3 di[(2E) 3-{4-[(3-methoxy 4-(1,1,2,2-tetrafluoroethoxy)benzoyl)oxy] phenyl}prop-2-enoyl] propanediol 2,2-bis(4-aminobenzyl)-1,3 di[(2E) 3-{4-[(3-methoxy 4-(4,4,4-trifluorobutanoyl)oxy)benzoyl]oxy} phenyl}prop-2-enoyl] propanediol 2,2-bis(4-aminobenzyl)-1,3 di[(2E) 3-{4-[(4-trifluoromethoxybenzoyl)oxy]-3-methoxyphenyl}prop-2-enoyl] propanediol 2,2-bis(4-aminobenzyl)-1,3 di[(2E) 3-{4-[(4-(2,2,2-trifluoroethoxy)benzoyl)oxy]-3-methoxyphenyl} prop-2-enoyl] propanediol 2,2-bis(4-aminobenzyl)-1,3 di[(2E) 3-{4-[(4-(4,4,4-trifluorobutoxy)benzoyl)oxy]-3-methoxyphenyl} prop-2-enoyl] propanediol 2,2-bis(4-aminobenzyl)-1,3 di[(2E) 3-{4-[(4-(5,5,5-trifluoropentyloxy)benzoyl)oxy]-3-methoxyphenyl} prop-2-enoyl] propanediol 2,2-bis(4-aminobenzyl)-1,3 di[(2E) 3-{4-[(4-(4,4,5,5,5-pentafluoropentoxy)benzoyl)oxy]-3-methoxyphenyl}prop-2-enoyl] propanediol 2,2-bis(4-aminobenzyl)-1,3 di[(2E) 3-{4-[(4-(1,1,2,2-tetrafluoroethoxy)benzoyl)oxy]-3-methoxyphenyl}prop-2-enoyl] propanediol 2,2-bis(4-aminobenzyl)-1,3 di[(2E) 3-{4-[(4-(4,4,4-trifluorobutanoyl)oxy)benzoyl]oxy)-3-methoxyphenyl}prop-2-enoyl] propanediol 2,2-bis(4-aminobenzyl)-1,3 di[(2E) 3-{4-[(4-trifluoromethoxyphenoxy)carbonyl]phenyl}prop-2-enoyl] propanediol 2,2-bis(4-aminobenzyl)-1,3 di[(2E) 3-{4-[(4-(2,2,2-trifluoroethoxy)phenoxy)carbonyl]phenyl} prop-2-enoyl] propanediol 2,2-bis(4-aminobenzyl)-1,3 di[(2E) 3-{4-[(4-(4,4,4-trifluorobutoxy)phenoxy)carbonyl]phenyl} prop-2-enoyl] propanediol 2,2-bis(4-aminobenzyl)-1,3 di[(2E) 3-{4-[(4-(5,5,5-trifluoropentyloxy)phenoxy)carbonyl]phenyl} prop-2-enoyl] propanediol 2,2-bis(4-aminobenzyl)-1,3 di[(2E) 3-{4-[(4-(4,4,5,5,5-pentafluoropentoxy)phenoxy)carbonyl] phenyl}prop-2-enoyl] propanediol 2,2-bis(4-aminobenzyl)-1,3 di[(2E) 3-{4-[(4-(1,1,2,2-tetrafluoroethoxy)phenoxy)carbonyl] phenyl}prop-2-enoyl] propanediol 6-{[((2E)-3-{4-[(4-(4,4,4-trifluorobutoxy)benzoyl)oxy] phenyl}prop-2-enoyl)oxy]}hexyl 3,5-Diamino-4-[6-{[((2E)-3-{4-[(4-(4,4,4-trifluorobutoxy)benzoyl)oxy] phenyl}prop-2-enoyl)oxy]}hexyloxy]benzoate 2,2'-bis[(2E)-3-{4-[(4-(4,4,4-trifluorobutoxy)benzoyl)oxy] phenyl}prop-2-enoyl]methyl 4,4'-Diamino 1,1'-biphenyl 2,2'-bis[(2E) 3-{4-[(4-trifluoromethoxybenzoyl)oxy] phenyl}prop-2-enoyl]methyl 4,4'-diamino 1,1'-biphenyl 2,2'-bis[(2E) 3-{4-[(4-(2,2,2-trifluoroethoxy)benzoyl)oxy] phenyl} prop-2-enoyl]methyl 4,4'-diamino 1,1'-biphenyl 2,2'-bis[(2E) 3-{4-[(4-(4,4,4-trifluorobutoxy)benzoyl)oxy] phenyl} prop-2-enoyl] methyl 4,4'-diamino 1,1'-biphenyl 2,2'-bis[(2E) 3-{4-[(4-(5,5,5-trifluoropentyloxy)benzoyl)oxy]phenyl} prop-2-enoyl] methyl 4,4'-diamino 1,1'-biphenyl 2,2'-bis[(2E) 3-{4-[(4-(1,1,2,2-tetrafluoroethoxy)benzoyl)oxy] phenyl}prop-2-enoyl] methyl 4,4'-diamino 1,1'-biphenyl 2,2'-bis[(2E) 3-{4-[(4-(4,4,4-trifluorobutanoyl)oxy)benzoyl]oxy} phenyl]prop-2-enoyl] methyl 4,4'-diamino 1,1'-biphenyl 2,2'-bis[(2E) 3-{4-[(3-methoxy-4-trifluoromethoxybenzoyl)oxy]phenyl}prop-2-enoyl] methyl 4,4'-diamino 1,1'-biphenyl 2,2'-bis[(2E) 3-{4-[(3-methoxy 4-(2,2,2-trifluoroethoxy)benzoyl)oxy]phenyl} prop-2-enoyl] methyl 4,4'-diamino 1,1'-biphenyl 2,2'-bis[(2E) 3-{4-[(3-methoxy 4-(4,4,4-trifluorobutoxy)benzoyl)oxy]phenyl} prop-2-enoyl] methyl 4,4'-diamino 1,1'-biphenyl 2,2'-bis[(2E) 3-{4-[(3-methoxy 4-(5,5,5-trifluoropentyloxy)benzoyl)oxy]phenyl} prop-2-enoyl] methyl 4,4'-diamino 1,1'-biphenyl 2,2'-bis[(2E) 3-{4-[(3-methoxy 4-(4,4,5,5,5-pentafluoropentoxy)benzoyl)oxy] phenyl}prop-2-enoyl] methyl 4,4'-diamino 1,1'-biphenyl 2,2'-bis[(2E) 3-{4-[(3-methoxy 4-(1,1,2,2-tetrafluoroethoxy)benzoyl)oxy] phenyl}prop-2-enoyl] methyl 4,4'-diamino 1,1'-biphenyl 2,2'-bis[(2E) 3-{4-[(3-methoxy 4-(4,4,4-trifluorobutanoyl)oxy)benzoyl]oxy} phenyl]prop-2-enoyl] methyl 4,4'-diamino 1,1'-biphenyl 2,2'-bis[(2E) 3-{4-[(4-trifluoromethoxybenzoyl)oxy]-3-methoxyphenyl}prop-2-enoyl] methyl 4,4'-diamino 1,1'-biphenyl 2,2'-bis[(2E) 3-{4-[(4-(2,2,2-trifluoroethoxy)benzoyl)oxy]-3-methoxyphenyl} prop-2-enoyl] methyl 4,4'-diamino 1,1'-biphenyl 2,2'-bis[(2E) 3-{4-[(4-(4,4,4-trifluorobutoxy)benzoyl)oxy]-3-methoxyphenyl} prop-2-enoyl] methyl 4,4'-diamino 1,1'-biphenyl 2,2'-bis[(2E) 3-{4-[(4-(5,5,5-trifluoropentyloxy)benzoyl)oxy]-3-methoxyphenyl} prop-2-enoyl] methyl 4,4'-diamino 1,1'-biphenyl 2,2'-bis[(2E) 3-{4-[(4-(4,4,5,5,5-pentafluoropentoxy)benzoyl)oxy]-3-methoxyphenyl}prop-2-enoyl] methyl 4,4'-diamino 1,1'-biphenyl 2,2'-bis[(2E) 3-{4-[(4-(1,1,2,2-tetrafluoroethoxy)benzoyl)oxy]-3-methoxyphenyl}prop-2-enoyl] methyl 4,4'-diamino 1,1'-biphenyl 2,2'-bis[(2E) 3-{4-[(4-(4,4,4-trifluorobutanoyl)oxy}benzoyl]oxy}-3-methoxyphenyl]]prop-2-enoyl] methyl 4,4'-diamino 1,1'-biphenyl 2,2'-bis[(2E) 3-{4-[(4-trifluoromethoxyphenoxy)carbonyl] phenyl}prop-2-enoyl]methyl 4,4'-diamino 1,1'-biphenyl 2,2'-bis[(2E) 3-{4-[(4-(2,2,2-trifluoroethoxy)phenoxy)carbonyl]phenyl} prop-2-enoyl]methyl 4,4'-diamino 1,1'-biphenyl 2,2'-bis[(2E) 3-{4-[(4-(4,4,4-trifluorobutoxy)phenoxy)carbonyl]phenyl} prop-2-enoyl]methyl 4,4'-diamino 1,1'-biphenyl

[4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]methoxy]-3-oxo-prop-1-enyl]phenyl] 4-(4,4,4-trifluorobutoxy)benzoate 2,2'-bis[(2E) 3-{4-[(4-(5,5,5-trifluoropentyloxy)phenoxy)carbonyl]phenyl} prop-2-enoyl methyl 4,4'-diamino 1,1'-biphenyl 2,2'-bis[(2E) 3-{4-[(4-(4,4,5,5,5-pentafluoropentoxy)phenoxy)carbonyl] phenyl}prop-2-enoyl]methyl 4,4'-diamino 1,1'-biphenyl 2,2'-bis[(2E) 3-{4-[(4-(1,1,2,2-tetrafluoroethoxy)phenoxy)carbonyl] phenyl}prop-2-enoyl]methyl 4,4'-diamino 1,1'-biphenyl 2-(2,4-Diaminophenyl)-1,3 di[(2E)-3-{4-[(4-(4,4,4-trifluorobutoxy) benzoyl)oxy]phenyl}prop-2-enoyl] propanediol 2-(2,4-Diaminophenyl)-1,3 di[(2E)-3-{4-[(4-(4,4,4-trifluorobutoxy) benzoyl)oxy]phenyl}prop-2-enoyl] propanediol 2-(2,4-Diaminophenyl)-1,3 di[(2E) 3-{4-[(4-trifluoromethoxybenzoyl)oxy]phenyl}prop-2-enoyl] propanediol 2-(2,4-Diaminophenyl)-1,3 di[(2E) 3-{4-[(4-(2,2,2-trifluoroethoxy)benzoyl)oxy]phenyl} prop-2-enoyl] propanediol 2-(2,4-Diaminophenyl)-1,3 di[(2E) 3-{4-[(4-(4,4,4-trifluorobutoxy)benzoyl)oxy]phenyl} prop-2-enoyl] propanediol 2-(2,4-Diaminophenyl)-1,3 di[(2E) 3-{4-[(4-(5,5,5-trifluoropentyloxy)benzoyl)oxy]phenyl} prop-2-enoyl] propanediol 2-(2,4-Diaminophenyl)-1,3 di[(2E) 3-{4-[(4-(4,4,5,5,5-pentafluoropentoxy)benzoyl)oxy] phenyl}prop-2-enoyl] propanediol 2-(2,4-Diaminophenyl)-1,3 di[(2E) 3-{4-[(4-(1,1,2,2-tetrafluoroethoxy)benzoyl)oxy] phenyl}prop-2-enoyl] propanediol 2-(2,4-Diaminophenyl)-1,3 di[(2E) 3-{4-[(4-(4,4,4-trifluorobutanoyl)oxy)benzoyl]oxy} phenyl}prop-2-enoyl] propanediol 2-(2,4-Diaminophenyl)-1,3 di[(2E) 3-{4-[(3-methoxy-4-trifluoromethoxybenzoyl)oxy]phenyl}prop-2-enoyl] propanediol 2-(2,4-Diaminophenyl)-1,3 di[(2E) 3-{4-[(3-methoxy 4-(2,2,2-trifluoroethoxy)benzoyl)oxy]phenyl} prop-2-enoyl] propanediol 2-(2,4-Diaminophenyl)-1,3 di[(2E) 3-{4-[(3-methoxy 4-(4,4,4-trifluorobutoxy)benzoyl)oxy]phenyl} prop-2-enoyl] propanediol 2-(2,4-Diaminophenyl)-1,3 di[(2E) 3-{4-[(3-methoxy 4-(5,5,5-trifluoropentyloxy)benzoyl)oxy]phenyl}prop-2-enoyl] propanediol 2-(2,4-Diaminophenyl)-1,3 di[(2E) 3-{4-[(3-methoxy 4-(4,4,5,5,5-pentafluoropentoxy)benzoyl)oxy] phenyl}prop-2-enoyl] propanediol 2-(2,4-Diaminophenyl)-1,3 di[(2E) 3-{4-[(3-methoxy 4-(1,1,2,2-tetrafluoroethoxy)benzoyl)oxy] phenyl}prop-2-enoyl] propanediol 2-(2,4-Diaminophenyl)-1,3 di[(2E) 3-{4-[(3-methoxy 4-(4,4,4-trifluorobutanoyl)oxy)benzoyl]oxy} phenyl}prop-2-enoyl] propanediol 2-(2,4-Diaminophenyl)-1,3 di[(2E) 3-{4-[(4-trifluoromethoxybenzoyl)oxy]-3-methoxyphenyl}prop-2-enoyl] propanediol 2-(2,4-Diaminophenyl)-1,3 di[(2E) 3-{4-[(4-(2,2,2-trifluoroethoxy)benzoyl)oxy]-3-methoxyphenyl} prop-2-enoyl] propanediol 2-(2,4-Diaminophenyl)-1,3 di[(2E) 3-{4-[(4-(4,4,4-trifluorobutoxy)benzoyl)oxy]-3-methoxyphenyl} prop-2-enoyl] propanediol 2-(2,4-Diaminophenyl)-1,3 di[(2E) 3-{4-[(4-(5,5,5-trifluoropentyloxy)benzoyl)oxy]-3-methoxyphenyl} prop-2-enoyl] propanediol 2-(2,4-Diaminophenyl)-1,3 di[(2E) 3-{4-[(4-(4,4,5,5,5-pentafluoropentoxy)benzoyl)oxy]-3-methoxyphenyl}prop-2-enoyl] propanediol 2-(2,4-Diaminophenyl)-1,3 di[(2E) 3-{4-[(4-(1,1,2,2-tetrafluoroethoxy)benzoyl)oxy]-3-methoxyphenyl}prop-2-enoyl] propanediol 2-(2,4-Diaminophenyl)-1,3 di[(2E) 3-{4-[(4-(4,4,4-trifluorobutanoyl)oxy)benzoyl]oxy-3-methoxyphenyl}prop-2-enoyl] propanediol 2-(2,4-Diaminophenyl)-1,3 di[(2E) 3-{4-[(4-trifluoromethoxyphenoxy)carbonyl]phenyl}prop-2-enoyl] propanediol 2-(2,4-Diaminophenyl)-1,3 di[(2E) 3-{4-[(4-(2,2,2-trifluoroethoxy)phenoxy)carbonyl]phenyl} prop-2-enoyl] propanediol 2-(2,4-Diaminophenyl)-1,3 di[(2E) 3-{4-[(4-(4,4,4-trifluorobutoxy)phenoxy)carbonyl]phenyl} prop-2-enoyl] propanediol 2-(2,4-Diaminophenyl)-1,3 di[(2E) 3-{4-[(4-(5,5,5-trifluoropentyloxy)phenoxy)carbonyl]phenyl} prop-2-enoyl] propanediol 2-(2,4-Diaminophenyl)-1,3 di[(2E) 3-{4-[(4-(4,4,5,5,5-pentafluoropentoxy)phenoxy)carbonyl] phenyl}prop-2-enoyl] propanediol 2-(2,4-Diaminophenyl)-1,3 di[(2E) 3-{4-[(4-(1,1,2,2-tetrafluoroethoxy)phenoxy)carbonyl] phenyl}prop-2-enoyl] propanediol 2-(3,5-Diaminophenyl)-1,3 di[(2E) 3-{4-[(4-trifluoromethoxybenzoyl)oxy]phenyl}prop-2-enoyl] propanediol 2-(3,5-Diaminophenyl)-1,3 di[(2E) 3-{4-[(4-(2,2,2-trifluoroethoxy)benzoyl)oxy]phenyl} prop-2-enoyl] propanediol 2-(3,5-Diaminophenyl)-1,3 di[(2E) 3-{4-[(4-(4,4,4-trifluorobutoxy)benzoyl)oxy]phenyl} prop-2-enoyl] propanediol 2-(3,5-Diaminophenyl)-1,3 di[(2E) 3-{4-[(4-(5,5,5-trifluoropentyloxy)benzoyl)oxy]phenyl} prop-2-enoyl] propanediol 2-(3,5-Diaminophenyl)-1,3 di[(2E) 3-{4-[(4-(4,4,5,5,5-pentafluoropentoxy)benzoyl)oxy] phenyl}prop-2-enoyl] propanediol 2-(3,5-Diaminophenyl)-1,3 di[(2E) 3-{4-[(4-(1,1,2,2-tetrafluoroethoxy)benzoyl)oxy] phenyl}prop-2-enoyl] propanediol 2-(3,5-Diaminophenyl)-1,3 di[(2E) 3-{4-[(4-(4,4,4-trifluorobutanoyl)oxy)benzoyl)oxy} phenyl}prop-2-enoyl] propanediol 2-(3,5-Diaminophenyl)-1,3 di[(2E) 3-{4-[(3-methoxy-4-trifluoromethoxybenzoyl)oxy]phenyl}prop-2-enoyl] propanediol 2-(3,5-Diaminophenyl)-1,3 di[(2E) 3-{4-[(3-methoxy 4-(2,2,2-trifluoroethoxy)benzoyl)oxy]phenyl} prop-2-enoyl] propanediol 2-(3,5-Diaminophenyl)-1,3 di[(2E) 3-{4-[(3-methoxy 4-(4,4,4-trifluorobutoxy)benzoyl)oxy]phenyl} prop-2-enoyl] propanediol 2-(3,5-Diaminophenyl)-1,3 di[(2E) 3-{4-[(3-methoxy 4-(5,5,5-trifluoropentyloxy)benzoyl)oxy]phenyl} prop-2-enoyl] propanediol 2-(3,5-Diaminophenyl)-1,3 di[(2E) 3-{4-[(3-methoxy 4-(4,4,5,5,5-pentafluoropentoxy)benzoyl)oxy] phenyl}prop-2-enoyl] propanediol 2-(3,5-Diaminophenyl)-1,3 di[(2E) 3-{4-[(3-methoxy 4-(1,1,2,2-tetrafluoroethoxy)benzoyl)oxy] phenyl}prop-2-enoyl] propanediol 2-(3,5-Diaminophenyl)-1,3 di[(2E) 3-{4-[(3-methoxy 4-(4,4,4-trifluorobutanoyl)oxy)benzoyl]oxy} phenyl}prop-2-enoyl] propanediol 2-(3,5-Diaminophenyl)-1,3 di[(2E) 3-{4-[(4-trifluoromethoxybenzoyl)oxy]-3-methoxyphenyl}prop-2-enoyl] propanediol 2-(3,5-Diaminophenyl)-1,3 di[(2E) 3-{4-[(4-(2,2,2-trifluoroethoxy)benzoyl)oxy]-3-methoxyphenyl} prop-2-enoyl] propanediol 2-(3,5-Diaminophenyl)-1,3 di[(2E) 3-{4-[(4-(4,4,4-trifluorobutoxy)benzoyl)oxy]-3-methoxyphenyl} prop-2-enoyl] propanediol 2-(3,5-Diaminophenyl)-1,3 di[(2E) 3-{4-[(4-(5,5,5-trifluoropentyloxy)benzoyl)oxy]-3-methoxyphenyl} prop-2-enoyl] propanediol 2-(3,5-Diaminophenyl)-1,3 di[(2E) 3-{4-[(4-(4,4,5,5,5-pentafluoropentoxy)benzoyl)oxy]-3-methoxyphenyl}prop-2-enoyl] propanediol 2-(3,5-Diaminophenyl)-1,3 di[(2E) 3-{4-[(4-(1,1,2,2-tetrafluoroethoxy)benzoyl)oxy]-3-methoxyphenyl}prop-2-enoyl] propanediol 2-(3,5-Diaminophenyl)-1,3 di[(2E) 3-{4-[(4-(4,4,4-trifluorobutanoyl)oxy)benzoyl]oxy)-3-methoxyphenyl}prop-2-enoyl] propanediol 2-(3,5-Diaminophenyl)-1,3 di[(2E) 3-{4-[(4-trifluoromethoxyphenoxy)carbonyl]phenyl}prop-2-enoyl] propanediol 2-(3,5-Diaminophenyl)-1,3 di[(2E) 3-{4-[(4-(2,2,2-trifluoroethoxy)phenoxy)carbonyl]phenyl} prop-2-enoyl] propanediol 2-(3,5-Diaminophenyl)-1,3 di[(2E) 3-{4-[(4-(4,4,4-trifluorobutoxy)phenoxy)carbonyl]phenyl} prop-2-enoyl] propanediol 2-(3,5-Diaminophenyl)-1,3 di[(2E) 3-{4-[(4-(5,5,5-trifluoropentyloxy)phenoxy)carbonyl]phenyl} prop-2-enoyl] propanediol 2-(3,5-Diaminophenyl)-1,3 di[(2E) 3-{4-[(4-(4,4,5,5,5-pentafluoropentoxy)phenoxy)carbonyl] phenyl}prop-2-enoyl] propanediol 2-(3,5-Diaminophenyl)-1,3 di[(2E) 3-{4-[(4-(1,1,2,2-tetrafluoroethoxy)phenoxy)carbonyl] phenyl}prop-2-enoyl] propanediol.

The diamine compounds are prepared according to methods known in the art or according to a process comprising contacting a compound of formula (XIV)

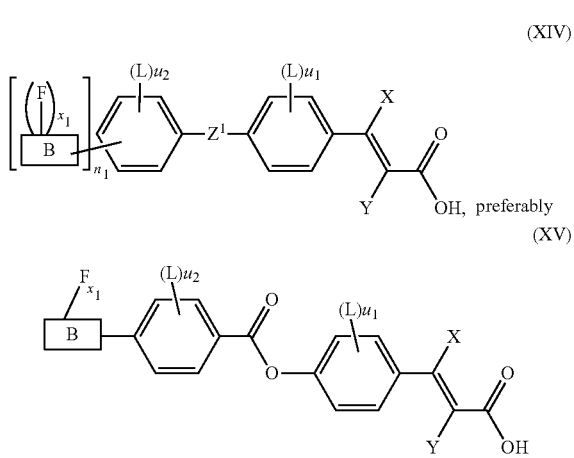

(XIV)

preferably (XV)

with a dinitro compound of formula (XVI)

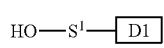

(XVI)

and then converting the obtained dinitro compound of formula (XVIa)

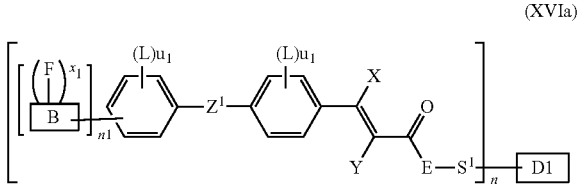

(XVIa)

in the corresponding diamino compound of formula (XII)

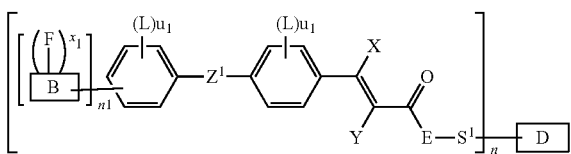

wherein F, $x_1$, $n_1$, n, B, D, X, Y, $Z^1$, L, $u_1$, $u_2$ and $S^1$ have the same meanings and preferences as given above, and wherein D1 has the same meaning and preferences as D as given above, with the proviso that the two amino groups of D are replaced by two nitro groups.

The reaction between compounds (XIV) and (XVI) can be conducted in many known ways (see J. March, Advanced Organic Chemistry, second edition, pages 363 and 365).

In general a method for the preparation of a photoalignment polymer of the present invention is applied through polycondensation reaction of a diamine (I) with one or more tetracarboxylic acid anhydrides, preferably of the general formula (V) as given below, optionally in the presence of one or more additional other diamines.

Preferably, the tetracarboxylic acid anhydride is of formula (V)

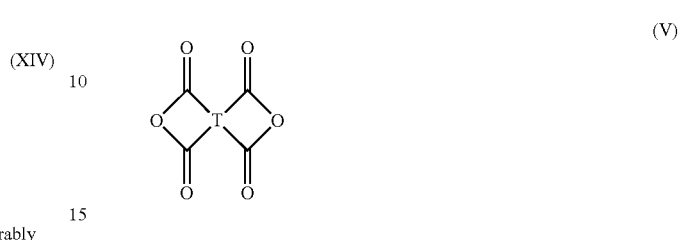

(V)

wherein:

T represents a tetravalent organic radical.

The tetravalent organic radical T is preferably derived from an aliphatic, alicyclic or aromatic tetracarboxylic acid dianhydride.

Preferred examples of aliphatic or alicyclic tetracarboxylic acid dianhydrides are:
1,1,4,4-butanetetracarboxylic acid dianhydride,
ethylenemaleic acid dianhydride,
1,2,3,4-cyclobutanetetracarboxylic acid dianhydride,
1,2,3,4-cyclopentanetetracarboxylic acid dianhydride,
2,3,5-tricarboxycyclopentylacetic acid dianhydride,
3,5,6-tricarboxynorbornylacetic acid dianhydride,
2,3,4,5-tetrahydrofurantetracarboxylic acid dianhydride,
rel-[1 S,5R,6R]-3-oxabicyclo[3.2.1]octane-2,4-dione-6-spiro-3'-(tetrahydrofuran2',5'-dione),
4-(2,5-dioxotetrahydrofuran-3-yl)tetrahydronaphthalene-1,2-dicarboxylicacid dianhydride,
5-(2,5-dioxotetrahydrofuran-3-yl)-3-methyl-3-cyclohexene-1,2-dicarboxylicacid dianhydride,
bicyclo[2.2.2]oct-7-ene-2,3,5,6-tetracarboxylic acid dianhydride,
bicyclo[2.2.2]octane-2,3,5,6-tetracarboxylic acid dianhydride,
1,8-dimethylbicyclo[2.2.2]oct-7-ene-2,3,5,6-tetracarboxylic acid dianhydride, pyromellitic acid dianhydride,
3,3',4,4'-benzophenonetetracarboxylic acid dianhydride,
4,4'-oxydiphthalic acid dianhydride,
3,3',4,4'-diphenylsulfonetetracarboxylic acid dianhydride,
1,4,5,8-naphthalenetetracarboxylic acid dianhydride,
2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid) dianhydride,
4,4'-(1,4-phenylene)bis(phthalic acid) dianhydride,
4,4'-(1,3-phenylene)bis(phthalic acid) dianhydride,
4,4'-(hexafluoroisopropylidene)diphthalic acid dianhydride,
4,4'-oxydi(1,4-phenylene)bis(phthalic acid) dianhydride, and
4,4'-methylenedi(1,4-phenylene)bis(phthalic acid) dianhydride.

Preferred examples of aromatic tetracarboxylic acid dianhydrides are:
pyromellitic acid dianhydride,
3,3',4,4'-benzophenonetetracarboxylic acid dianhydride,
4,4'-oxydiphthalic acid dianhydride,
3,3',4,4'-diphenylsulfonetetracarboxylic acid dianhydride,
1,4,5,8-naphthalenetetracarboxylic acid dianhydride,
2,3,6,7-naphthalenetetracarboxylic acid dianhydride,
3,3',4,4'-dimethyldiphenylsilanetetracarboxylic acid dianhydride,
3,3',4,4'-tetraphenylsilanetetracarboxylic acid dianhydride,
1,2,3,4-furantetracarboxylic acid dianhydride,
4,4'-bis(3,4-dicarboxyphenoxy)diphenyl sulfide dianhydride,
4,4'-bis(3,4-dicarboxyphenoxy)diphenyl sulfone dianhydride,
4,4'-bis(3,4-dicarboxyphenoxy)diphenylpropane dianhydride,
3,3',4,4'-biphenyltetracarboxylic acid dianhydride,
ethylene glycol bis(trimellitic acid) dianhydride,
4,4'-(1,4-phenylene)bis(phthalic acid) dianhydride,
4,4'-(1,3-phenylene)bis(phthalic acid) dianhydride,
4,4'-(hexafluoroisopropylidene)diphthalic acid dianhydride,
4,4'-oxydi(1,4-phenylene)bis(phthalic acid) dianhydride,
4,4'-methylenedi(1,4-phenylene)bis(phthalic acid) dianhydride,
and the like.

More preferably the tetracarboxylic acid dianhydrides used to form the tetravalent organic radical T are selected from:
1,2,3,4-cyclobutanetetracarboxylic acid dianhydride,
1,2,3,4-cyclopentanetetracarboxylic acid dianhydride,
2,3,5-tricarboxycyclopentylacetic acid dianhydride,
5-(2,5-dioxotetrahydrofuran-3-yl)-3-methyl-3-cyclohexene-1,2-dicarboxylic acid dianhydride,
4-(2,5-dioxotetrahydrofuran-3-yl)tetrahydronaphthalene-1,2-dicarboxylic acid dianhydride,
4,4'-(hexafluoroisopropylidene)diphthalic acid dianhydride and bicyclo[2.2.2]oct-7-ene-2,3,5,6-tetracarboxylic acid dianhydride.

The polymer, copolymer or oligomer, especially the polyamic acid, polyamic acid ester and polyimide and mixtures thereof may be prepared in line with known methods, such as those described in Plast. Eng. 36 (1996), (Polyimides, fundamentals and applications), Marcel Dekker, Inc.

For example, the amidisation, poly-condensation reaction for the preparation of the polyamic acids is carried out in solution in a polar aprotic organic solvent, such as γ-butyrolactone, N,N-dimethylacetamide, 2-butoxyethanol (BC), N-methylpyrrolidone or N,N-dimethylformamide. In most cases equimolar amounts of the anhydride and the diamine are used, i.e. one amino group per anhydride group. If it is desired to stabilize the molecular weight of the polymer, copolymer or oligomer, it is possible for that purpose to either add an excess or a less-than-stoichiometric amount of one of the two components or to add a mono-functional compound in the form of a dicarboxylic acid monoanhydride or in the form of a monoamine. Examples of such mono-functional compounds are maleic acid anhydride, phthalic acid anhydride, aniline and the like. Preferably the reaction is carried out at temperatures of less than 100° C.

The imidisation, cyclisation of the polyamic acids to form the polyimides can be carried out by heating, i.e. by condensation with removal of water or by other imidisation reactions using appropriate reagents.

Partially imidisation is achieved for example, if the imidisation is carried out purely thermally, the imidisation of the polyamic acids may not always be complete, i.e. the resulting polyimides may still contain proportions of polyamic acid.

Complete imidisation reactions are carried out at temperatures between 60 and 250° C., preferably at temperatures of less than 200° C.

In order to achieve imidisation at lower temperatures additional reagents that facilitate the removal of water are added to the reaction mixture. Such reagents are, for example, mixtures consisting of acid anhydrides, such as acetic acid anhydride, propionic acid anhydride, phthalic acid anhydride, trifluoroacetic acid anhydride or tertiary amines, such as triethylamine, trimethylamine, tributylamine, pyridine, N,N-dimethylaniline, lutidine, collidine etc. The amount of aforementioned additional reagents that facilitate the removal of water is preferably at least four equivalents of acid anhydride and two equivalents of amine per equivalent of polyamic acid to be condensed.

The imidization degree of each polymer used in the liquid crystal alignment agent of the invention can be arbitrarily adjusted by controlling the catalyst amount, reaction time and reaction temperature employed in production of the polymer. In the present description, "imidization degree" of polymer refers to a proportion (expressed in %) of the number of recurring units of polymer forming an imide ring or an isoimide ring to the number of total recurring units of polymer. In the present description, the imidization degree of a polyamic acid not subjected to dehydration and ring closure is 0%. The imidization degree of each polymer is determined by dissolving the polymer in deuterated dimethyl sulfoxide, subjecting the resulting solution to $^1$H-NMR measurement at a room temperature using tetramethylsilane as a standard substance, and calculating from the following formula.

$$\text{Imidization degree (\%)}=1-(A^1/A2\times B)\times 100$$

$A^1$: Peak area based on protons of NH groups (in the vicinity of 10 ppm)

$A^2$: Peak area based of one proton of acrylate double bond (in the vicinity of 6.5 ppm).

B: Proportion of the number of acrylate protons to one proton of NH group in the polymer precursor The imidization degree is usually in the range of 1 to 99%, preferably 5 to 50%, more preferably 10 to 40%.

The cyclisation may be conducted subsequent to the poly-condensation with thermal removal of water under formation of a polyimide.

A further preferred embodiment of the invention relates to photoalignment polymers comprising a photoreactive group, which is coumarine- and quinoline-groups as for example described in U.S. Pat. No. 6,201,087 B1, and are incorporated by reference herewith. More preferred are those of U.S. Pat. No. 6,201,087, claims 1-14, more preferred are those enumerated in examples 1-10 in col. 10, line 6—col. 31, line 54;

A further preferred embodiment of the invention relates to photoalignment polymers comprising cyanostilbene-groups photoreactive groups, which are for example described in U.S. Pat. No. 7,959,990.

More preferred are photoalignment polymers comprising at least one monomer or at least two monomers of the general formula (I)

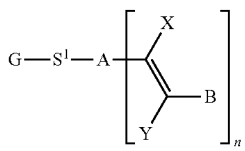

(IV)

wherein

A and B each independently are a ring system of 5 to 40 atoms, wherein each ring system includes at least one unsaturation directly connected via electron conjugation (π-π bonding) to the double bond shown in formula (IV), wherein the ring system may be unsubstituted or mono- or poly-substituted by a halogen atom, a hydroxyl group and/or a polar group like nitro, nitrile or a carboxy group, and/or a cyclic, straight-chain or branched alkyl residue having from 1 to 30 carbon atoms, which is unsubstituted, mono- or poly-substituted by methyl, fluorine and/or chlorine, wherein one or more, preferably non-adjacent —CH$_2$— groups independently may be replaced by a group selected from —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O— and —Si(CH$_3$)$_2$—O—Si(CH$_3$)$_2$—, an aromatic or an alicyclic group, wherein R$^1$ is a hydrogen atom or lower alkyl; and/or an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms, S$^1$ is a single covalent bond or a spacer unit;

n is 1, 2 or 3;

X and Y represent groups of which one is a hydrogen atom and the other is an electron withdrawing group, which preferably is selected from the groups —COR$^2$, —COOR$^2$, —COSR$^2$, —CO—NR$^2$, —SOR$^2$, —SOCF$_3$, —SO$_2$CF$_2$COR$^2$, —SOOR$^2$, —C≡S, —NO$_2$, —CF$_3$, —CN, wherein R$^2$ is a hydrogen atom or a straight-chain or branched alkyl or alkylene group, having from 1 to 16 carbon atoms, wherein one or more, preferably non-adjacent —CH$_2$— groups independently may be replaced by a group, selected from —O—, —CO—, —CO—O—, —O—CO—, —C═C—, —C≡C—, or by an optionally substituted alkyl, or by a polymerizable group, G is a hydrogen atom, optionally substituted alkyl, or a polymerizable group, with the proviso, that when Y is —CN and A is unsubstituted phenylene, then B may not be phenylene para-substituted by —CN, —NO$_2$ or —COOH; and with the proviso that if ring system A is 1,4-phenylene, which is unsubstituted or substituted with halogen, cyano and/or nitro, and ring system B is 1,4-phenylene, which is unsubstituted or substituted with halogen, cyano and/or nitro, or pyrimidine-2,5-diyl, pyridine-2,5-diyl, 2,5-thiophenylenediyl, 2,5-furanylene, 1,4-naphthylene or 2,6-naphthylene, then X is different from —CN and —COO-alkyl having from 1 to 12 carbon atoms.

A further preferred embodiment of the invention relates to photoalignment materials comprising chalcone-groups as described in J. Photopolym. Sci. Technol., 11, 187 (1998), diphenylacetylene groups as described in Chem. Mat., 11, 1293 (1999), benzylidenephtalimidine as described in Macromol. Chem. Phys., 199, 375 (1998), phenylenediacryloyl groups as described in Japan. J. Appl. Phys., 1, 37, 2620 (1998), stilbazole derivatives groups as described in J. Photopolym. Sci. Technol., 12, 279 (1999), azo derivatives groups as described in Chemical Reviews, 100, 1847 (2000)), which are incorporated with reference herewith.

Especially most preferably the present invention relates to a photoalignment composition within the meaning and preferences as described above and below comprising a) at least a single photoalignment polymer having a photoreactive group, which is a polyamic acid, polyimide or a mixture thereof, and which is preferably a poylamic acid, comprising at least one diamine (I) or at least two diamines (I) and at least one tetracarboxylic acid dianhydride.

Further especially most preferably the present invention relates to a photoalignment composition within the meaning and preferences as described above comprising c) a further polymer not having a photoreactive group, which is a polyamic acid, polyimide or a mixture thereof, which comprises at least one diamine (DX) and at least one tetracarboxylic acid dianhydride.

In general the amount of the photoalignment polymer is 0.5%-50% by weight of the sum of weights of the photoalignment polymer and the polymer not having a photoreactive group, preferably 1% to 25% by weight and most preferably 1% to 20% by weight, and especially most preferably 1% to 15% by weight, and more especially most preferably 1% to 10% by weight.

In the context of the present invention the diamine (DX) has the meaning of an organic diamine. Diamine (DX) may be commercially available or is accessible by known methods. The second amino group is accessible for example by substitution reaction. Preferably, the diamine (DX) is selected from the group of the following compounds:

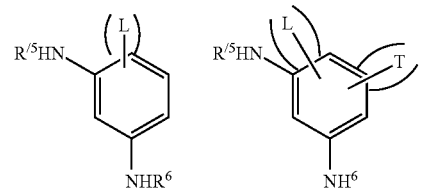

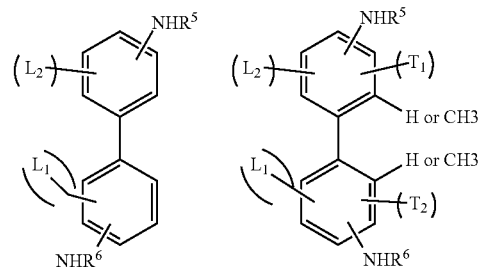

-continued

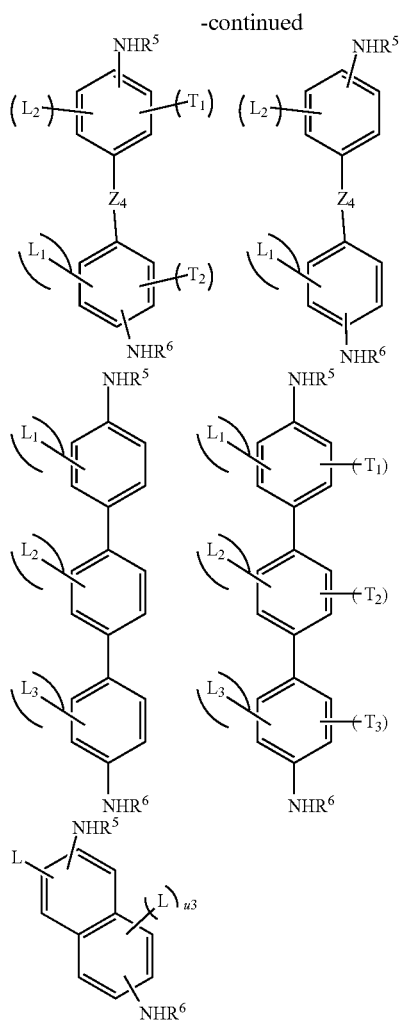

wherein

L, L₁, L₂ and L₃ are independently from each other hydrogen, —CH₃, —COCH₃, —OCH₃, nitro, nitrile, halogen, CH₂=CH—, CH₂=C(CH₃)—, CH₂=CH—(CO)O—, CH₂=CH—O—, —NR⁵R⁶, CH₂=C(CH₃)—(CO)O— or CH₂=C(CH₃)—O—, T, T₁, T₂ and T₃ are independently from each other hydrogen, a substituted or unsubstituted straight-chain or branched C₁-C₂₄alkylene group, in which one or more C-atom, CH— or CH₂—, group may independently from each other be replaced by a non-aromatic, aromatic, unsubstituted or substituted carbocyclic or heterocyclic group, and/or a heteroatom and/or by a linking group;

u₃, u₃' and u₃'' are independently from each other an integer from 0 to 2;

R⁵, R⁶ each independently from each other represents a hydrogen atom or C₁-C₆alkyl and;

Z⁴ represents a substituted or unsubstituted straight-chain or branched C₁-C₂₀alkylene group, in which one or more —CH₂— group may independently from each other be replaced by a non-aromatic, aromatic, unsubstituted or substituted carbocyclic or heterocyclic group; and/or a heteroatom and/or by a bridging group; preferably Z⁴ is unsubstituted or substituted straight-chain or branched C₁-C₁₂alkylene group, C₁-C₆alkylen in which one or more, preferably non-adjacent, —C-atom, CH— or CH₂—, group may be replaced by an oxygen or nitrogen atom; more preferred Z⁴ is methylen, ethylen, propylen, 2,2-dimethyl-propylen, butylen, pentylen, hexylen, (—O—C₁-C₆alkylen)₂methylen or (—(CO)O—C₁-C₆alkylen)₂methylen or the mono- or bi-radicals thereof;

and

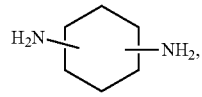 (VII)

 (VIII)

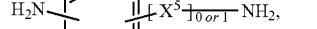 (IX)

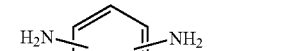 (X)

 (Xa)

 (Xb)

 (Xc)

 (XI)

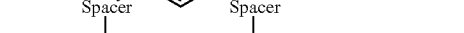 (XII)

$$H_2N\!-\!\!\!\diagdown\!\!\!-X^9\!-\!\!\!\diagdown\!\!\!-X^{10}\!-\!\!\!\diagdown\!\!\!-X^{11}\!-\!\!\!\diagdown\!\!\!-NH_2,$$ (XIII)

wherein X⁴, X⁵, X⁶, X⁷, X⁸, X⁹, X¹⁰ and X¹¹ are independently from each other a bridging group or a single bond; preferably wherein X⁷ and X⁸, X⁹ and X¹⁰ or X¹¹ are independently from each other a single bond, —O-alkoxy-, such as —O-methylen-, methylen-O—; C₁-C₁₂alkylen such as methylene, ethylen, propylene, butylen, pentylen or hexylen, substituted or unsubstituted 1,1'-cyclohexylene, —SO—, —S—, —SO₂—, —O—, —N(R²⁵)—, —C(CH$_3$)$_2$—, —C(CF$_3$)$_2$—, 1,1'-cyclohexyl, substituted or unsubstituted 4-(C$_1$-C$_{30}$ alkyl)-cyclohexyl, substituted or unsubstituted 3,4"-bis[4'-(C$_1$-C$_{30}$alkyl)-1,1'bi-(cyclohexyl)-4-yl], 1,1'-bi(cyclohexyl)-4-yl, wherein R$^{25}$ is hydrogen, methyl, ethyl, propyl, butyl, pentyl or hexyl;

preferably X$^{10}$ is —SO—, —SO$_2$—, —O—, —N(CH$_3$)—, —C(CH$_3$)$_2$—, —C(CF$_3$)$_2$—, 1,1'-cyclohexyl, 4-(C$_1$-C$_{30}$ alkyl)-cyclohexyl, 3,4"-bis[4'-(C$_1$-C$_{30}$ alkyl)-1,1'-bi(cyclohexyl)-4-yl] or 1,1'-bi(cyclohexyl)-4-yl, and wherein X$^9$ and X$^{11}$ are identical and are methylene, ethylen, propylene, butylen, pentylen, hexylen, a single bond or —O—;

wherein n is an integer from 0 to 3, preferably, 0 or 1; and if n is 0 than X$^9$ and X$^{11}$ are identical and are methylene, ethylene, propylene, butylene, pentylene, hexylene, a single bond —O—; —S—, —C(CH$_3$)$_2$—, —C(CF$_3$)$_2$—; and

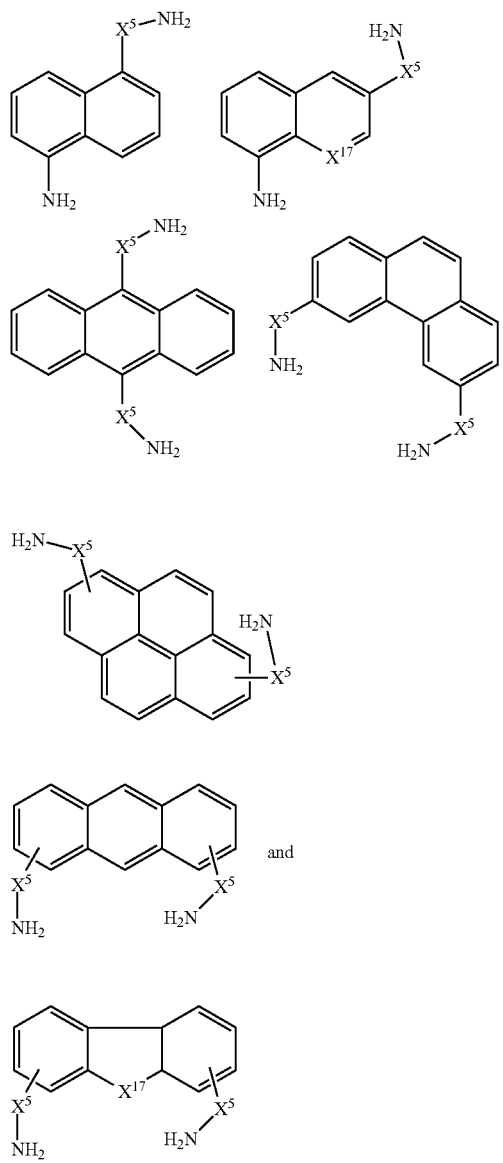

wherein X$^5$ is a bridging group or a single bond, and X$^{17}$ is CH$_2$, O, NH; and (XV)

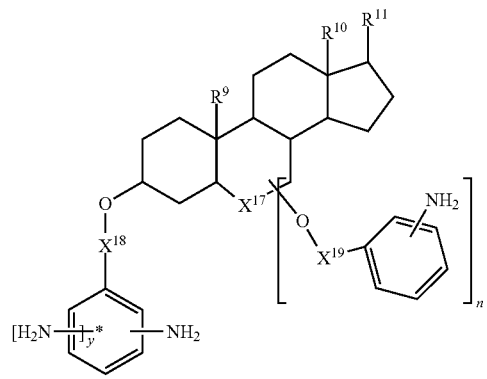

wherein

R$^9$, R$^{10}$, R$^{11}$ are hydrogen or C$_1$-C$_{30}$alkyl, and preferably R$^9$ and R$^{10}$ are hydrogen methyl and R$^{11}$ is hydrogen, or C$_1$-C$_{30}$alkyl, and preferably methyl, or 2-methylheptane and n is 0, if y is 1 and y is 0 if n is 1, and y1 is a single or a double bond, and X$^{18}$ is carbonyl or a single bond or NH, wherein X$^{17}$ is CH$_2$, O, NH;

and

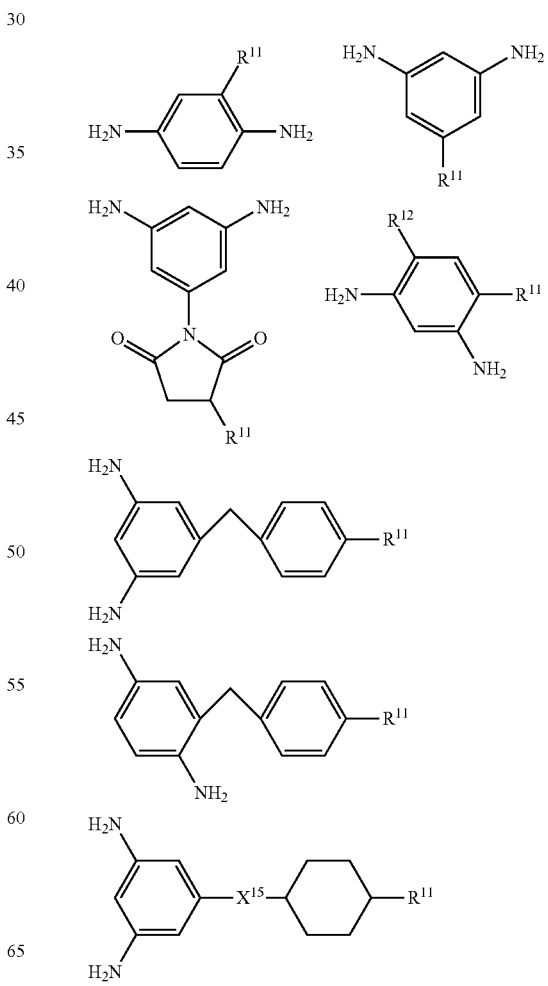

-continued

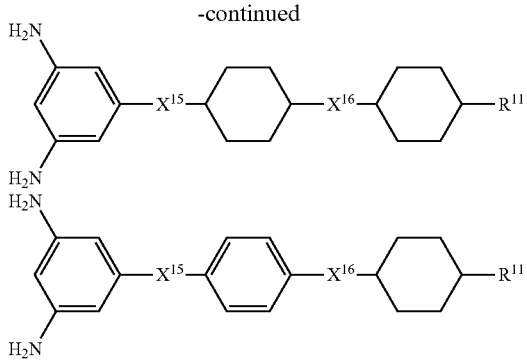

more preferred are

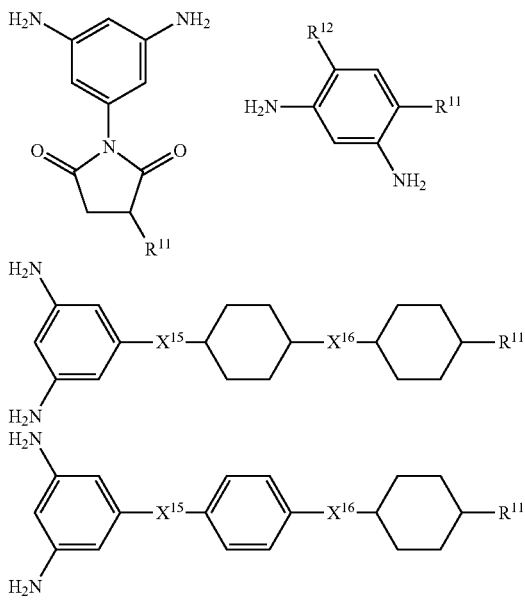

wherein $R^{11}$ and $R^{12}$ is hydrogen, or $C_1$-$C_{30}$alkyl, and preferably methyl, $X^{15}$ and $X^{16}$ are independently from each other a single bond or $C_1$-$C_{30}$alkyl, preferably $C_1$-$C_6$ alkyl, —COO— and —CONH—; —COO($C_1$-$C_6$alkylene)-, —CONH($C_1$-$C_6$alkylene)-.

More preferred is diamine (DX) as given below:
of formula (IX-1)

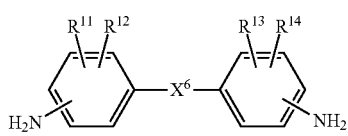

(XI-1)

wherein $X^6$ is a bridging group or a single bond, and is preferably for example —O—, —S— or substituted or unsubstituted, branched or straight-chain $C_1$-$C_6$alkylen, —O($CH_2CH_2O$)$_n$—; —O—($C_1$-$C_{12}$alkyl)$_n$-O—, —S—($C_1$-$C_{12}$alkyl)$_n$-S—, triazine, 1,3,5-triazinane-2,4,6-trione, 1,1'-cyclohexylene, $NR^5$(($C_1$-$C_6$alkyl)$_n$$NR^6$), -(piperidine)$_{n1}$-($C_1$-$C_6$alkyl)$_n$-(piperidine)$_n$, wherein $_n$ is an integer from 1 to 6, and $_{n1}$ are an integer from 0 to 6, wherein $R^5$ and $R^6$ are each independently from each other represents a hydrogen atom or $C_1$-$C_6$alkyl;
$R^{11}$, $R^{12}$, $R^{13}$ and $R^{14}$ are independently from each other hydrogen, or $C_1$-$C_{30}$alkyl, and preferably methyl; and $X^6$ is a single bond, —O—, or —$CH_2$—;
especially more preferred diamine (DX) is selected from compounds as given below:

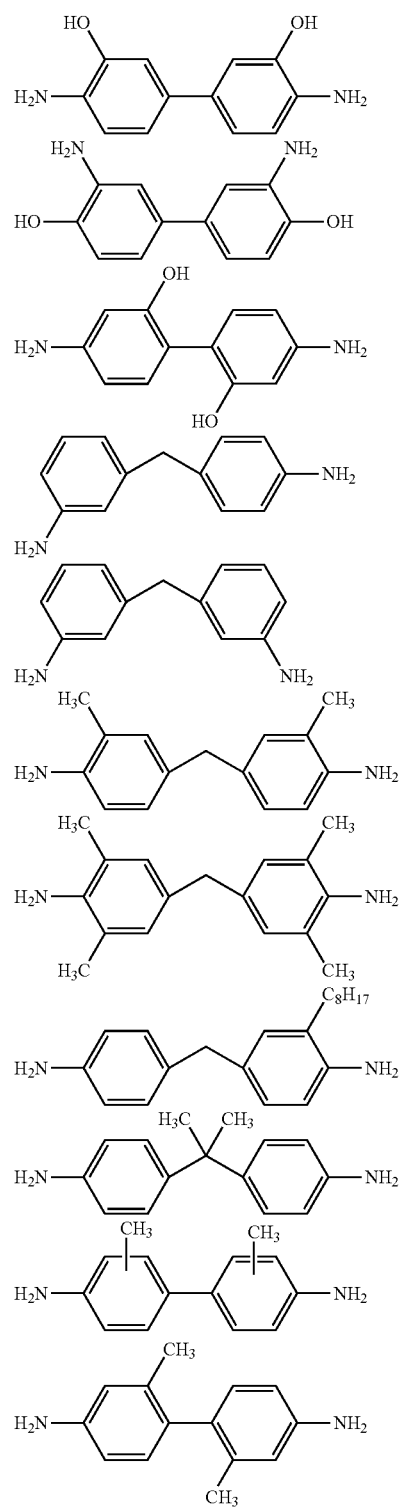

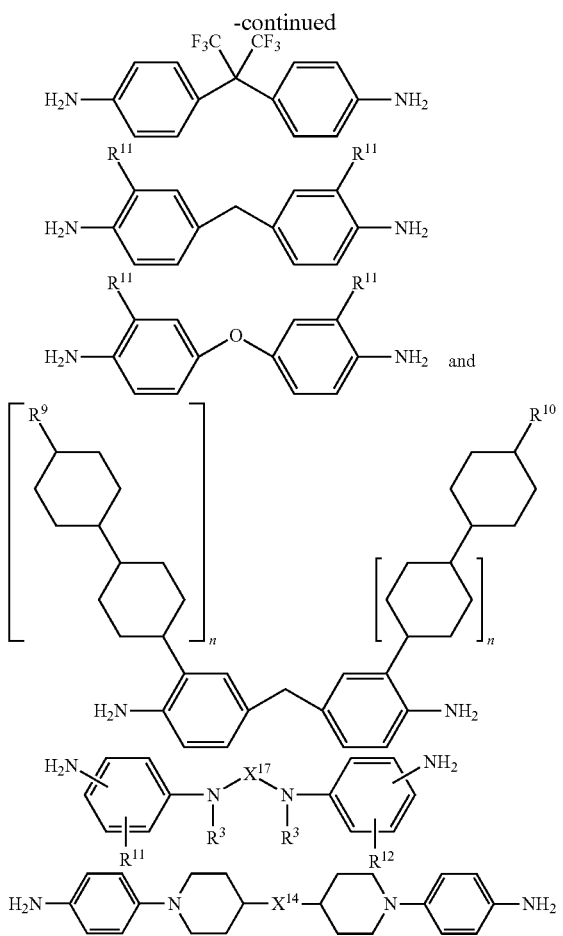

wherein n is independently from each other 0 or 1 and
R³ is C₁-C₂₄alkyl is preferably at least one C₁-C₆alkyl, more preferably methyl, ethyl, propyl;

R⁹, R¹⁰ are independently from each other hydrogen or C₁-C₃₀alkyl, and preferably R⁹ and R¹⁰ are independently from each other hydrogen or methyl R¹¹ and R¹² are independently from each other hydrogen, or C₁-C₃₀alkyl, and preferably methyl;

X¹⁴ and X¹⁷ are independently from each other a bridging group or a single bond, and is preferably for example —O—, —S— or substituted or unsubstituted, branched or straight-chain C₁-C₆alkylen, —O(CH₂CH₂O)ₙ—; —O—(C₁-C₁₂alkyl)ₙ-O—, —S—(C₁-C₁₂alkyl)ₙ-S—, triazine, 1,3,5-triazinane-2,4,6-trione, 1,1'-cyclohexylene, NR⁵((C₁-C₆alkyl)ₙNR⁶), -(piperidine)ₙ₁-(C₁-C₆alkyl)ₙ-(piperidine)ₙ, wherein ₙ is an integer from 1 to 6, and ₙ₁ are an integer from 0 to 6, wherein R⁵ and R⁶ are each independently from each other represents a hydrogen atom or C₁-C₆alkyl;

and further more preferred are diamine (DX)
4,4'-diaminodiphenyl, 4,4'-diaminodiphenyl-3,3'-dimethoxy, 4,4'-diaminodiphenyl-3,3'-dimethyl, 4,4'-diaminodiphenyl-3,3'-dihydroxy, 4,4'-diamino-diphenylmethane, 4,4'-diaminodi-phenylsulfide, 4,4'-diamino-diphenylsulfone, 4,4'-diaminodiphenylcarbonyl, 4,4'-diaminodiphenyl oxomethylene, 4,4'-diaminodiphenyl-bis(trifluoromethyl)-methylene,
4'-diaminodiphenyl-bis(trifluoromethyl)methylene-3,3'-dimethoxy or 4,4'-diaminodiphenyl-bis(trifluoromethyl) methylene-3,3'-dihydroxy, 4,4'-diaminodiphenyl ether, 4,4'-(p-pheny-leneiso-propylidene)bisaniline, 2,2-bis[4-(4-aminophenoxy)phenyl]-hexafluoro-propane, 2,2'-bis[4-4-amino-2-trifluoro-methyl-phenoxy-)phenyl) hexafluoropropane, 4,4'-diamino-2,2'-bis/trifluoromethyl)-biphenyl, 4,4'-bis[4-amino-2-trifluoromethyl)phenoxy]-octafluorobiphenyl;

and further selected from diamines (DX) as given below:

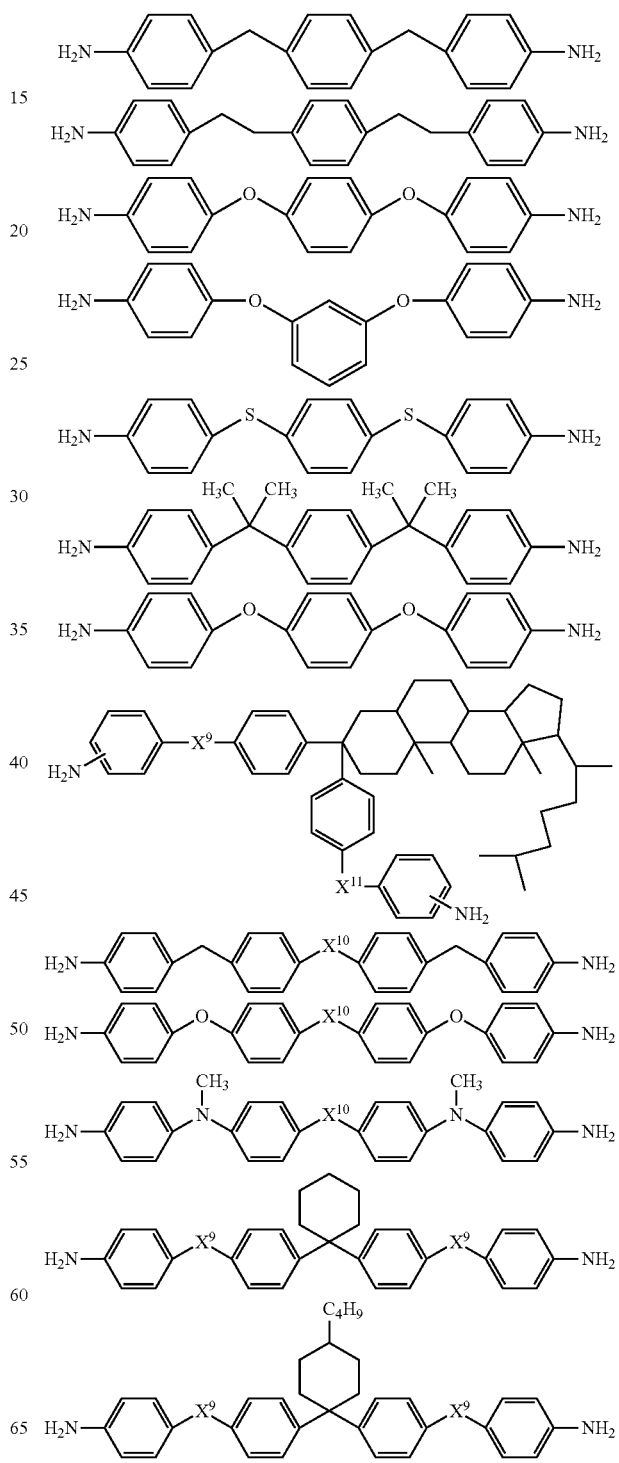

-continued

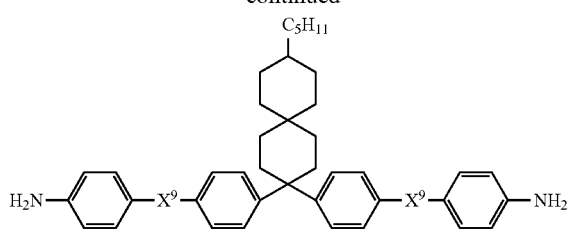

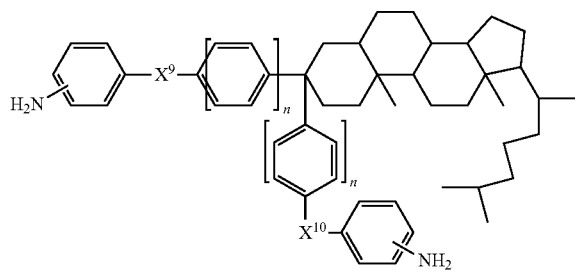

wherein n is 0 or 1, and wherein $X^9$ and $X^{10}$ or $X^{11}$ have the above given meanings and preferences; and

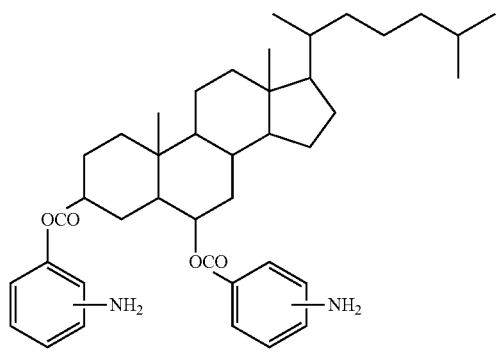

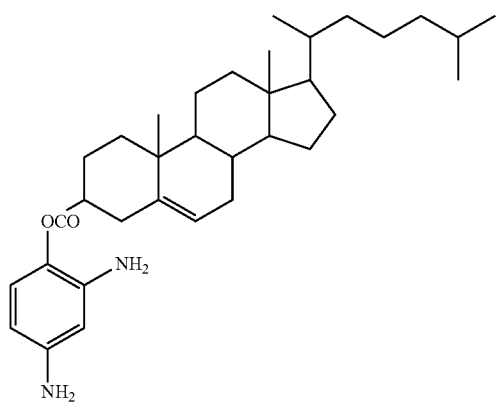

-continued

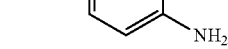

and further, 1-cholesteryl-oxy-2,4-diamino-benzene, 1-cholestanyloxy-2,4-diaminobenzene, cholesteryloxy(3,5-diamino-benzoyl), cholestan-yloxy(3,5-diaminobenzoyl); and Further, diamine (DX) are those as enclosed by reference are diamines as described in EP-A-1,818,354 on page 10, lines 48 to 58 and on page 11, lines 1 to 19.

Most preferred is the diamine (DX) of formula (IX-1)

(XI-1)

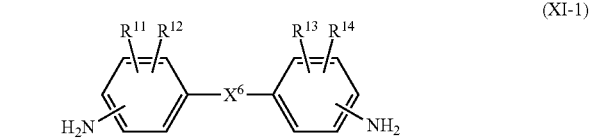

wherein $X^6$ has the meaning and preferences as given above, and is preferably for example a single bond, —O—, —S— or substituted or unsubstituted $C_1$-$C_6$alkylen, —O—$(CH_2CH_2O)_n$—; —O—$(C_1$-$C_{12}$alkyl$)_n$-O—, —S—$(C_1$-$C_{12}$alkyl$)_n$-S—, triazine, 1,3,5-triazinane-2,4,6-trione, 1,1'-cyclohexylene, $NR^5((C_1$-$C_6$alkyl$)_n NR^6)$, -(piperidine)$_{n1}$-$(C_1$-$C_6$alkyl$)_n$-(piperidine)$_n$, wherein $n$ is an integer from 1 to 6, and $n_1$ are an integer from 0 to 6, wherein $R^{11}$, $R^{12}$, $R^{13}$ and $R^{14}$ have independently from each other the same meanings and preferences as given above, preferably $X^6$ is a single bond, —O—, —$CH_2$—.

Further most preferred diamine (DX) is:

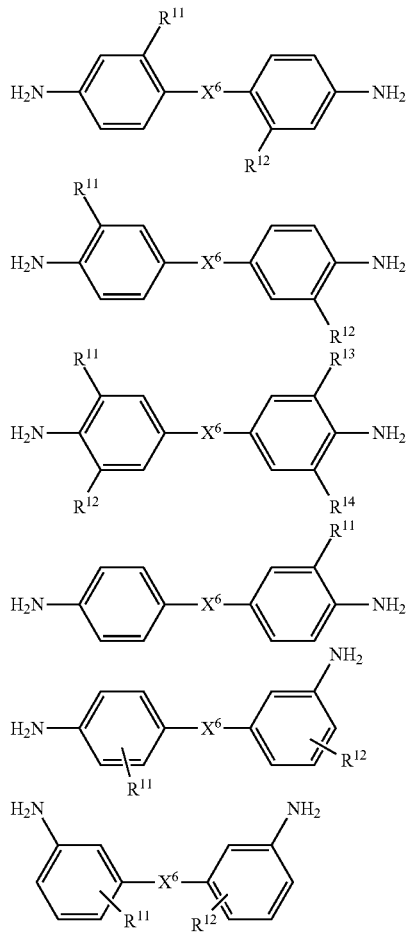

wherein $X^6$, $R^{11}$ and $R^{12}$ are independently from each other have the same meaning as given above, and $R^{11}$ and $R^{12}$ are preferably hydrogen, $C_1$-$C_6$alkyl, preferably $C_1$-alkyl or hydroxyl, and $X^6$ is preferably single bond, —O—, —CH$_2$—.

It may be advantageful for the envisaged application method to adapt the composition by adding further solvents. Hence, the present invention also refers to a photoalignment composition within the given description and preferences, which in addition comprises d) at least one further solvent.

In the context of the present invention the wording "further solvents" has the meaning and preferences as given below:

The solvent or solvent mixture used in the present application may be any solvent that can dissolve the composition according to the invention. Preferably the at least one further solvent is a polar solvent or a nonpolar solvent. The solvents which are particularly preferred are those leading to a good coatability or printability of the photoalignment composition to the substrate such as glass.

Non-polar solvents have low dielectric constants and are not miscible with water, such as for example hexane, benzene, toluene, diethyl ether, chloroform, ethyl acetate, dichloromethane, chlorobenzene.

Preferred polar solvent is an aprotic or protic polar solvent.

Polar aprotic solvents are solvents that share ion dissolving power with protic solvents but lack an acidic hydrogen.

These solvents generally have high dielectric constants and high polarity. Examples are 1,4-dioxane, tetrahydrofuran (THF), acetone, acetonitrile (MeCN), N, N-dimethylformamide (DMF), N,N-dimethylacetamide, dimethyl sulfoxide (DMSO), N-methylpyrrolidone (NMP), N-ethylpyrrolidone (NEP), N-vinylpyrrolidone, tetramethylurea, hexamethylphosphoric acid triamide, gamma.-butyrolactone (BL), N-methylmorpholine, acetonitrile, ethylcarbitol acetate, ethylene glycol, propylene glycol diacetate, dipropylene glycol, chlorobenzene, tetrahydrofuran, cyclopentanone (CP), methylethylketone (MEK), ethyl acetate (EA), anisole (AN), ethylethoxy propionate, cyclohexanone (CHN), methyl isobutyl ketone (MIBK), 1-methoxy-2-propanol acetate (MPA), Diethylene glycol diethyl ether, dichloromethane, and mixtures thereof. Preferred aprotic solvent is N-methylpyrrolidone (NMP), N-ethylpyrrolidone (NEP), diethylene glycol diethyl ether, ethylethoxy propionate or gamma.-butyrolactone (BL) or mixtures thereof. Especially preferred is N-methylpyrrolidone (NMP).

Polar protic solvents are solvents, which contain dissociable H+, such as hydrogen fluoride, are called a protic solvent. The molecules of such solvents can donate an H+ (proton). Conversely, aprotic solvents cannot donate hydrogen bonds. Common characteristics of protic solvents are to display hydrogen bonding, to have an acidic hydrogen (although they may be very weak acids), to be able to stabilize ions (cations by unshared free electron pairs, anions by hydrogen bonding). Examples are acetic acid, n-butanol, isopropanol, n-propanol, ethanol, methanol, formic acid, 2-butoxyethanol (BC), ethylcarbitol, butylcarbitol, ethylene glycol, propylene glycol monoacetate, dipropylene glycol monomethyl ether and water. Preferred polar protic solvent is 2-butoxyethanol (BC).

Preferred further solvents are gamma.-butyrolactone (BL), N-methylpyrrolidone (NMP), N-ethylpyrrolidone (NEP), 2-butoxyethanol (BC), diethylene glycol diethyl ether, ethylethoxy propionate, N-vinylpyrrolidone, N,N-dimethylacetamide, N,N-dimethylformamide, ethylcellosolve, ethylcarbitol, butylcarbitol, ethylcarbitol acetate, ethylene glycol, propylene glycol monoacetate, propylene glycol diacetate, dipropylene glycol, and dipropylene glycol monomethyl ether, chlorobenzene, tetrahydrofuran, N-methylpyrrolidone (NMP), butylcellosolve, cyclopentanone (CP), methylethylketone (MEK), ethyl acetate (EA), anisole (AN), cyclohexanone (CHN), methyl isobutyl ketone (MIBK), 1-methoxy-2-propanol acetate (MPA), N,N-dimethylformamide (DMF), dichloromethane, gamma-butyrolactone (BL), and mixtures thereof.

More preferred solvents are gamma.-butyrolactone (BL), N-methylpyrrolidone (NMP), N-ethylpyrrolidone (NEP), N-vinylpyrrolidone, N,N-dimethylacetamide, N,N-dimethylformamide, ethylcellosolve, methylethylketone (MEK), diethylene glycol diethyl ether, ethylethoxy propionate, cyclohexanone (CHN), 2-butoxyethanol, (BC) butylcellosolve, ethylcarbitol, butylcarbitol, ethylcarbitol acetate, ethylene glycol, propylene glycol monoacetate, propylene glycol diacetate, dipropylene glycol, and dipropylene glycol monomethyl ether, chlorobenzene, tetrahydrofuran, and mixtures thereof.

Most preferred further solvents are methylethylketone (MEK), cyclohexanone (CHN), butyrolactone (BL), N-methylpyrrolidone (NMP), diethylene glycol diethyl ether, ethylethoxy propionate, N-ethylpyrrolidone (NEP), dimethylformamide and 2-butoxyethanol (BC) and mixtures thereof.

Especially most preferred are butyrolactone (BL), N-methylpyrrolidone (NMP), N-ethylpyrrolidone (NEP), diethylene glycol diethyl ether, ethylethoxy propionate, dimethylformamide and/or 2-butoxyethanol (BC) and more especially N-methylpyrrolidone (NMP), N-ethylpyrrolidone (NEP), dimethylformamide and/or 2-butoxyethanol (BC) and mixtures thereof.

A further embodiment of the present invention relates to a photoalignment composition within the meanings and preferences as given above comprising in addition at least one aprotic polar solvent, preferably two aprotic polar solvents, more preferably at least one solvent is selected from is N-methylpyrrolidone (NMP) or N-ethylpyrrolidone (NEP) and most preferably two aprotic solvents which are N-methylpyrrolidone (NMP) and 2-butoxyethanol (BC) or N-ethylpyrrolidone (NEP) and 2-butoxyethanol (BC).

A more preferred embodiment of the present invention relates to a method for the manufacturing of uniform and defect free liquid crystal aligning layers by applying onto a substrate a photoalignment composition of the present invention within the meaning and preferences as described above, preferably having a viscosity in the range of 1 to 100 mPa·s, more preferably in the range of 1 to 50 mPa·s and even more preferably in the range from 10 to 40 mPa·s for Offset printing and 4 to 15 mPa·s for Inkjet printing, and most preferably in the range of 15 to 40 mPa·s for Offset printing; and 4 to 10 mPa·s for Inkjet printing, which comprises in addition at least one solvent, which is selected from the group of solvents as following:

butyrolactone (BL), N-methylpyrrolidone (NMP), N-Ethylpyrrolidone (NEP), dimethylformamide and 2-butoxyethanol (BC)

wherein the amount of solvent (I) and optionally further solvents in the composition of the present invention is in the range of 99-70% by weight, preferably 99-80% by weight and more preferably 99 to 90% by weight.

The sum of all weight ratios of all components including solvents of the photoalignment composition of the present invention is 100%.

In the present invention the photoalignment composition of the present invention may further comprise surfactants.

Surfactants are chemicals that have a tendency to adsorb physically at a surface or interface, thereby altering the energy relationship at the interface. Thereby surfactants change the surface tension.

Suitable surfactants are wetting-, or levelling-, blocking-, scratch-, slip-, mar- or abrasion-resistant-; deaerating-, defoaming-, hydrophobing-, dispersing-, rheology controlling-agents; and preferred are wetting-, levelling-, blocking-scratch-, slip-, mar- or abrasion-resistant-; dispersing- and rheology controlling-agents; and more preferred are wetting-, dispersing-, levelling-, blocking-scratch-resistant-agents; and most preferred are surfactants wetting-, dispersing-, levelling-agents. Especially most preferred are wetting- and levelling agents.

The surfactants with the above cited properties are well known in the art.

Preferably, the surfactants are non-polymeric or polymeric; reactive or non-reactive, saturated or unsaturated; non-ionic, amphoteric; anionic or cationic compounds.

In the context of the present invention reactive has the meaning of crosslinkable, polymerisable or dimerisable.

Preferred surfactants are polymeric and crosslinkable, polymerisable or dimerisable.

Amphoteric are for example alkyl ampho(di)acetates, amido betaines or alkyl betaines.

Cationic surfactants are for example alkyl dimethylamines, alkyl amidopropylamines, alkyl imidazoline derivatives, quaternised amine ethoxylates, quaternary ammonium compounds;

More preferably the surfactants which are polymers are homo- or copolymers (block, statistic, grafted, branched) or unreactive or reactive, such as crosslinkable, polymerisable or dimerisable surfactants. Most preferred are reactive, such as crosslinkable surfactants.

Examples of non-polymeric surfactants are organic sulphonate derivatives, such as alkyl phenol ether sulphates, alpha olefin sulphonates, aromatic hydrocarbon sulphonic acids, salts and blends, naphthalene sulphonates, condensed naphthalene sulphonates, fatty alcohol sulphates, di-alkyl sulpho-succinates, mono-alkyl sulphosuccinates, alkyl sulphosuccinamates, di-alkyl sulphosuccinates, lecithine derivates such as sojalecithine; tenside derivates, such as cationic, anionic or amphoteric tensides especially fatty acid ester derivatives; carbonic acid ester or ether derivates, such as hydroxyfunctional carbonic acid ester or ether derivates, alkyl ether phosphates, alkyl ether carboxylic acids and salts, alkyl ether sulphates; alkyl phosphates, alkyl benzene sulphonic acids and salts, alkyl phenol ether phosphates, alkyl phenol ether sulphates, aromatic hydrocarbon sulphonic acids, salts and blends.

Preferred non-polymeric surfactants are carbonic acid ester or ether derivates, especially, Disperbyk®-108.

Examples of polymeric surfactants are for example organic polymers, such as amide polymers, imide polymers, polyurethane, silicon/siloxane polymers, fluoro polymers or acrylate polymers, polyether polycarbonic acid structure (also containing organo-modified polysiloxane or an amine derivative), or non-ionic dispersing polymers.

Organic polymer surfactants are for example hydrocarbon surfactants, such as solvent blend of high-boiling aromatics, ketones and esters, or fame (Fatty Acid Modified Emulsifiers).

Fame is based upon fatty acid chemistry, having polar heads based on tertiary amines, such as for example fatty acid modified polyester, aliphatic polyether with acidic groups, solution of fatty acid modified, polyester in water.

Silicon/siloxane polymers are for example reactive or non-reactive polysiloxane, such as
  organically modified polysiloxane
  organically modified polysiloxane
  fluorocarbon modified polysiloxane
  solvent-free modified polysiloxane
  modified polysiloxane emulsion
  polysiloxane
  polysiloxane copolymer
  polyether siloxane copolymer
  isocyanate-terminated polysiloxane
  polysiloxane modified with unsaturated terminal groups
  polysiloxane modified polyisocyanates
  emulsion of polyether siloxane copolymer
  polysiloxane based products containing fumed silica
  silicone acrylate
Fluoro polymers are for example
  fluorocarbon modified polymer
  fluorocarbon modified polyacrylate
  fluorosilicone
  polymeric fluorocarbon compound
Acrylate polymers are for example
  acrylic polymer
  ammonium polyacrylate
  sodium polyacrylate
  ammonium polyacrylate copolymer sodium polyacrylate copolymer;
Non-ionic dispersing polymers are for example
amine oxides
alkyl polysaccharides
block copolymers
castor oil ethoxylates
ceto-oleyl alcohol ethoxylates
ceto-stearyl alcohol ethoxylates
decyl alcohol ethoxylates
dinonyl phenol ethoxylates
dodecyl phenol ethoxylates
end-capped ethoxylates
ether amine derivatives
ethoxylated alkanolamides
ethylene glycol esters
fatty acid alkanolamides
fatty alcohol alkoxylates
lauryl alcohol ethoxylates
mono-branched alcohol ethoxylates
natural alcohol ethoxylates
monyl phenol ethoxylates
octyl phenol ethoxylates
oleyl amine ethoxylates
random copolymer alkoxylates
sorbitan ester ethoxylates
stearic acid ethoxylates
stearyl amine ethoxylates
synthetic alcohol ethoxylates
tall oil fatty acid ethoxylates
tallow amine ethoxylates
trid tridecanol ethoxylates Preferred polymeric surfactants are non-ionic polymeric surfactants, especially silicone or siloxane polymers and most preferred is silicone acrylate, especially, Tego® Rad 2500.

A further preferred embodiment of the present invention concerns compositions of 2 or more than 2 surfactants.

Typical suppliers for surfactants having wetting and levelling properties are for example ADD APT, Air Products, Akzo-Nobel, Akzo-Nobel Cellulosic Specialities, BASF, Borchers, BYK Chemie, Ciba Specialty Chemicals, Cognis, Condea Servo, Degussa-Goldschmidt, Dexter Chemical, Dow Chemical, Dow Corning, DuPont, Elementis, GE Silicones, International Speciality Product, Rhodia, Tego, Tiarco Chemical, Troy, UCB Chemical, Ultra Additive, Worlee, 3M, Additek, C. P. Hall, Cytec, Efka Additives, Hercules, Liaoyang Huaxing Chemical, Polyvel, R. T. Vanderbilt, Sovereign Chemical, Stepan, Tiarco Chemical, Sachtleben, Rhodia, Raschig, Potters Ballotini.

Example of surfactants having wetting and levelling properties are:
  by Tego/Degussa available: Tego® Colorol, Tego® Dispers, Tego® Lipotin, Tego® Twin, Tego® Wet, Rewopol®, Tego® Surten, Tego® Rad, Tego® Glide, Tegomer®, Tego® Flow such as Tego® Flow 300, Tego® Colorol E, Tego® Colorol F, Tego® Colorol Standard, Tego® Dispers 655, Tego® Dispers 660 C, Tego® Dispers 661 C, Tego® Dispers 662 C, Tego® Dispers 680 UV, Tego® Dispers 681 UV, Tego® Lipotin A, Tego® Lipotin BL, Tego® Lipotin DB, Tego® Lipotin SB, Tego® Twin 4000, Tego® Wet 250, Tego® Wet 260, Tego® Wet 265, Tego® Wet 270, Tego® Wet 280, Tego® Wet 500, Tego® Wet 505, Tego® Wet 510, Tego® Wet 590, Tego® Wet 591, Tego® Wet KL 245, Rewopol® B 2003, Rewopol® M 365, Rewopol® SB DO 70, Rewopol® SB DO, Rewopol® SB DO 75 PG, Rewopol® SB FA 50, Rewoquat® W 75, Rewoteric® AM CAS, Tego® Surten W 111, Tego® Surten W 125, Tego® Surten W 130, Tego® Surten W 133, Tego® Surten W 5840, Tego® Surten W 5878, Tego® Rad 2100, Tego® Rad 2200 N, Tego® Rad 2250, Tego® Rad 2300, Tego® Rad 2500, Tego® Rad 2600, Tego® Rad 2700, Tego® Glide 130, Tego® Glide 406, Tego® Glide 410, Tego® Glide 411, Tego® Glide 415, Tego® Glide 420, Tego® Glide 432, Tego® Glide 435, Tego® Glide 440, Tego® Glide 450, Tego® Glide 482, Tego® Glide A 115, Tego® Glide B 1484, Tego® Glide ZG 400, Tego® Flow 300, Tegomer® CSi 2342, Tegomer® D 3403, Tegomer® E-si. Tegomer® ESi 2330, Tegomer® HSi 2311, Tegomer® VSi 2250.
  by Efka available: EFKA 3033, EFKA 3034, EFKA 3232, EFKA 3277, EFKA 3299, EFKA 3883, EFKA 6903, EFKA 6906, EFKA 3522, EFKA 5010, EFKA 5044, EFKA 5054, EFKA 5055, EFKA 5063, EFKA, EFKA 5066, EFKA, EFKA 5207, EFKA 5244, Efka® 3500, Efka® 3600, Efka® 3650, Efka® 4590, EFKA® 5065, EFKA® 5070, Efka® 6225, Efka® 6230, Efka®, Efka® 7311, Efka® 7315, Efka® 7316, Efka® 7340, Efka® 7361, Efka® 7375, Efka® 7381, Efka® 7390, Efka® 7500, Efka® 7544, Efka® 7554, Efka® 7564
  by BYK available: Byk® additives such as Byk® 307, Byk® 333, Byk® 9075, Byk® 9076, Byk® 9077, Byk® 935, Byk® 961, Byk® A 560, Byk® W 909, BYKOPLAST® 1000, Disperplast 1011, Byk® S 706, Byk® W 909, Aquace 840, Byk®-077, Byk®-085, Byk®-315, Byk®-320, Byk®-321, Byk®-322, Byk®-323, Byk®-325, Byk®-336, Byk®-340, Byk®-345, Byk®-346, Byk®-347, Byk®-348, Byk®-352, Byk®-353, Byk®-354, Byk®-355, Byk®-356, Byk®-357, Byk®-358 N, Byk®-359, Byk®-360 P, Byk®-361 N, Byk®-363 P, Byk®-364 P, Byk®-365 P, Byk®-366 P, Byk®-368 P, Byk®-370, Byk®-371, Byk®-373, Byk®-375, Byk®-380N, Byk®-381, Byk®-390, Byk®-392, Byk®-P 104 S, Byk®-S 706, Byk®-Silclean 3700, Byk®-UV 3500, Byk®-UV 3510, Byk®-UV 3530, Byketol®-OK, Byketol®-Special, Byketol®-WS, Minerpol® 221, Disperbyk®-108.

Most preferred surfactants are Tego® Flow 300, Tego® Rad 2600, Tegomer® E-si, Tego® Rad 2700, EFKA-3883, EFKA 6903, EFKA 6906, EFKA 3299, Tego® Rad 2500 a polydimethylsiloxane and Disperbyk®-108 a hydroxyl functionalized carbonic ester with pigment affine groups. Especially most preferred surfactants are Tego® Flow 300, Tego® Rad 2500 and Disperbyk®-108.

Within the scope of the invention the term substrate describes a base material on which a process is conducted which produces one or more layers or films on a part of or on the complete surface of the base material. The substrate can consist of any type of solid material as e.g. glass, metals, polymer films or composite materials. Not necessarily, but in most cases substrates are applied in the shape of slabs, either individually cut pieces or in case of flexible base materials also rolled up into a cylinder shape.

In a further preferred embodiment the present invention relates to the photoalignment composition within the meanings and preferences as given above and in addition comprising a surfactant in the solvent in the range of between 1 and 99%, preferred between 1 and 20%, more preferred between 1 and 10% by weight.

The amount of the surfactants in the composition is determined according to the wished performances in respect of mechanical and thermal stability, and of optical and electro-optical performances.

A further preferred embodiment the present invention relates to a method, wherein the addition level of the surfactant on the liquid crystal photoalignment material is below 20%, preferably between 0.01 and 10%, more preferably between 0.1 and 5% by weight and most preferably between 0.1 and 1% per weight.

Preferably, the present invention relates to a photoalignment composition comprising in addition a surfactant, wherein the latter does not have any negative impact on the Voltage Holding Ratio (VHR), Residual DC (RDC) or AC Memory (ACM).

VHR, ACM and RDC are commonly known values in the technical field of liquid crystal displays and will be described as following:

VHR:

In the case of liquid crystal displays of thin-film transistor type a certain amount of charge is applied over the course of a very short period of time to the electrodes of a pixel and must not subsequently drain away by means of the resistance of the liquid crystal. The ability to hold that charge and thus to hold the voltage drop over the liquid crystal is quantified by what is known as the "voltage holding ratio" (VHR). It is the ratio of the RMS-voltage (root mean square voltage) at a pixel within one frame period and the initial value of the voltage applied.

ACM (AlternativeCurrentMemory):

An AC (AlternativeCurrent) voltage of 7 Volts (1 kHz) is applied to the cell for 700 hours. The pre-tilt angle of the cell is measured before and after the application of the AC stress. The ACM performance is expressed in terms of a pretilt angle difference, $\Delta\theta$.

RDC (ResidualDirectCurrent):

An adjustable DC (DirectCurrent)-component of V=2 VDC is added to the symmetric square wave signal of V=2.8V (30 Hz), the fluctuations of light transmitted by the test cell can be eliminated or at least minimized by adequate selection of the external DC component. The external DC-voltage for which the flicker is eliminated or minimized by compensation of the internal residual DC-voltage is taken to be equivalent to the internal residual DC-voltage.

Preferred are non-ionic surfactants not having any negative impact on Voltage Holding Ratio (VHR), Residual DC (RDC) or AC Memory (ACM) are non-ionic surfactants.

A further preferred embodiment of the present invention relates to a method for the preparation of liquid crystal aligning layers, comprising applying a photoalignment composition as described above with all described preferences to a substrate by printing or coating.

In general, the composition is applied onto a substrate optionally coated with an electrode [for example a glass plate coated with indium-tin oxide (ITO)] so that homogeneous layers of 0.05 to 100 µm thickness are produced.

A further preferred embodiment of the present invention relates to a method as described above and all described preferences of the method, for the preparation of uniform and defect free liquid crystal aligning layers having a thickness of <300 nm, preferably <250 nm, more preferably from <200 nm; and preferably, wherein the liquid crystal photoalignment material is a polymer comprising diamine (I) and tetracarboxylic acid anhydride as described above, and with all preferences described above.

Coating methods are for example spin coating, air doctor coating, blade coating, knife coating, reverse-roll coating, transfer roll coating, gravure roll coating, kiss roll coating, cast coating, spray coating, spin-coating, meniscus-coating, wire-coating, slot-orifice coating, calendar coating, electro-deposition coating, dip coating or die coating.

Printing methods are for example ink-jet-printing, direct-printing, relief printing such as flexographic printing, intaglio printing such as direct gravure printing or offset gravure printing, lithographic printing such as offset printing, or stencil printing such as screen printing, flexographic-printing or planographic-printing.

Preferred is the direct printing such as for example gravure, flexography; screen printing and letterpress printing processes;

further preferred are the indirect printing, such as offset printing; and planographic printing, such as lithography; relief printing, intaglio printing and ink-jet printing, and flexographic printing.

A detailed description of the single printing processes is common knowledge and partially given above.

A further more preferred embodiment of the present invention relates to a method as described above and all described preferences of the method, comprising a composition which is applied to a substrate by printing, preferably by indirect printing, such as offset printing;

planographic printing, such as lithography; relief printing, intaglio printing;

ink-jet printing or flexographic printing; more preferably by ink-jet printing.

A further preferred embodiment of the present invention relates to a method as described above and all preferences described for these methods and which in addition comprises treating, preferably aligning, more preferably cross-linking and/or isomerising, the liquid crystal photoalignment material with aligning light.

The regions, which should be aligned, are irradiated, for example, with a high-pressure mercury vapour lamp, a xenon lamp or a pulsed UV laser, using a polarizer and optionally a mask for creating images of structures.

Further, it is possible to vary the direction of orientation and the tilt angle within the liquid crystal aligning layer by controlling the polarization plane and/or the irradiance direction of the irradiation of the aligning light. It is understood that by selectively irradiating specific regions of the liquid crystal aligning layer very specific regions of the layer can be aligned. In this way, layers with a defined tilt angle can be provided. The induced orientation and tilt angle are retained in the liquid crystal aligning layer by the process, especially by the process of crosslinking.

The treatment with aligning light may be conducted in a single step or in several separate steps. In a preferred embodiment of the invention the treatment with aligning light is conducted in a single step.

The incidence direction of the aligning light may be normal to the substrate or at any oblique angle.

For generating tilt angles, preferably the aligning light is exposed from oblique angles.

Further preferred methods of the invention relate to
- a method for the preparation of liquid crystal aligning layer, which are vertically aligned;
- a method for the preparation of multi-domain vertical alignment of a liquid crystal aligning layer;
- a method for the preparation of a liquid crystal aligning layer with tilted optical axis.

Further, the present invention relates to the use of a liquid crystal aligning layer comprising a photoalignment composition as described in the present invention within the given meanings and all preferences, and as prepared according to a method of, the present invention for aligning liquid crystals.

A further embodiment of the present invention relates to a liquid crystal aligning layer obtainable by a method to the present invention.

Preferably, the invention relates to a liquid crystal aligning layer comprising a photoalignment composition according to the present invention in a cross-linked and/or isomerized form.

A further preferred embodiment of the present invention relates to a liquid crystal aligning layer having a thickness of <300 nm, preferably <250 nm, more preferably <200 nm.

The liquid crystal aligning layer can be used in the manufacture of unstructured or structured optical- or electro-optical elements, preferably in the production of hybrid layer elements.

In general, transparent support such as glass or plastic substrates, optionally coated with indium tin oxide (ITO) are used.

Further, it is possible to vary the direction of orientation and the tilt angle within the liquid crystal aligning layer by controlling the direction of the irradiation of the aligning light. It is understood that by selectively irradiating specific regions of the polymer or oligomer layer very specific regions of the layer can be aligned. In this way, layers with a defined tilt angle can be provided. The induced orientation and tilt angle are retained in the liquid crystal aligning layer by the process, especially by the process of cross-linking.

More preferably, the present invention relates to a method, wherein imidisation is carried out prior or after the application of the polymer, copolymer or oligomer to a support.

Further preferred methods of the invention relates to
- a method for the preparation of a liquid crystal aligning layer, which are vertically aligned;
- a method for the preparation of multi-domain vertical alignment of a liquid crystal aligning layer;
- a method for the preparation of a liquid crystal aligning layer with tilted optical axis.

It is understood that the liquid crystal aligning layer of the present invention can also be used in form of a polymer gel, a polymer network, a polymer film, etc. The liquid crystal aligning layer can be used in the manufacture of unstructured or structured optical- or electro-optical elements, preferably in the production of hybrid layer elements.

In addition, the present invention relates to a method for the preparation of a liquid crystal aligning layer, wherein the photoalignment composition according to the present invention is applied to a support, and subsequent evaporation of the solvent, and wherein, after any imidisation step which may be necessary, the polymer or oligomer or polymer mixture or oligomer mixture treated with aligning light, and preferably isomerized and/or cross-linked by irradiation with aligning light.

A preferred method of the present invention relates to a method, wherein the direction of orientation and the tilt angle within the liquid crystal aligning layer is varied by controlling the direction of the irradiation with aligning light, and/or wherein by selectively irradiating specific regions of the polymer layer or oligomer layer specific regions of the layer are aligned.

The liquid crystal aligning layer are suitably prepared from a solution of the polymer or oligomer material. The polymer or oligomer solution is applied to a support optionally coated with an electrode [for example a glass plate coated with indium-tin oxide (ITO)]. In this process different coating techniques like spin-coating, meniscus-coating, wire-coating, slot-coating, offset-printing, flexo-printing, gravur-printing may be used. Then, or optionally after a prior imidisation step, the regions to be oriented are irradiated, for example, with a high-pressure mercury vapour lamp, a xenon lamp or a pulsed UV laser, using a polarizer and optionally a mask for creating images of structures.

Further, the present invention relates to the use of a liquid crystal aligning layer according to the present invention, preferably in cross-linked form, as an orientation layer for liquid crystals.

Further, the present invention relates to preferably the use of a liquid crystal aligning layer for the induction of vertical or planar alignment of adjacent liquid crystalline layers, in particular for operating a cell in MVA mode.

The irradiation time is dependent upon the output of the individual lamps and can vary from a few seconds to several hours. The photo-reaction (dimerisation, polymerisation, cross-linking) can also be carried out, however, by irradiation of the homogeneous layer using filters that, for example, allow only the radiation suitable for the cross-linking reaction to pass through.

It is understood that the liquid crystal aligning layer of the invention may be used in the production of optical or electro-optical devices having at least one orientation layer as well as unstructured and structured optical elements and multi-layer systems.

The present invention relates to the use of a liquid crystal aligning layer for the orientation of liquid crystals.

Preferred is the use for the induction of vertical alignment of adjacent liquid crystalline layers.

A further embodiment of the invention relates to an optical or electro-optical device comprising a photoalignment layer according to the present invention, preferably in a cross-linked form. The electro-optical devices may comprise more than one layer, preferably there are two layers. The layer or each of the layers may contain one or more regions of different spatial orientation.

A further embodiment of the present invention relates to optical and electro-optical unstructured or structured constructional elements, preferably liquid crystal display cells, multi-layer and hybrid layer elements, comprising at least one liquid crystal aligning layer as described above.

Further, the present invention relates to preferably the use of a liquid crystal aligning layer for the induction of vertical alignment of adjacent liquid crystalline layers, in particular for operating a cell in MVA mode.

Preferred is the use of the liquid crystal aligning layer for the induction of vertical alignment or planar alignment of adjacent liquid crystalline layers.

A further preferred embodiment of the invention relates to an optical or electro-optical device comprising one or more liquid crystal aligning layers. The electro-optical devices may comprise more than one layer. The layer or each of the layers may contain one or more regions of different spatial orientation.

Further preferred is the use of the liquid crystal aligning layer for optical and electro-optical elements.

More preferably, the present invention concerns an optical and electro-optical unstructured or structured constructional elements, preferably liquid crystal display cells, multi-layer and hybrid layer elements, comprising at least one liquid crystal aligning layer, such as a polymer layer, copolymer or oligomer layer according to the present invention.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The optical or electro-optical component, can be used for (but are not limited to) a waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non-linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a patterned G/H-polarizer with an anisotropic absorber, a pattered reflective circular polarizer, a pattered reflective linear polarizer, a patterned MC (monomer corrugated film).

Preferred are security elements, compensator and retardation films.

The advantages of the present invention could not be foreseen by a skilled person.

It has surprisingly been found, that high coating quality can be accessed using the photoalignment compositions of the present invention. Also very astonishing the fabrication of thin liquid crystal aligning layers which fulfil the requirement of uniformed defect free films are accessible with the photoalignment compositions of the present invention.

Examples

Abbreviation of Solvents

NMP: 1-Methyl-2-pyrrolidone (cas: 872-50-4)
BC: 2-Butoxyethanol (Butyl cellosolve) (cas: 11-76-2)
IBIB: Isobutyl isobutyrate (cas: 97-85-8)

Polymer formed was characterized through its intrinsec viscosity and NMR data. In NMR, some representative signals could be seen. The integration is given as relative values.

Synthesis of Polymers

Polyamic Acid 1

0.820 g (3.66 mmol) of 2,3,5-tricarboxycyclopentylacetic-1,2:3,4-dianhydride is added to a solution of 3.649 g (3.66 mmol) of [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate in 6.6 mL of NMP. Stirring is then carried out at 0° C. for 2 hours. The mixture is subsequently allowed to react for 21 hours at room temperature. The polymer mixture is diluted with 18 mL of THF, precipitated into 800 mL of deionised water to yield, after drying at room temperature under vacuum, Polyamic acid 1 in the form of a white powder with an inherent viscosity [η] of 0.50 dL/g.

NMR $^1$H NMR/DMSO d$_6$ 300 MHz

δ=12.43 (s, 2H), 10.23 (m 2H), 8.03 (m, 2H), 7.86-7.58 (m, 10H), 7.27-7.06 (m, 10H), 6.57 (m, 2H), 4.91 (s, 4H), 4.10 (t, 4H), 3.43-2.49 (m, 8H), 2.42 (m, 4H), 1.92 (m, 4H).

Polyamic Acid 2

Analogous to the synthesis of Polyamic acid 1 and using, as diamines, 4-{(1E)-3-[2-(2,4-diaminophenyl)ethoxy]-3-oxoprop-1-enyl}phenyl 4-(4,4,4-trifluorobutoxy)benzoate and [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate in a molar ratio of 7/3, Polyamic acid 2 is obtained in the form of a white powder with an inherent viscosity [η] of 0.33 dL/g.

NMR $^1$H NMR/DMSO d$_6$ 300 MHz

δ=12.42 (s, 2.8H), 10.21-9.40 (m 2.8H), 8.17 (m, 4.2H), 8.06-7.75 (m, 10.2H), 7.31-7.09 (m, 10.3H), 6.63 (m, 2H), 4.90 (s, 1.8H), 4.25-4.11 (m 6.4H), 3.43-2.49 (m, 6.9H), 2.27 (m, 6.9H), 1.95 (m, 6.0H).

Polyamic Acid 3

Analogous to the synthesis of Polyamic acid 1 and using 4-(4-aminophenoxy) aniline and 1,2,3,4-cyclobutane tetracarboxylic dianhydride, Polyamic acid 3 is obtained in the form of a white powder with an inherent viscosity [η] of 0.37 dL/g.

NMR $^1$H NMR/DMSO d$_6$ 300 MHz

δ=12.40 (br, 2H), 10.15 (s 2H), 7.59 (d, 4H), 6.96 (d, 4H), 3.87-3.53 (m, 4H)

Polyamic Acid 4

Analogous to the synthesis of Polyamic acid 1 and using, as diamine, 4-(4-amino-2-methyl-phenyl)-3-methyl-aniline, Polyamic acid 4 is obtained in the form of a white powder with an inherent viscosity [η] of 0.56 dL/g.

NMR $^1$H NMR/DMSO d$_6$ 300 MHz

δ=12.30 (br, 2H), 10.07 (m, 2H), 7.57 (m, 2H), 7.43 (m, 2H), 6.97 (m, 2H), 3.52-2.54 (m, 8H), 1.97 (s, 6H)

Preparation of Formulations

Formulation 1

7.0835 g of a 30% solution of Polyamic acid 1 in NMP are added to 201.875 g of a 20% solution of Polyamic acid 3 in NMP. 108.042 g of NMP and 183.02 g of BC are added. The mixture is stirred during 30 minutes and filtrated on 0.2 μm PTFE-filter to give Formulation 1.

Formulation 2

7.0836 g of a 30% solution of Polyamic acid 1 in NMP are added to 201.872 g of a 20% solution of Polyamic acid 3 in NMP. 108.043 g of NMP, 137.25 g of BC and 45.75 g of IBIB are added. The mixture is stirred during 30 minutes and filtrated on 0.2 μm PTFE-filter to give Formulation 2.

Formulation 3

11.65 g of a 30% solution of Polyamic acid 2 in NMP are added to 157.52 g of a 20% solution of Polyamic acid 4 in NMP. 144.85 g of NMP and 139.6 g of BC and 46.52 g of IBIB are added. The mixture is stirred during 30 minutes and filtrated on 0.2 μm PTFE-filter to give Formulation 3.

| Formulation | Dynamic viscosity (cP) |
| --- | --- |
| Formulation 1 | 30.4 |
| Formulation 2 | 27.0 |
| Formulation 3 | 29.2 |

Application Examples

Offset Printing is processed on a Nakan E-400 MIZ with the following parameters:
  coating speed of 20 m/min (condition 1), or 25 m/min (condition 2)

Anilox roll speed of 20 m/min (condition 1), or 25 m/min (condition 2)
Anilox NIP of 5-8 mm
Table NIP of 10-15 mm
Anilox-Scrubber pressure of 0.48 Mpa.

The coated substrates are dried on a hot plate at 80° C. for 1.5 minutes followed by 40 minutes at 200° C.

Substrates used for testing (conditions 1 and conditions 2) are:
Asahi glass PD200 with a thickness of 0.3 mm
ITO coated Asahi glass (sputter deposition $SiO_2$ 200 nm/ITO 20 nm)
Color filter (CF)

The coating quality is controlled and summarized in the following table, with surface aspect quality being noted from 1 to 4 respectively equivalent to "very good, no defect", "light mura, few defects", "mura, defects" and "mura, defects overall the surface"; levelling being noted from 1 to 4 respectively equivalent to "very good", "good", "poor" and very poor, whereby bad levelling also means de-wetting where some uncoated area can be observed.

TABLE

| Formulation Coating condition | Solvent 100% | Surface aspect | Levelling |
|---|---|---|---|
| Formulation 1 (comparative example) Coating condition1 | NMP 60% BC 40% | 4 | 3 |
| Formulation 2 Coating condition1 | NMP 60% BC 30% IBIB 10% | 1 | 1 |
| Formulation 2 Coating condition2 | NMP 60% BC 30% IBIB 10% | 1 | 1 |
| Formulation 3 Coating condition1 | NMP 60% BC 30% IBIB 10% | 1 | 1 |

Example of "defect overall the surface": in FIG. 1 of coated formulation 1 on CF, microscopic defects can observed overall the coated surface.

Figure 2:
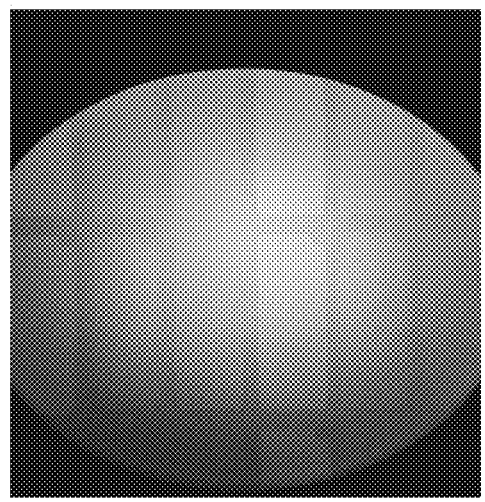
FIG. 2 is an example of "good coating aspect with very good levelling" of coated formulation 2 on CF.

Example of "good coating aspect with very good levelling": in FIG. 2 of coated formulation 2 on CF.

The invention claimed is:

1. A photoalignment composition comprising
a) at least a single photoalignment polymer, and
b) at least a single solvent of formula (I)

(R—CO—O—R'), wherein R and R' are independently from each other a straight-chain alkyl, or branched alkyl chain; with the proviso that at least one alkyl chain is branched.

2. A photoalignment composition according to claim 1, further comprising
c) a further polymer not having a photoreactive group.

3. A photoalignment composition according to claim 1, comprising
at least a single solvent of formula (I)

(R—CO—O—R'), wherein R and R' are independently from each other a straight-chain $C_1$-$C_6$alkyl or a branched $C_1$-$C_6$alkyl chain; with the proviso that at least one alkyl chain is branched.

4. A photoalignment composition according to claim 1, comprising
at least a single solvent of formula (I)

(R—CO—O—R'), wherein R and R' are simultaneously a branched alkyl chain.

5. A photoalignment composition according to claim 1 wherein the photoreactive group is a dimerizable, isomerizable, polymerizable and/or cross-linkable group.

6. A photoalignment composition according to claim 1, comprising at least a single photoalignment polymer comprising at least two monomers, wherein at least one monomer comprises a photoreactive group.

7. A photoalignment composition according to claim 1, comprising at least a single photoalignment polymer comprising at least two monomers having a photoreactive group.

8. A photoalignment composition according to claim 1, comprising a further polymer not having a photoreactive group, which comprises a backbone which is a polyamic acid, a partially imidised polyamic acid, a polyimide, a polyamic acid ester or a polysiloxane.

9. A photoalignment composition according to claim 1, comprising a further polymer not having a photoreactive group, which has the same backbone as the photoalignment polymer.

10. A photoalignment composition according to claim 2, comprising at least a single photoalignment polymer in an amount of 0.5%-50% by weight of the sum of weights of the photoalignment polymer and the polymer not having a photoreactive group.

11. A photoalignment composition according to claim 1, comprising d) at least one further solvent, which is a polar solvent, which is aprotic or protic polar solvent.

12. A photoalignment composition according to claim 1, comprising d) at least one aprotic polar solvent.

13. A photoalignment composition according to claim 1, comprising solvent (I) and optionally further solvents in a total amount of 99-70% by weight in relation to the total weight of the composition.

14. A photoalignment composition according to claim 1, comprising in addition at least one surfactant.

15. A method for the preparation of liquid crystal aligning layers comprising applying a photoalignment composition as described in claim 1 to a substrate by printing or coating.

16. A liquid crystal aligning layer comprising a photoalignment composition as described in claim 1.

17. A method of using the liquid crystal aligning layer according to claim 16, comprising forming optical and electro-optical elements with the liquid crystal aligning layer.

18. Optical and electro-optical elements comprising a liquid crystal aligning layer according to claim 16.

19. A photoalignment composition according to claim 1, wherein the photoreactive group is a cinnamate-, coumarine-, quinoline-, azo-, stilbene-, cyanostilbene-, chalcone-, diphenylacetylene, benzylidene-phthalimidine, benzylideneacetophenone, phenylenediacryloyl, stilbazole and/or azo-group.

20. A photoalignment composition according to claim 1, comprising d) two aprotic polar solvents.

* * * * *